US012752923B2

(12) United States Patent
Carle et al.

(10) Patent No.: US 12,752,923 B2
(45) Date of Patent: Oct. 6, 2026

(54) AIRCRAFT WITH AN UNDUCTED FAN PROPULSOR

(71) Applicant: General Electric Company, Evendale, OH (US)

(72) Inventors: Sara Elizabeth Carle, Columbus, OH (US); Daniel L. Tweedt, West Chester, OH (US); Syed Arif Khalid, West Chester, OH (US); Andrew Breeze-Stringfellow, Montgomery, OH (US); William Bowden, Cleves, OH (US)

(73) Assignee: General Electric Company, Evendale, OH (US)

(*) Notice: Subject to any disclaimer, the term of this patent is extended or adjusted under 35 U.S.C. 154(b) by 0 days.

(21) Appl. No.: 19/330,625

(22) Filed: Sep. 16, 2025

(65) Prior Publication Data

US 2026/0008550 A1 Jan. 8, 2026

Related U.S. Application Data

(63) Continuation-in-part of application No. PCT/US2024/040754, filed on Aug. 2, 2024, which is (Continued)

(51) Int. Cl.
*B64D 27/18* (2006.01)
*F02K 3/02* (2006.01)
(Continued)

(52) U.S. Cl.
CPC ................ *B64D 27/18* (2013.01); *F02K 3/02* (2013.01); *F04D 19/002* (2013.01); (Continued)

(58) Field of Classification Search
CPC ....... B64D 27/12; B64C 11/305; B64C 11/48; F01D 5/022
See application file for complete search history.

(56) References Cited

U.S. PATENT DOCUMENTS 5,079,916 A 1/1992 Johnson
5,135,185 A 8/1992 Adamson
(Continued)

FOREIGN PATENT DOCUMENTS

CN 108302162 7/2018
FR 3127024 A1 3/2023
(Continued)

OTHER PUBLICATIONS

"Could an open fan engine cut carbon emissions for more sustainable aviation?"; https://www.airbus.com/en/newsroom/stories/2022-07-could-an-open-fan-engine-cut-carbon-emissions-for-more-sustainable; Jul. 19, 2022; 3 pgs.
(Continued)

*Primary Examiner* — Joshua J Michener
*Assistant Examiner* — Cindi M Curry
(74) *Attorney, Agent, or Firm* — Fitch, Even, Tabin & Flannery, LLP

(57) ABSTRACT

The present disclosure is generally related to aircraft having one or more unducted fan propulsors at locations within specific regions relative to an airfoil, such as a wing or horizontal stabilizer. More specifically, the specific regions are located where there is a relatively higher pressure air flow beneath the wings or above a horizontal stabilizer. That higher pressure air flow can be utilized to provide increased thrust from the unducted fan propulsor.

20 Claims, 25 Drawing Sheets

Related U.S. Application Data a continuation-in-part of application No. 18/652,052, filed on May 1, 2024, now Pat. No. 12,384,522, which is a continuation-in-part of application No. 18/230,609, filed on Aug. 4, 2023, now Pat. No. 12,365,471.

(51) Int. Cl.
*F04D 19/00* (2006.01)
*F04D 29/32* (2006.01)

(52) U.S. Cl.
CPC ...... *F04D 29/329* (2013.01); *F05D 2220/323* (2013.01); *F05D 2220/36* (2013.01); *F05D 2240/20* (2013.01); *F05D 2240/90* (2013.01)

(56) References Cited

U.S. PATENT DOCUMENTS

| | | | | |
|---|---|---|---|---|
| 5,136,185 | A | 8/1992 | Fleming | |
| 5,433,674 | A | 7/1995 | Sheridan | |
| 8,141,055 | B2 | 3/2012 | Cherkasov | |
| 8,291,911 | B2 | 10/2012 | Falco | |
| 8,291,915 | B2 | 10/2012 | Farley | |
| 8,297,916 | B1 | 10/2012 | Mccune | |
| 8,297,917 | B1 | 10/2012 | Mccune | |
| 8,714,475 | B2 | 5/2014 | Gall | |
| 8,747,055 | B2 | 6/2014 | Mccune | |
| 8,770,922 | B2 | 7/2014 | Mccune | |
| 8,814,503 | B2 | 8/2014 | Mccune | |
| 8,899,915 | B2 | 12/2014 | Mccune | |
| 9,242,721 | B2 | 1/2016 | Neuteboom | |
| 9,567,090 | B2 | 2/2017 | Gallet | |
| 9,631,558 | B2 | 4/2017 | Mccune | |
| 9,759,160 | B2 | 9/2017 | Sankrithi | |
| 10,040,559 | B2 | 8/2018 | Hoisington | |
| 10,301,968 | B2 | 5/2019 | Mccune | |
| 10,392,119 | B2 | 8/2019 | Niergarth | |
| 10,442,541 | B2 | 10/2019 | Miller | |
| 10,669,881 | B2 | 6/2020 | Breeze-Stringfellow | |
| 10,907,495 | B2 | 2/2021 | Breeze-Stringfellow | |
| 11,021,997 | B2 | 6/2021 | Mccune | |
| 11,136,109 | B2 | 10/2021 | Wood | |
| 11,572,827 | B1 * | 2/2023 | Khalid | F02C 3/067 |
| 12,000,344 | B2 | 6/2024 | Levisse | |
| 12,203,418 | B2 | 1/2025 | Ertas | |
| 12,280,883 | B2 * | 4/2025 | Bowden | B64D 27/402 |
| 12,305,579 | B2 | 5/2025 | Taillant | |
| 12,313,081 | B2 | 5/2025 | Frantz | |
| 12,320,305 | B2 | 6/2025 | Martinez Luque | |
| 12,365,446 | B2 | 7/2025 | Carle | |
| 12,365,471 | B2 | 7/2025 | Carle | |
| 12,378,933 | B2 | 8/2025 | Fefermann | |
| 12,384,522 | B2 | 8/2025 | Carle | |
| 12,448,139 | B2 * | 10/2025 | Bowden | B64D 29/02 |
| 2007/0225111 | A1 | 9/2007 | Duong | |
| 2010/0105516 | A1 | 4/2010 | Sheridan | |
| 2012/0119023 | A1 | 5/2012 | Moore | |
| 2013/0067931 | A1 | 3/2013 | Hindle | |
| 2013/0287575 | A1 | 10/2013 | Mccune | |
| 2015/0308351 | A1 | 10/2015 | Sheridan | |
| 2017/0122426 | A1 | 5/2017 | Miller | |
| 2018/0362170 | A1 * | 12/2018 | Stuart | B64D 27/404 |
| 2019/0120363 | A1 | 4/2019 | Grubba | |
| 2019/0185170 | A1 * | 6/2019 | Schelfaut | B64D 27/406 |
| 2020/0003128 | A1 | 1/2020 | Maguire | |
| 2020/0088106 | A1 | 3/2020 | Miller | |
| 2021/0172381 | A1 | 6/2021 | Spruce | |
| 2023/0021836 | A1 | 1/2023 | Riddle | |
| 2023/0212987 | A1 | 7/2023 | Narayanan | |
| 2023/0235715 | A1 | 7/2023 | Mccune | |
| 2024/0410319 | A1 | 12/2024 | Becoulet | |
| 2025/0018895 | A1 | 1/2025 | Howell | |
| 2025/0034565 | A1 | 1/2025 | Bisaria | |
| 2025/0042537 | A1 | 2/2025 | Carle | |
| 2025/0042538 | A1 | 2/2025 | Carle | |
| 2025/0042558 | A1 | 2/2025 | Carle | |
| 2025/0052165 | A1 | 2/2025 | Becoulet | |
| 2025/0075636 | A1 | 3/2025 | Frantz | |
| 2025/0101930 | A1 | 3/2025 | Auriol | |
| 2025/0116203 | A1 | 4/2025 | Olivier | |
| 2025/0129724 | A1 | 4/2025 | Millier | |
| 2025/0137407 | A1 | 5/2025 | Becoulet | |
| 2025/0188951 | A1 | 6/2025 | Lebeault | |
| 2025/0197014 | A1 | 6/2025 | Gea Aguilera | |
| 2026/0015090 | A1 | 1/2026 | Carle | |

FOREIGN PATENT DOCUMENTS

| | | | |
|---|---|---|---|
| FR | 3127025 | A1 | 3/2023 |
| FR | 3129428 | A1 | 5/2023 |
| FR | 3129436 | A1 | 5/2023 |
| FR | 3129690 | A1 | 6/2023 |
| FR | 3129970 | A1 | 6/2023 |
| FR | 3129972 | A1 | 6/2023 |
| FR | 3130313 | A1 | 6/2023 |
| FR | 3130747 | A1 | 6/2023 |
| FR | 3130874 | A1 | 6/2023 |
| FR | 3130875 | A1 | 6/2023 |
| FR | 3130895 | A1 | 6/2023 |
| FR | 3130897 | A1 | 6/2023 |
| FR | 3132729 | A1 | 8/2023 |
| JP | 2004316474 | | 11/2004 |
| WO | 2023037074 | | 3/2023 |
| WO | 2023037075 | | 3/2023 |
| WO | 2025034565 | | 2/2025 |

OTHER PUBLICATIONS

Antonov An-70—Price, Specs, Photo Gallery, History—Aero Corner; https://aerocorner.com/aircraft/antonov-an-70/#lg=1&slide=5; Site was known as early as Dec. 2021; 5 pgs.

Attariwala, Joetey; "Coming to a Theatre near You"; published Feb./Mar. 2016 Issue (Oct. 26, 2017); https://www.armadainternational.com/2017/10/airbus-a400m-strategic-turboprop-freighter-programme/; 9 pgs.

* cited by examiner

AIRCRAFT WITH AN UNDUCTED FAN PROPULSOR

CROSS-REFERENCE TO RELATED APPLICATIONS

This application claims priority to PCT Application No. PCT/US2024/040754, filed Aug. 2, 2024, which claims priority to U.S. patent application Ser. No. 18/230,609, filed on Aug. 4, 2023, and Ser. No. 18/652,052, filed May 1, 2024, the disclosures of which are hereby incorporated by reference in their entireties.

FIELD

The present disclosure relates generally to an aircraft with a fan propulsor.

BACKGROUND

Winged aircraft have mounted propulsors in the form of an unducted fan propulsor (e.g., an open fan configuration). The addition of an unducted fan propulsor to a wing can lead to installation penalties, including increased drag. As the size of the unducted fan propulsor increases, installation penalties can also increase, such as increased weight.

BRIEF DESCRIPTION OF THE DRAWINGS

A full and enabling disclosure of the aspects of the present description, including the best mode thereof, directed to one of ordinary skill in the art, is set forth in the specification, which refers to the appended figures, in which.

Figure 1:
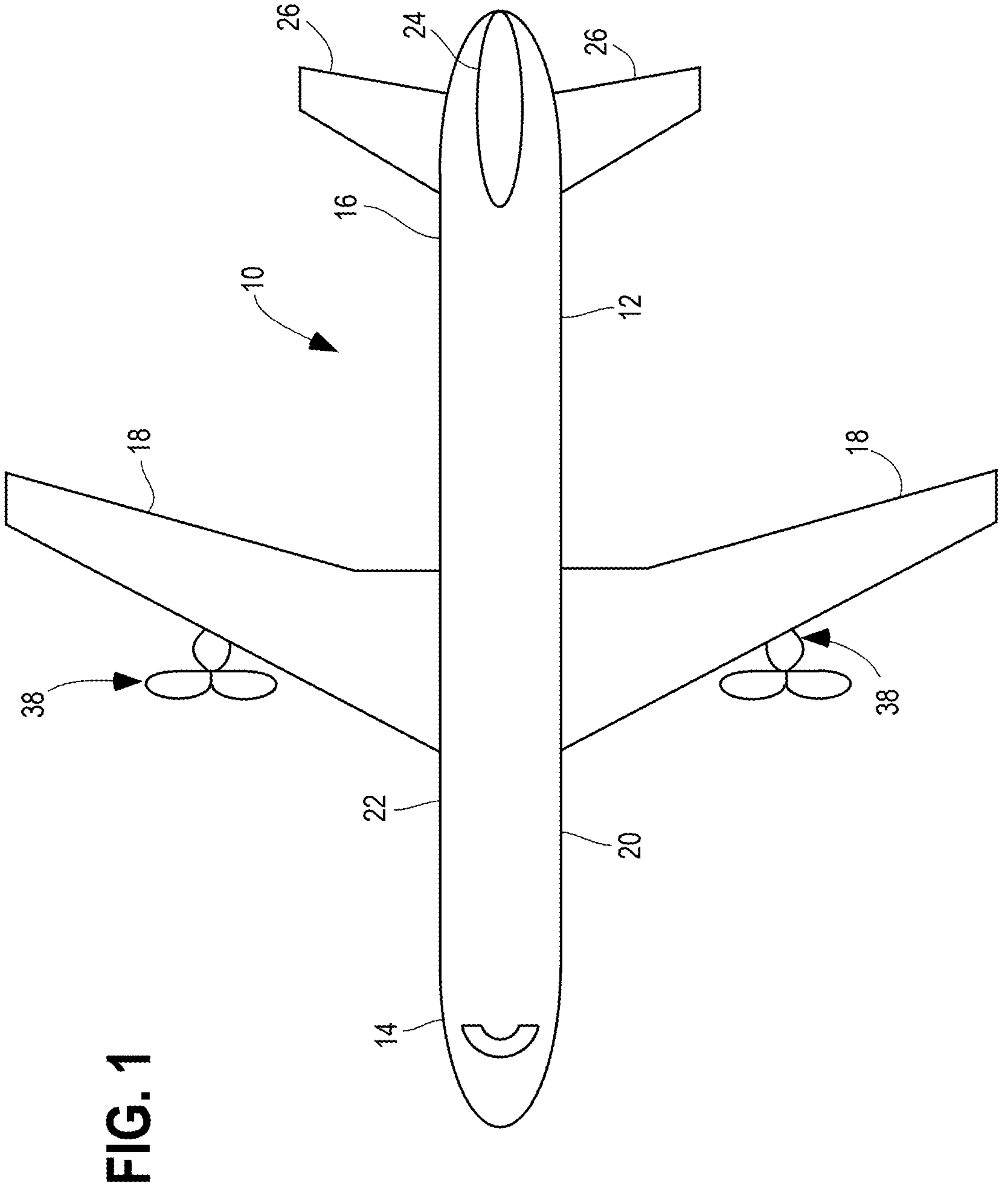
FIG. 1 comprises a top plan view of an aircraft as configured in accordance with various embodiments of these teachings, with undermounted, unducted fan propulsors mounted on forward wings of the aircraft.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Aspects and advantages of the present disclosure will be set forth in part in the following description or may be learned through practice of the present disclosure.

The word "or" when used herein shall be interpreted as having a disjunctive construction rather than a conjunctive construction unless otherwise specifically indicated.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

The term "at least one of" in the context of, e.g., "at least one of A, B, and C" refers to only A, only B, only C, or any combination of A, B, and C.

As used herein, the terms "first," "second," and "third" can be used interchangeably to distinguish one component from another and are not intended to signify location or importance of the individual components.

It should be understood that where numerical ranges are provided, such ranges are intended to include the recited upper and lower limits as well as all subranges and individual values between those limits.

The terms "forward" and "aft" refer to relative positions within an unducted fan propulsor or a gas turbine engine or vehicle, and refer to the normal operational attitude of the unducted fan propulsor or gas turbine engine or vehicle. For example, with regard to an unducted fan propulsor or a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "leading edge" refers to components and/or surfaces which are oriented predominately upstream relative to the fluid flow of the system, and the term "trailing edge" refers to components and/or surfaces which are oriented predominately downstream relative to the fluid flow of the system.

Figure 6A:
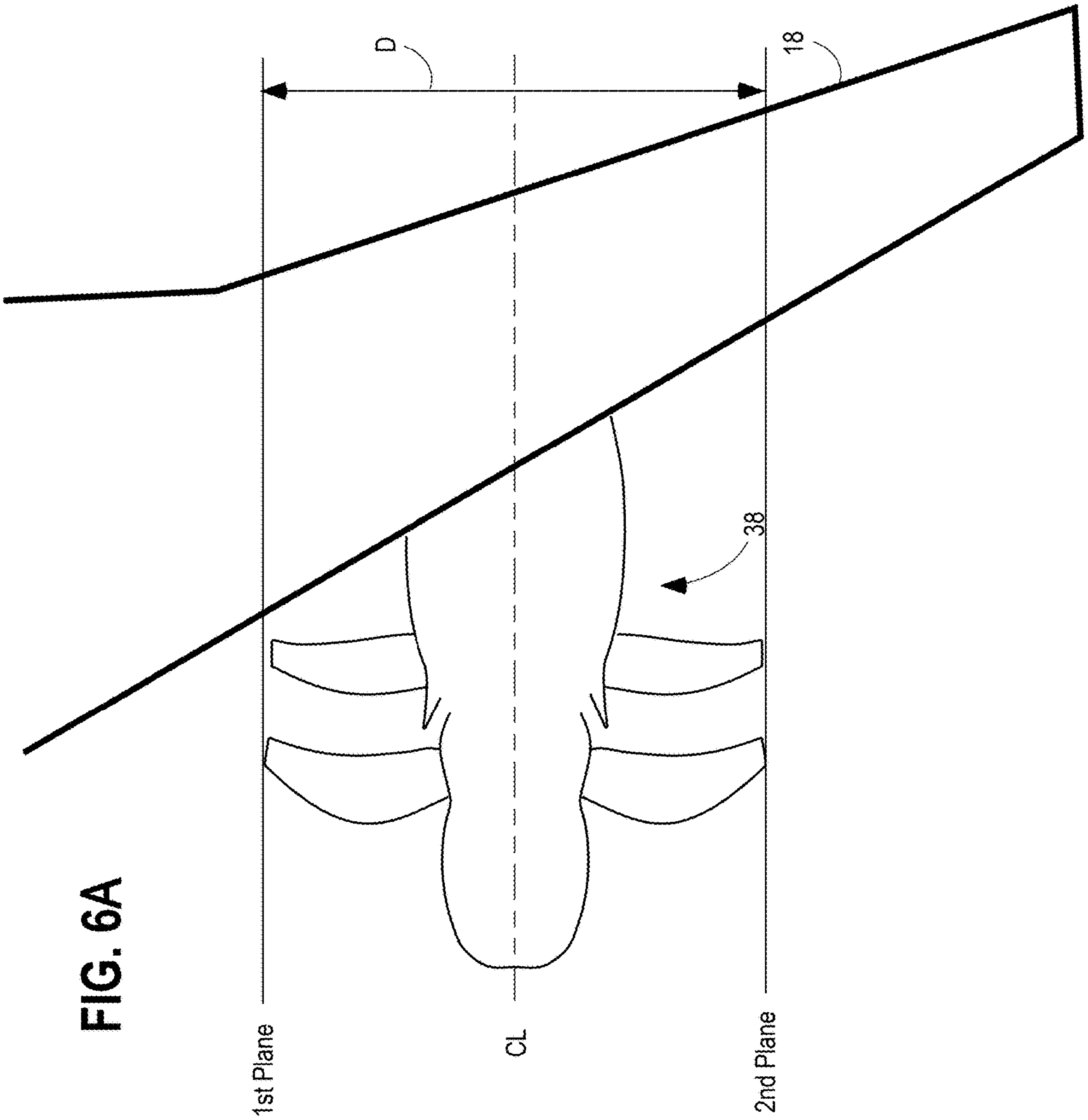
FIG. 6A comprises a top plan view of the propulsor of FIG. 4 and inboard and outboard locations of the wing relative to an unducted fan propulsor centerline, with the inboard and outboard locations in FIG. 6A used to determine a chord length (C) of the airfoil section in FIG. 4.
Figure 6B:
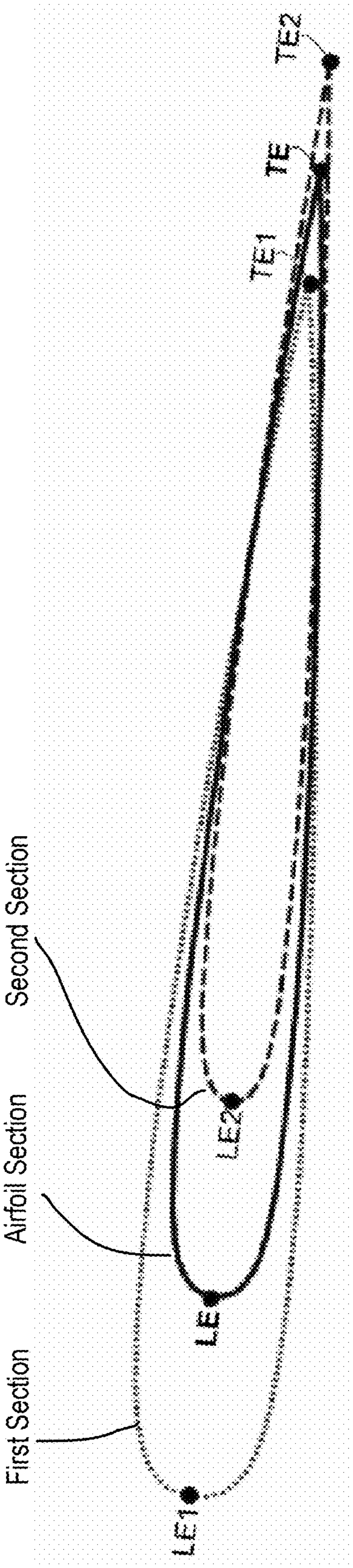
FIG. 6B comprises a schematic side elevation view of a first section and a second section of the aircraft wing, which sections are used to determine an effective quarter chord point (QC) of the airfoil section in FIG. 4.

"Airfoil section" is defined as the average of a first offset plane section and a second offset plane section of an airfoil (e.g., an airfoil associated with a horizontal stabilizer or wing of an aircraft), where the first offset plane section is the section of the airfoil taken at a first plane and the second offset plane section is the section of the airfoil taken at a second plane, the first and second planes each being offset in a direction perpendicular to, and equidistant from a central plane by a distance of ½ of a fan diameter (D) of rotating blades of a propulsor mounted to the portion of the aircraft body associated with the airfoil section (wing or horizontal stabilizer). The first plane is inboard of the central plane (towards the fuselage) and the second plane is outboard of the central plane. When the aircraft is on the ground, both the gravity vector and axis of rotation of the rotating blades lie in the central plane. The intersection of the first offset plane with the airfoil defines a first section having a first section leading edge (LE1) and a first section trailing edge (TE1), with the LE1 at the forward-most point of the first section and the TE1 at the aft-most point of the first section. The intersection of the second offset plane with the airfoil defines a second section having a second section leading edge (LE2) and a second section trailing edge (TE2), with the LE2 at the forward-most point of the section and the TE2 at the aft-most point of the second section. Averaging the coordinates of LE1 and LE2 yields a representative LE location for the airfoil section. Averaging the coordinates of TE1 and TE2 yields a representative TE location for the airfoil section. The LE and TE points obtained this way are indicated in FIG. 6B. An "Airfoil Section" defined herein has its leading and trailing edges TE, LE determined in this manner.

"Effective Quarter-chord point" ("QC") is defined as ¼ of the distance from the leading edge LE of the airfoil section determined in the foregoing manner, measured along the chord of this airfoil section. QC is dependent on the fan diameter (D) because the airfoil section LE and TE values change if D for the unducted fan propulsor changes.

"Positioning line (R)" refers to the line extending from the effective quarter-chord point (QC) of an airfoil section to the point (P) on the centerline of the unducted fan propulsor, as defined herein. The geometry of R, including its length RL normalized by fan diameter D and its angle $\theta$, characterizes the relative placement of the unducted fan propulsor. In some embodiments, placement can alternatively be defined with respect to an Ellipse Origin Positioning Line (EOR), as described herein.

"Ellipse Origin Positioning Line (EOR)" refers to an alternative placement-defining line extending from an ellipse origin point (EOP) to the point (P) on the centerline of the unducted fan propulsor. The ellipse origin point (EOP) is defined based on the effective quarter-chord point (QC) of an airfoil section, wherein the QC serves as a focus of an ellipse and the line HP passing through point P defines an axis of the ellipse. The geometry of the EOR, including its length normalized by fan diameter (D) and its angle $\theta$ measured relative to the ellipse axis, characterizes an alternative form of propulsor placement.

"Cruise Speed" refers to aircraft speed and applies to a vehicle with a cruising altitude up to approximately 65,000 ft. In certain embodiments, cruise altitude is between approximately 28,000 ft. and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure can be adjusted based on a different reference sea level pressure and/or sea level temperature.

It is understood that the plurality blades, whether forward or rearward, can have a variation of root forward-most points and root rearward-most points. This can be due to both installed position as well as orientation in the case of variable pitch blades. For purposes of defining the distances total root length (TRL), root length (RTL), and vane root length (VTL) it is understood that a rotating blade or rotating array of blades are orientated such that the respective leading edges of the blades are in their most forward position, e.g., a feathered position. The respective trailing edge position is also obtained when the leading edge is in the most forward position. For purposes of defining the distances TRL, RTL, and VTL it is understood that the forward or leading edge or rearward or trailing edge of a stationary blade (or vane) or array of stationary blades (or vanes) is the most forward or leading edge position across the array of vanes or the most rearward or trailing edge position across the array of vanes.

"Blade" can refer to a stationary or rotating blade. "Stationary blade(s)" has the same meaning as "vane(s)."

Figure 3:
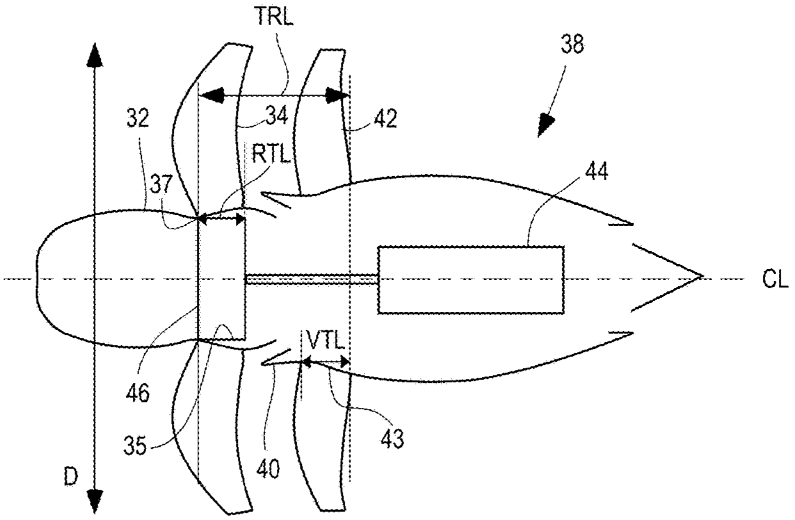
FIG. 3 comprises an elevational cross-sectional view of an exemplary unducted fan propulsor having a plurality of blades arranged in a forward array and a rearward array.

"Unducted fan propulsor" as used herein means an aircraft engine characterized by an array of rotating fan blades and static (or non-rotating), outlet guide vanes (OGV) aft of the array of rotating fan blades, or an array of rotating fan blades and static, unducted inlet guide vanes (IGV) forward of the rotating fan blades. In either case, neither the fan blades nor the IGV or OGV is surrounded by a duct or fan nacelle. FIGS. 3 and 12, for instance, depict unducted fan propulsors. Additionally, the term unducted fan propulsor means an unducted, fan driven aircraft engine capable of providing thrust to an aircraft to enable cruise flight speeds between 0.7 Mach and 0.90 Mach, or 0.75 to 0.85 Mach.

"Aircraft" means a vehicle having a wing (and/or horizontal stabilizer), an airfoil defined by the wing (and/or horizontal stabilizer), and one or two unducted fan propulsors mounted to the wing, and the aircraft is operable at cruise flight speeds between 0.7 Mach and 0.90 Mach, or 0.75 to 0.85 Mach.

"Fuselage centerplane" ("FCP") is defined as a plane that is located equidistant from the wingtips, intersecting the fuselage, and containing the gravity vector when the aircraft is on the ground.

Figure 18A:
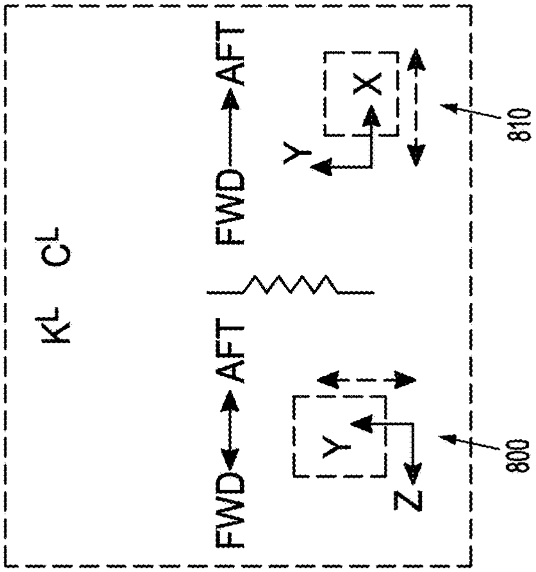
FIG. 18A comprises a schematic of degrees of freedom of lateral stiffness.

The terms "lateral stiffness" and "lateral structural stiffness" are used interchangeably and refer to the stiffness of a component having degrees of freedom in the lateral and the radial directions. That is, the stiffness of a component in the radial direction (direction Y in FIGS. 12 and 18A) and the lateral direction (direction X in FIG. 18A; into and out of the page in FIG. 12). The lateral stiffness is defined as shown in FIG. 18A. The lateral stiffness is identified herein as $K^L$.

Figure 18B:
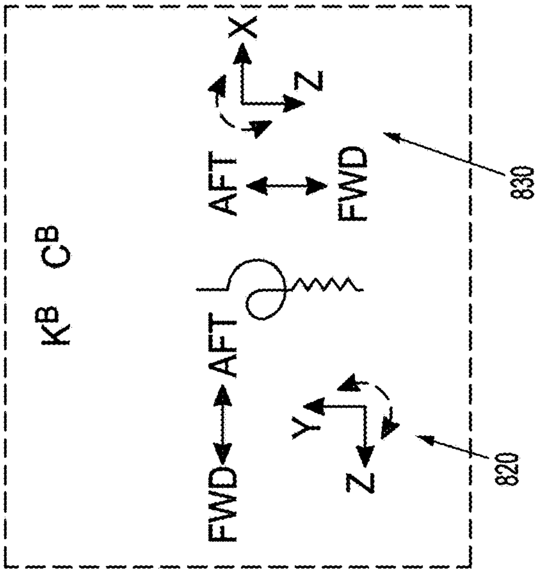
FIG. 18B comprises a schematic of degrees of freedom of bending stiffness.

The terms "bending stiffness" and "bending structural stiffness" are used interchangeably and refer to the stiffness of a component having degrees of freedom in the pitch and the yaw directions. That is, the stiffness of a component in the pitch direction (about the Y and Z plane in FIG. 18B) and the yaw direction (about the Z and X plane in FIG. 18B). The bending stiffness is defined as shown in FIG. 18B. The bending stiffness is identified herein as $K^B$.

The term "casing" herein refers to the structure that defines an airflow path (e.g., wall of duct, or casing). A mounting to the casing can be a direct bolted connection or through a load bearing frame.

A "static structure" as herein referred means any structural part of an engine (e.g., an unducted fan propulsor) that is non-rotating.

Figure 18C:
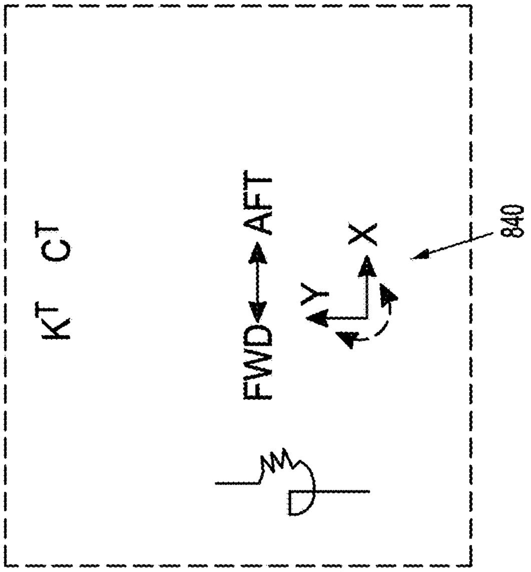
FIG. 18C comprises a schematic of degrees of freedom of torsional stiffness.

The terms "torsional stiffness" and "torsional structural stiffness" are used interchangeably and refer to the stiffness of a component having degrees of freedom in the torsional or rotational direction about an engine centerline (about the X and Y plane in FIG. 18C, about the engine centerline). The torsional stiffness is defined as shown in FIG. 18C. The torsional stiffness herein is identified as $K^T$.

The term "lateral damping" refers to the structural damping of a component in the lateral direction at a frequency of vibration. The lateral damping is identified herein as $C^L$.

The term "bending damping" refers to the structural damping of a component in the bending direction at a frequency of vibration. The bending damping is identified herein as $C^B$.

The term "torsional damping" refers to the structural damping of a component in the torsional or rotational direction at a frequency of vibration. The torsional damping is identified herein as $C^T$.

"Drive system" as used herein refers to the components configured to transfer torque between a turbine shaft and a fan of an unducted fan propulsor, including a gearbox assembly (e.g., planetary or star configuration), shafts, couplings, and mounting members supporting a power gearbox assembly coupling a low pressure turbine shaft to fan shaft. The gearbox assembly may be arranged in one of a planetary configuration, a star configuration, a compound star configuration and a reversing compound star configuration.

"Mounting member" as used herein refers to any structural element that couples a drive system (e.g., a power gearbox assembly) to a static or dynamic structure of the engine. Mounting members can include, without limitation, flex mounts, flex couplings, fan frames, bearings, or other structural supports designed to transfer loads between the drive system and surrounding engine or airframe structure. Mounting members are characterized by stiffness and damping properties in lateral, bending, and torsional degrees of freedom, which can be represented as a structural impedance between a main load bearing frame and power gearbox housing.

"Characteristic" as used herein with respect to a mounting member refers a property that defines the structural and dynamic behavior of the mounting member. Such characteristics can include, without limitation, stiffness (e.g., lateral, bending, torsional), damping (e.g., lateral, bending, torsional), impedance parameters, impedance parameter ratios, material properties, geometric configuration, or combinations thereof.

"Impedance Parameter" as used herein refers to a dynamic property of a mounting member defined in terms of its structural stiffness (K) and damping (C), including structural or hysteretic damping. Impedance Parameters can be defined separately for lateral, bending, and torsional degrees of freedom. As used herein, "damping" refers to the structural or hysteretic damping of a component, unless otherwise specified. Thus, general references to stiffness and damping are intended to encompass hysteretic damping as described in greater detail below.

"Impedance Parameter Ratio (IPR)" refers to a ratio of impedance parameters that characterizes relative dynamic properties. In some examples, an IPR can compare impedance parameters of different mounting members (e.g., flex mount vs. fan frame). In other examples, an IPR can compare impedance parameters within a single mounting member across different degrees of freedom (e.g., torsional vs. lateral impedance of a flex mount).

"Gearbox assembly alignment" as used herein refers to maintaining the relative positioning of gears, shafts, and bearings within the gearbox assembly such that torque is transmitted without excessive misalignment, edge loading, or distortion of the geartrain, and remains within operational tolerances under static and dynamic loading conditions.

"Forward engine mount" as used herein refers to a structural support, such as a pylon, that supports an unducted fan propulsor from a wing. The forward engine mount includes a forward end and a rearward end. The forward end may be adjacent to, aligned with, or positioned forward of at least one of the gearbox assembly, one or more mounting members, or the rearward array of blades. A forward engine mount located adjacent to, or aligned with the gearbox mounting members to a fan frame serves to provide a more direct support for the main load-bearing portions of the fan frame while minimizing dynamic loads passing through the gearbox or causing significant deflections of the gearbox assembly, e.g., as during a hard landing.

As used herein, the term "adjacent" refers to a placement within a specified percentage of a referenced dimension of the unducted fan propulsor or a subcomponent thereof. Unless otherwise specified, adjacent is understood in axial terms relative to the overall length of the propulsor. In some aspects, adjacent refers to within about 1, 2, 3, 4-6 2-10% of the overall axial length of the propulsor.

Approximating language, as used herein throughout the specification and claims, is applied to modify any quantitative representation that could permissibly vary without resulting in a change in the basic function to which it is related. Accordingly, a value modified by a term or terms such as "about," "approximately," and "substantially," are not to be limited to the precise value specified. In at least some instances, the approximating language can correspond to the precision of an instrument for measuring the value, or the precision of the methods or machines for constructing or manufacturing the components and/or systems. For example, the approximating language can refer to being within a 10 percent margin.

As used herein, the term "center of mass" refers to the weighted average location of mass for the unducted fan propulsor or subassembly thereof, such that the propulsor would balance at that point under uniform gravity. Unless otherwise specified, center of mass is determined along the principal axis of rotation of the propulsor Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "proximate" refers to being closer to one side or end than an opposite side or end.

The inventors were faced with a problem of how to improve thrust delivered to an aircraft by an unducted fan propulsor without increasing the required engine power delivered to the unducted fan of the unducted fan propulsor.

It was surprisingly found that the solution to this problem is heavily dependent on the location of the unducted fan propulsor relative to the aircraft wing.

The inventors found that installing an unducted fan propulsor presents the challenge of addressing penalties that can result due to the interaction with the rest of the aircraft. The manner in which these penalties are addressed according to the claimed subject matter is unique for this type of engine.

An unducted fan propulsor is particularly challenged due to the scrubbing and interference drags relative to a ducted turbofan. That additional drag then results in a higher thrust needed from the propulsor. Generally, higher thrust for a ducted turbofan comes with a larger power requirement and thus more fuel flow. For the unducted fan propulsor it was surprisingly found by placing the engine so that it can take advantage of the high pressure flow induced by the wing (and/or a horizontal stabilizer), engine thrust can increase without increasing the power requirement on the engine. This placement of the engine relative to the wing then acts to offset the scrubbing and interference drag, thus not increasing the required fuel (or reducing the increased fuel flow required for a non-optimum engine placement). The inventors found that increased drag effects associated with an unducted fan propulsor, rather than addressed directly, can instead be offset by placing the engine at a more optimal location relative to the wing.

Additionally, the inventors found that the installed engine's improved position also positively influences the noise produced by the wing-engine interaction during flight at cruise conditions.

It was surprisingly found that by adapting a particular location on an unducted fan propulsor relative to an aircraft wing's effective quarter chord point (QC), the desired result of offsetting interference and scrubbing drag without increasing the power delivered to the fan could be achieved for an unducted fan propulsor.

It was also found that the improved position is dependent on the fan blade size of the unducted fan propulsor.

As explained below, after recognizing the novel flow characteristics associated with an unducted fan propulsor installed on an aircraft, taking into account the limitations on where to place this propulsor, the inventors were surprisingly able to establish criteria for positioning the propulsor relative to an aircraft wing to offset interference and scrubbing effects by defining a midpoint (P) location between external output guide vanes (OGV) or input guide vanes (IGV) and a forward or aft rotating array of fan blades, respectively, and additionally defining the distance from the effective quarter chord point (QC) to P. The position of P relative to QC and QC itself were found dependent on the rotating fan diameter. The correlation of these parameters to offset interference and scrubbing effects was not used before and was the surprising finding of the inventors for an unducted fan propulsor. Thus, mounting unducted fan propulsors relative to the effective quarter-chord point (QC) and fan blade size as described in embodiments provided herein offsets interference and scrubbing effects associated with an unducted fan propulsor and is an improvement over other mounting locations, including conventional mounting locations that are more forward of, and more in line with, a wing chord line.

Various aspects of the present disclosure describe aspects of an aircraft characterized in part by a specific relation between an effective quarter chord point (QC) of an airfoil section associated with a wing (or horizontal stabilizer) and the unducted fan propulsor, which is believed to result in improved aircraft performance and/or fuel efficiency. According to the disclosure, an aircraft includes a fuselage and an unducted fan propulsor installed relative to a section of the wing or the horizontal stabilizer.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Figure 2:
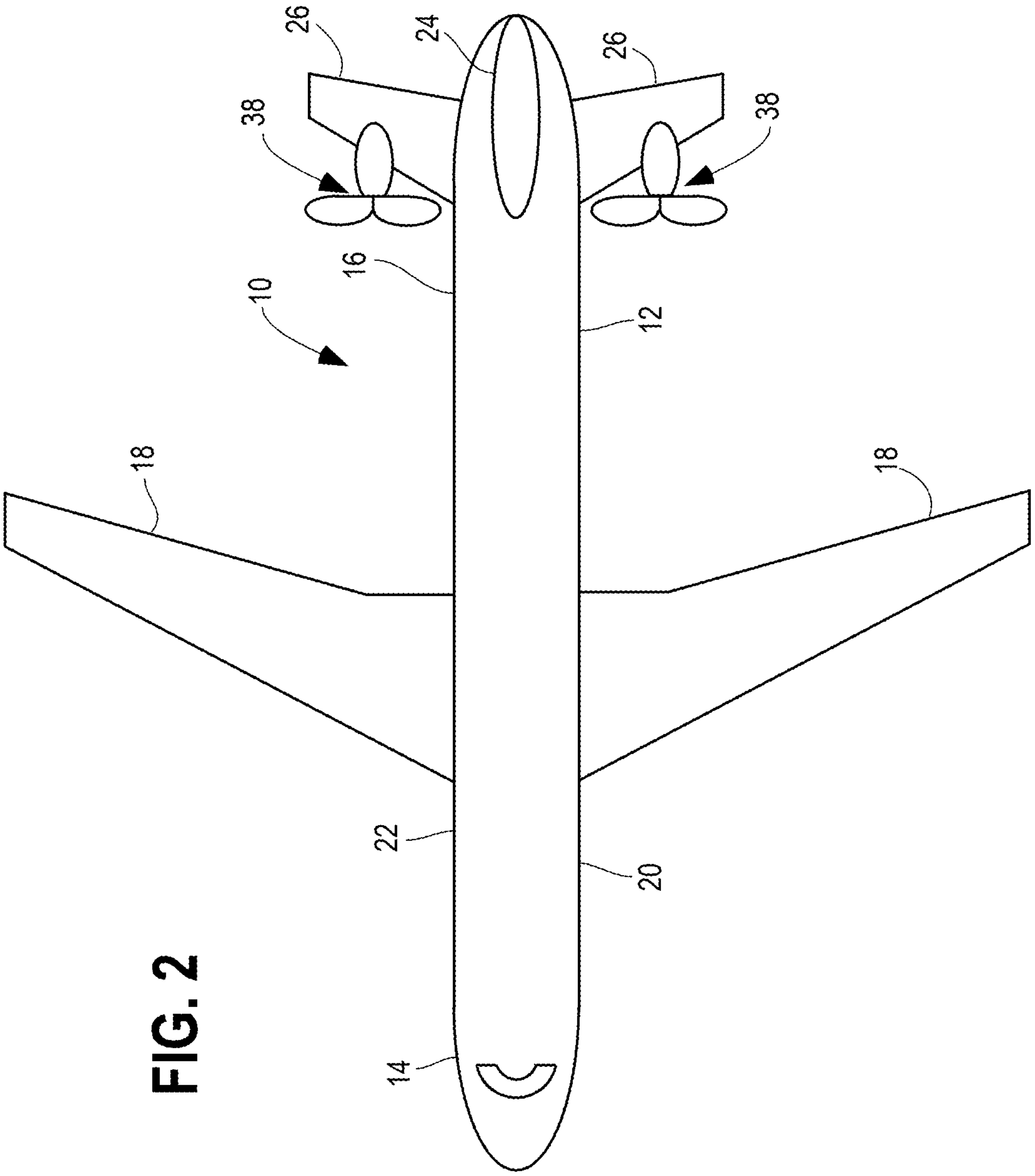
FIG. 2 comprises a top plan view of an aircraft as configured in accordance with various embodiments of these teachings, with unducted fan propulsors mounted on top of horizontal stabilizers of the aircraft.

As shown in FIGS. 1 and 2, the aircraft 10 includes a fuselage 12 that extends longitudinally from a forward or nose section 14 and an aft or tail section 16 of the aircraft 10. The aircraft 10 further includes airfoils including a first wing 18 that extends laterally outwardly from a port side 20 and a second wing 18 that extends laterally outwardly from a starboard side 22 of the fuselage 12. The tail section 16 of the aircraft 10 includes a vertical stabilizer 24, a first airfoil of the horizontal stabilizer 26 that extends laterally outwardly from the port side 20, and a second airfoil of the horizontal stabilizer 26 that extends laterally outward from the starboard side 22 of the fuselage 12. An unducted fan propulsor 38 is undermounted relative to each of the wings 18, as shown in the embodiment of FIG. 1. Alternatively, the unducted fan propulsor 38 is mounted relative to the top of each of the horizontal stabilizers 26, as shown in FIG. 2. In some embodiments, more than one of the unducted fan propulsors 30 or 38 can be mounted to each of the wings 18 or each of the horizontal stabilizers 26.

FIG. 3 shows an elevational cross-sectional view of an embodiment of one of the unducted fan propulsors 38. As is seen from FIG. 3, the unducted fan propulsor 38 takes the form of an open fan propulsion system and has a rotating element in the form of rotatable propeller assembly 32 on which is mounted a first array of blades 34 around a centerline (CL) of the unducted fan propulsor 38. The first array of blades 34 defines a diameter D representing the tip-to-tip diameter of the blades and a maximum radial extent from CL. This diameter D is measured along a radial direction perpendicular to CL. The unducted fan propulsor 38 of FIG. 3 includes a second array of blades or vanes, which are non-rotating or static. In some embodiments, a non-rotating stationary element in the form of vane assembly 40 includes an array of vanes 42 disposed around CL.

Each of the blades 34 has a root 35 where the blade 34 is attached to the rotatable propeller assembly 32, and each blade 34 defines a root length (RTL). The root length (RTL) is defined as the axial extent (in a direction parallel to CL) from the radially innermost leading edge (LE) of the blade 34 airfoil, e.g., closest to CL, to the axial location of the radially innermost trailing edge (TE) of the blade 34 airfoil.

Figure 4:
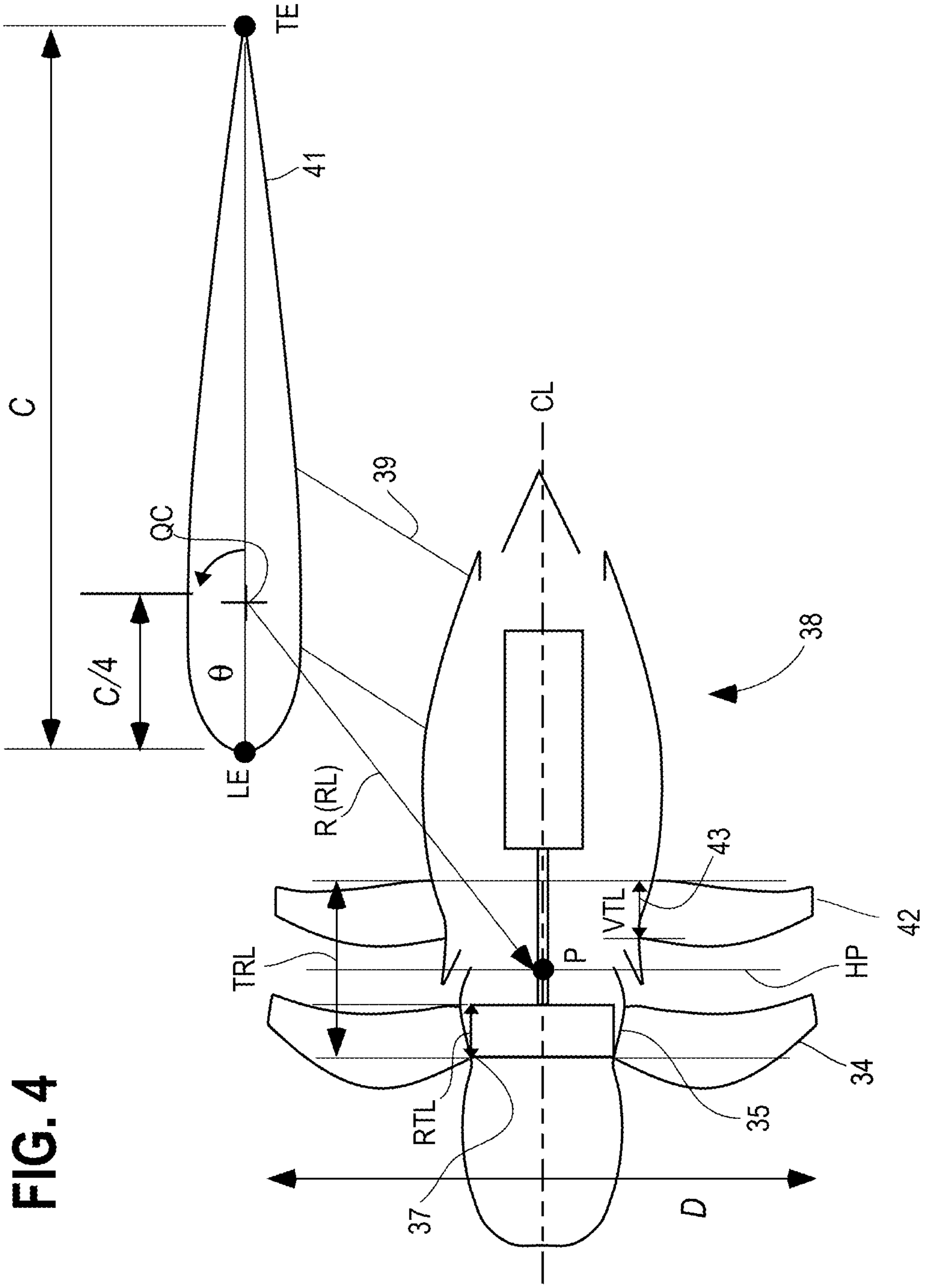
FIG. 4 comprises a schematic side elevation view showing the location of the unducted fan propulsor of FIG. 3 relative to an airfoil section.

Each of the vanes 42 also has a root 43 with a vane root distance VTL where the vane 42 is attached to the non-rotating vane assembly 40. The total root length (TRL) is the distance between the leading edge (LE) of the blade 34 airfoil (radially nearest to CL) of the blades 34 and the trailing edge (LE) of the root 43 of the vanes 42, as shown in FIGS. 3 and 4. TRL is a measured axial distance from the radial innermost LE of the foremost row of blades/vanes and the trailing edge (TE) of the vanes 42. In some embodiments, the second array can instead be a second rotating elements and the TRL is the measured axial distance from the radially innermost LE of the blades 34 of the first rotating element and the TE of the root of the blades of the second rotating elements. In some embodiments, the vanes 42 can be forward of the rotating blades, and the TRL is the distance between the LE edge of the root of the vanes and the TE of the root of the rotating blades. In some embodiments, an unducted fan propulsor having rotating elements (e.g., rotating blades) and stationary elements (e.g., vanes) can be mounted according to the relationship described in the present disclosure. In unducted fan propulsors having multiple rows of blade and/or vanes, the TRL of an unducted fan propulsor is defined as the distance between the LE of the root of the foremost row of blades/vanes and the rearward edge of the root of the aftmost row of blades/vanes of the unducted fan propulsor.

Referring to FIG. 4, for purposes explained later, the unducted fan propulsor 38 has a point P. For the unducted fan propulsor 38 with a first array of blades or vanes 34 and a second array of blades or vanes 42, as shown in FIGS. 3 and 4, the point P is located at the intersection of CL and a line HP perpendicular to CL and that passes through an axial midpoint of the total root length TRL between a forward end at the root of one of the blades 34 of the forward array and a rearward end at the root of one of the blades 42 of the rearward array when aligned with the one of the blades 34 of the forward array, as shown in FIG. 6. Either the forward or rearward array can be vanes or blades. In other words, the line HP is located equidistant from a forward end of the root of one of the forward vanes or blades 34 and a rearward end of the root of one of the rearward blades or vanes 42. The TRL of an unducted fan propulsor is defined as the distance between the LE of the root of the forward row of blades/vanes and the rearward edge of the root of the aftmost blade/vane.

Referring again to FIG. 3, the exemplary unducted fan propulsor 38 includes a drive mechanism 44 that provides torque and power to the propeller assembly 32 through a transmission 46. The drive mechanism 44 can be a gas turbine engine and associated transmission 46. Transmission 46 delivers torque from the drive mechanism 44 to the propeller assembly 32. The transmission system can be configured as a direct drive engine, transferring power from a power turbine or low pressure turbine (LPT) to the propeller assembly, or an indirect drive system where torque from the LPT is transferred to the propeller assembly 32 through a gearbox assembly. The gearbox assembly reduces a rotation speed of the drive shaft to match a desired rotational speed for the propeller assembly 32. The gas turbine engine includes in serial order a compressor, combustor, high pressure turbine and the LPT. In other embodiments the drive mechanism can generate power partially or fully by an electric motor. In the former case, the drive mechanism is a hybrid electric drive mechanism including a gas turbine engine where a drive shaft includes an electric motor-generator for generating torque. In the latter case, the drive mechanism is an electric motor.

The unducted fan propulsor 38 is attached relative to the wings 18 or horizontal stabilizer 26 through one or more intermediate components or features, e.g., a pylon 39, as shown in FIG. 4.

Each of the wings 18 shown in FIG. 1, and horizontal stabilizers 26 shown in FIG. 2, has an airfoil section 41 associated with it, where the airfoil section 41 is defined above.

As depicted in FIG. 4, a chord line C of the airfoil section, length C as shown, is a straight line extending from LE to TE of the airfoil section (it will be understood that the airfoil section as shown and defined herein is not meant to indicate any particular camber associated with an aircraft wing). The effective quarter-chord point (QC) of the airfoil section is located on the chord line. QC is located at a distance of C/4 from the LE of the airfoil section 41.

Figure 5B:
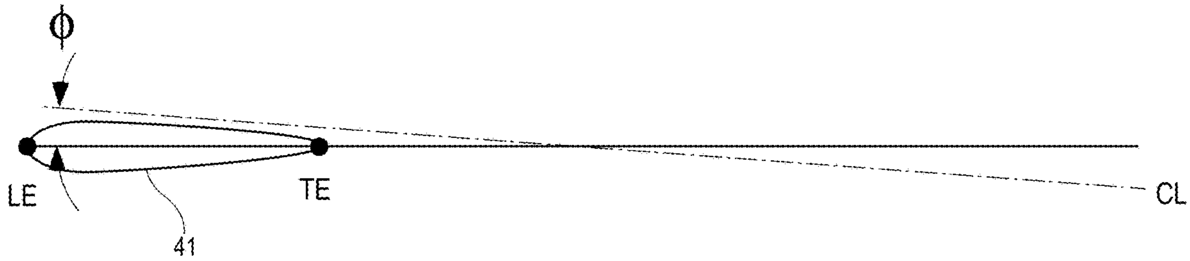
FIG. 5B defines a pitch angle Φ for the unducted fan propulsor relative to a chord line of the airfoil section in FIG. 4.
Figure 5A:
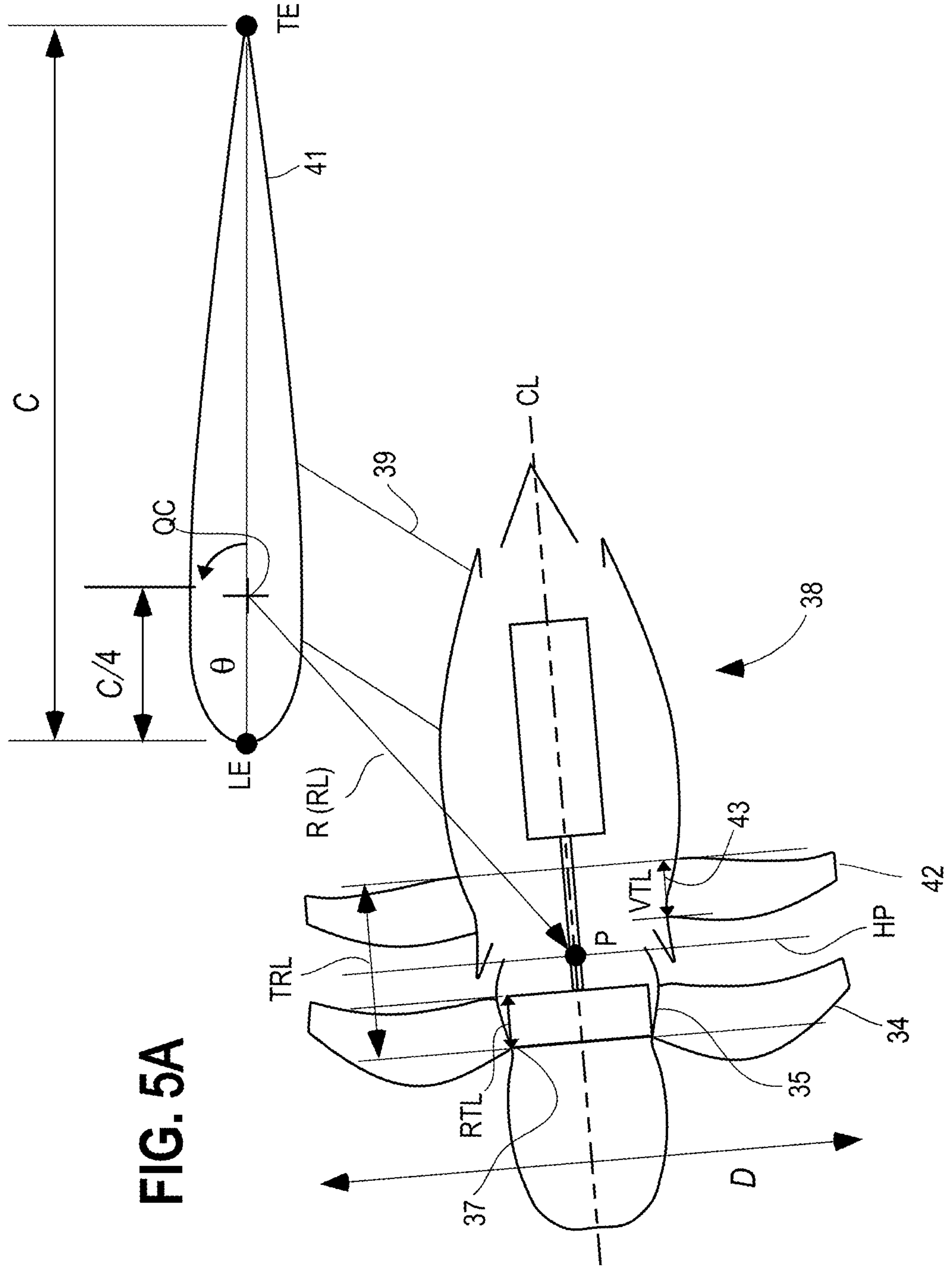
FIG. 5A is a schematic side elevation view similar to FIG. 4 and showing the unducted fan propulsor pitched downward relative to the airfoil section.

As shown in FIG. 4, the CL of the propulsor 38 and the chord line C are parallel to each other, corresponding to a zero pitch of the propulsor relative to the chord line C. The propulsor 38 can be pitched at different angles relative to the chord line, such as pitched downward as shown in FIG. 5A. FIG. 5B defines a pitch angle Φ for the propulsor 38, which is the angle spanned between the propulsor centerline CL and chord line C. Positive pitch corresponds to a clockwise rotation of CL relative to C. The pitch angle Φ can be fixed or variable during flight. For underwing installations, the pitch angle Φ can vary between −5 and +2 degrees, or it can vary between −3 and 0 degrees. During cruise conditions, propulsor pitch and toe angle (FIG. 6E, defined below) provide for an improved installed aerodynamic performance for the unducted fan propulsor in terms of reduced cabin noise and reduced off-axis loading of the unducted fan propulsor's drive shaft. For aft horizontal stabilizer or aft fuselage installations, the angle Φ can vary between −2 and +5 degrees to more align with downwash created by the wing.

The position of the open fan propulsor 38 is defined relative to QC. The airfoil section, as defined above, is the average of a first offset plane section and a second offset plane section of the airfoil (of the wing), where the first offset plane section is the section of the airfoil taken at a first plane and the second offset plane section is the section of the airfoil taken at a second plane, the first and second planes being offset in a direction perpendicular to, and equidistant from a central plane by a distance of ½ the maximum fan diameter (D) for the rotating blades, as shown in FIG. 6A. Both the gravity vector and axis of rotation of the rotating blades of the propulsor lie in this central plane when the aircraft is on the ground.

Figure 6C:
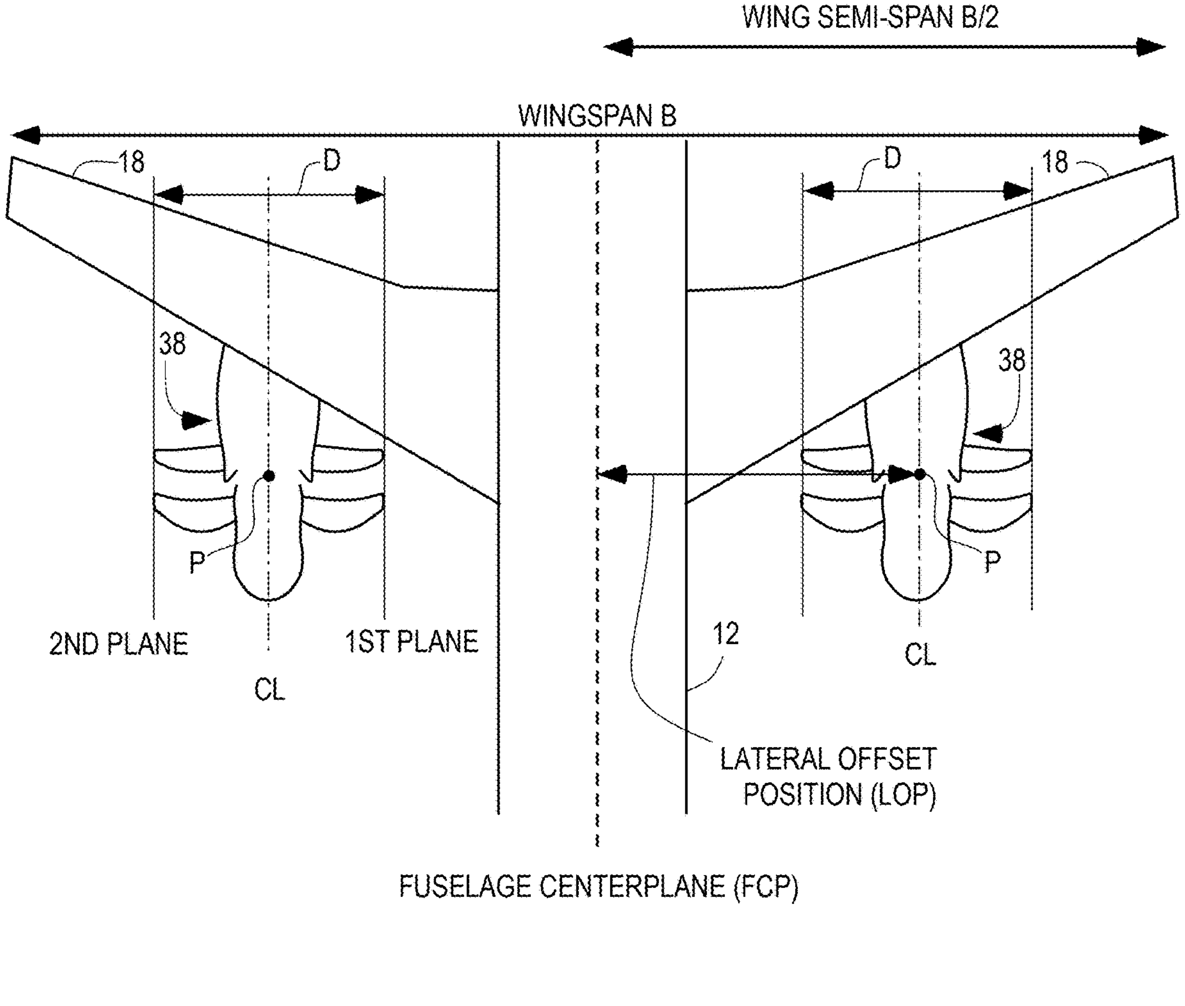
FIG. 6C comprises a schematic top plan view of a portion of an aircraft having a pair of wings extending from the fuselage with the propulsor of FIG. 3 mounted relative to each of the wings.

Referring to FIG. 6C, the propulsor 38—specifically, point P of the propulsor 38—has a spanwise location laterally offset from the fuselage centerplane (FCP) relative to the aircraft's wingspan B. P has a laterally offset position (LOP) between 10% and 80%, 20% and 40%, or between 25% and 35% of B/2 measured from the fuselage centerplane (FCP), as defined above. The location of P is also chosen to avoid interference with the fuselage or an adjacent propulsor if more than one propulsor is mounted relative to the wing. For an aft fuselage installation, the LOP of the propulsor will be closer to the fuselage, but far enough away from the fuselage's boundary layer to reduce or avoid undue interaction with the fuselage boundary layer.

Figure 6D:
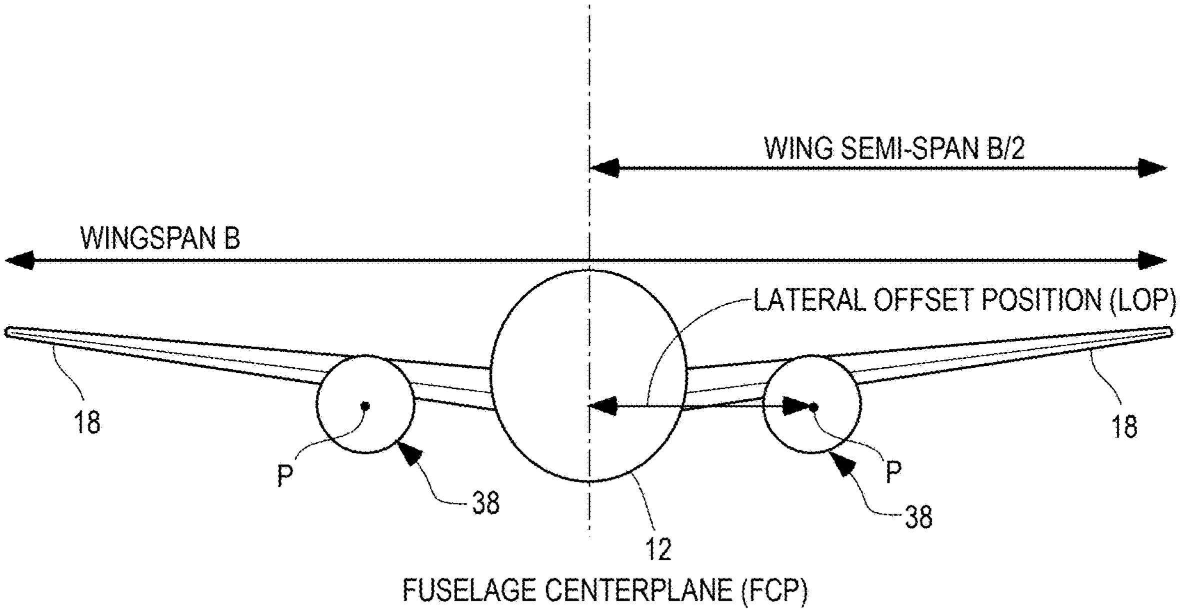
FIG. 6D comprises a schematic front elevation view of the aircraft portion of FIG. 6C.
Figure 6E:
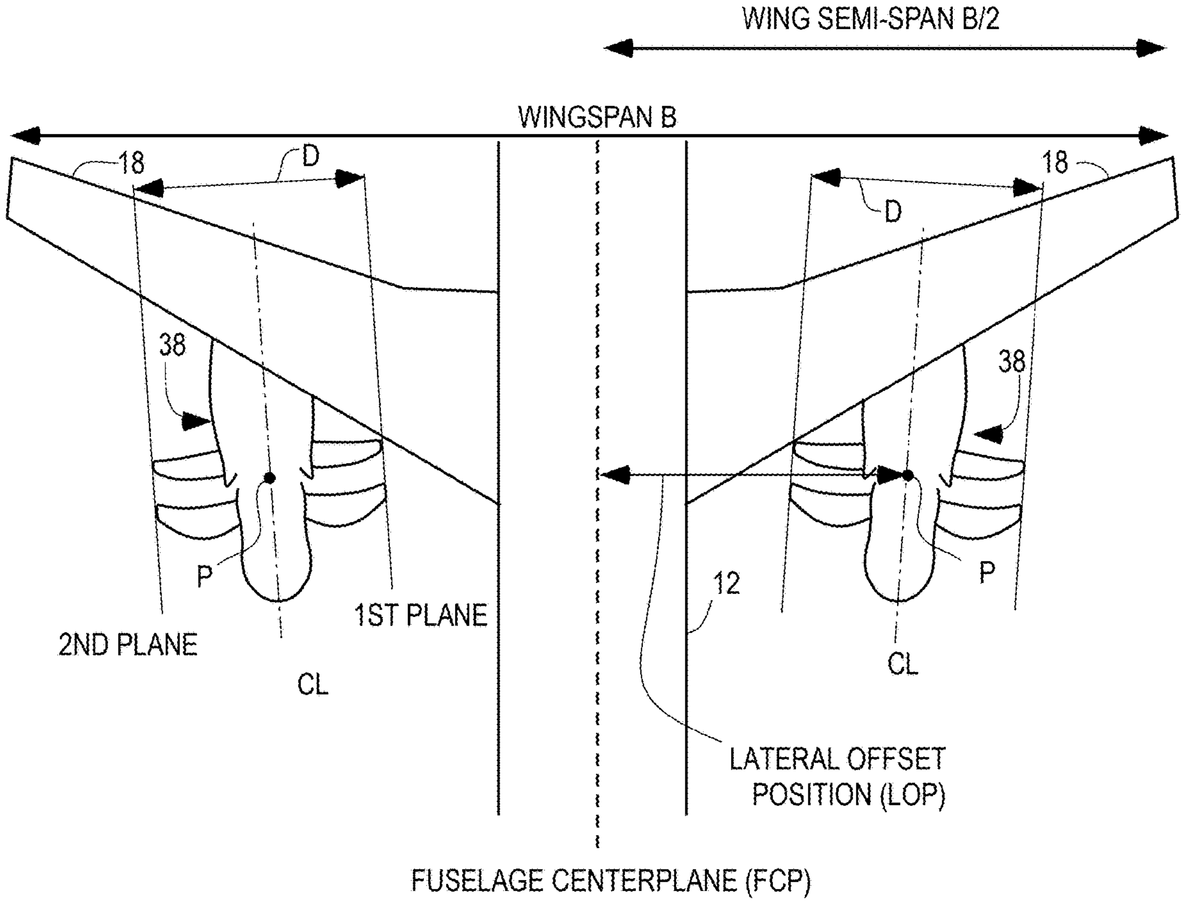
FIG. 6E comprises a schematic top plan view of a portion of an aircraft having a pair of wings extending from the fuselage with the propulsor of FIG. 3 mounted relative to each of the wings, similar to FIG. 6C but showing the propulsors toed inwardly toward the fuselage.

As shown in FIG. 6C, the propulsor centerline CL and the fuselage centerplane (FCP) can be orientated parallel to each other. Referring to FIG. 6D, other angles between propulsor centerline CL and the fuselage centerplane (FCP) are contemplated. For an underwing mounted propulsor, the toe angle can provide added benefit when positive (i.e., the rotor toed-in towards the fuselage with the forward end of the propulsor 38 being more inboard than the aft end). The propulsor can have an inward toe angle of between 0 and 5 degrees, or between 1 and 3 degrees.

There are specific locations that the inventors have found to be advantageous to position the unducted fan propulsor 38 to generate increased or more efficient thrust using higher pressure air flow, in order to offset the scrubbing and interference drag. The higher pressure air flow can be beneath the wings 18. In the case of a horizontal stabilizer 26, the higher pressure air flow is above the horizontal stabilizer 26. Accordingly, the high-pressure side of an airfoil can refer to the underside of a wing 18 or the top side of a horizontal stabilizer 26.

The aircraft described herein has a fuselage, wings and/or stabilizers, and two or more unducted fan propulsor systems (or propulsors). The unducted fan propulsor system, which is mounted on the pressure side of a wing or horizontal stabilizer, provides thrust to the aircraft.

To improve upon what the propulsor system can deliver, there often is a need to make compromises to other parts of aircraft design (trade-offs). Stated another way, the benefits of an unducted fan propulsor cannot be viewed without consideration of the effect of placement of the propulsor on the aircraft. Placement relative to a wing's quarter chord point can increase the total forces acting on the gearing assembly, as well influencing loads on and sizing of the pylon, wing structural loads, landing gear length and associated forces, and overall aircraft weight and cost.

The teachings described below enable improved balancing of the tradeoffs required in the aircraft design while positioning the unducted fan propulsor relative to the airfoil section's effective quarter chord point QC to offset scrubbing and interference drag loses.

Referring to FIG. 4, the location of an unducted fan propulsor relative to an airfoil section 41 is defined herein using a polar coordinate system having an angular (θ) coordinate and a radial (R) component, with origin located at the effective quarter chord point (QC) of the airfoil section having a chord length (C) as shown. The radial component is referred to herein as a "positioning line (R)." The location of the point P of the unducted fan propulsor 38 relative to the origin (QC) of the polar coordinate system (the origin of the coordinate system is the same as the effective quarter chord point for airfoil section 41) is expressed in terms of a vector having radial component R with magnitude RL and angular component θ. The vector magnitude RL is called a "positioning line length (RL)."

The angle θ is measured relative to a datum that is the airfoil section chord line (e.g., in FIG. 4 the vector R is located by an angle that is between 180 and 270 degrees measured counterclockwise about origin QC relative to the chord line). When viewed looking from an outboard position towards an inboard position (e.g., the fuselage), 0 is positive in a counter-clockwise direction when the propulsor is below the airfoil section 41 (wing, FIG. 9), and θ is positive in a clockwise direction when the propulsor is above the airfoil section (horizontal stabilizer, FIG. 10) as indicated in the drawings, respectively, by the direction of the arrow from the origin.

The inventors found that for an unducted fan propulsor system the ratio of RL over D (i.e., RL/D) is desirably less than or equal to 2, less than or equal to 2 and greater than or equal to 0.15, or less than or equal to 2 and greater than or equal to 0.35. Additionally, for the undermounted unducted fan propulsor systems (pressure side of the airfoil section-see, e.g., FIG. 5A) the angular component θ associated with these ranges for RL/D and locating the unducted fan propulsor system (i.e., the location of P relative to the airfoil section) are desirably between 187° and 342°, between 198° and 310°, or between 205° and 285°. These regions of RL and θ locating the unducted fan propulsor system relative to the airfoil section tend to offset scrubbing and interference drag for an unducted fan propulsor.

Figure 9:
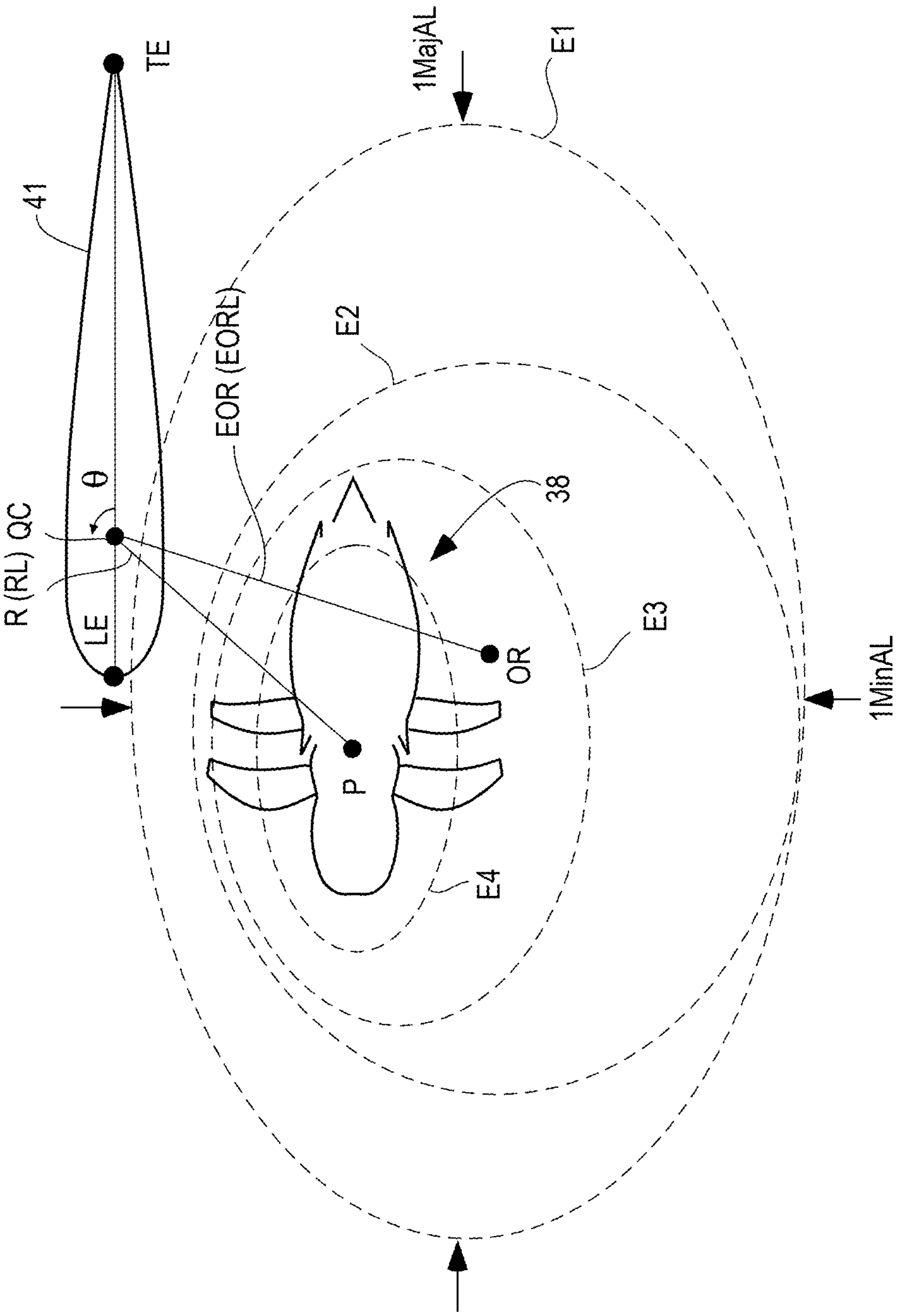
FIG. 9 comprises a schematic side elevation view similar to that of FIG. 7, showing the first ellipse, the second ellipse, the third ellipse, and the fourth ellipse to illustrate various embodiments of mounting locations of one of the unducted fan propulsors relative to one of the wings.
Figure 10:
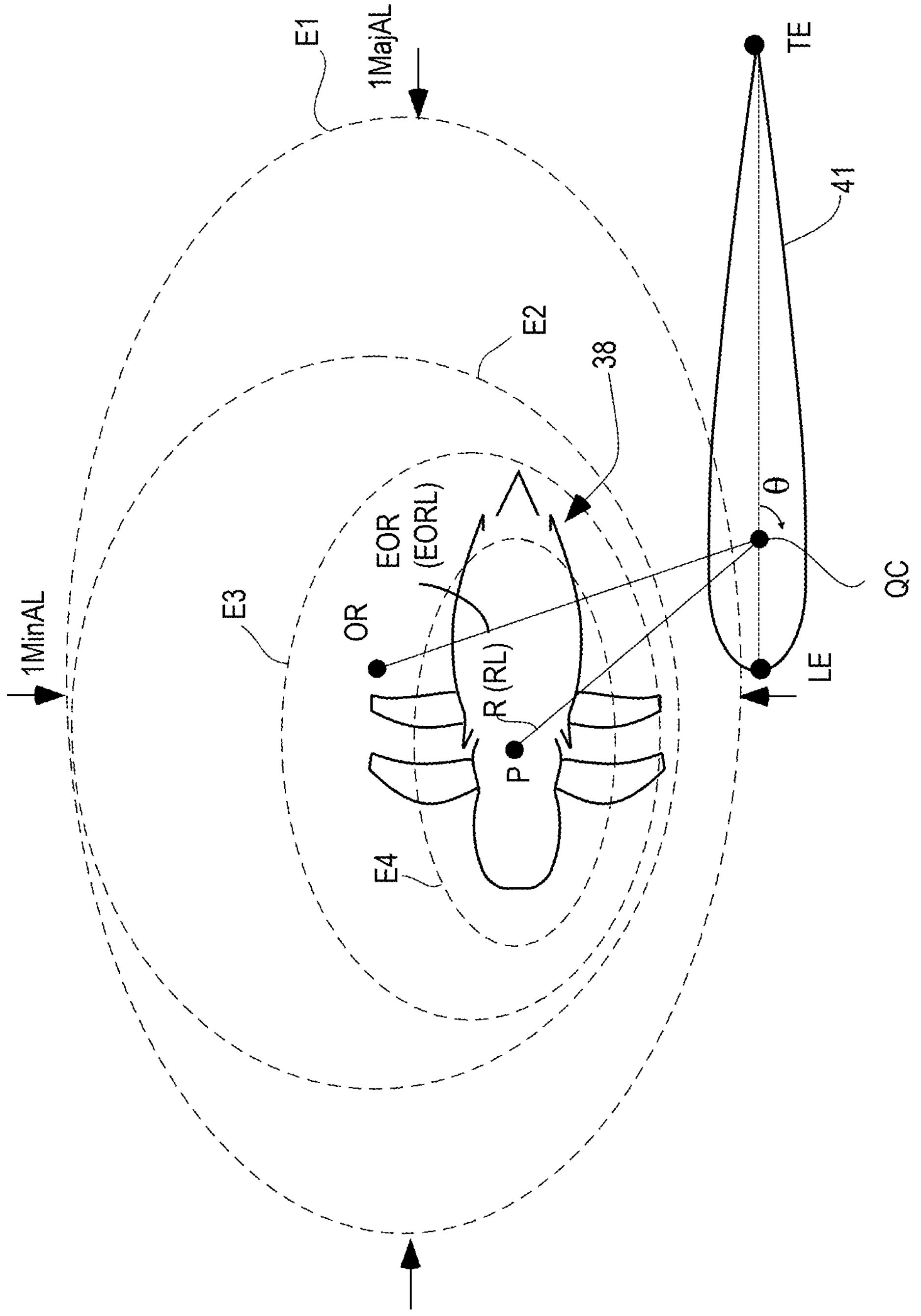
FIG. 10 comprises a schematic side elevation view similar to that of FIG. 8, showing the first ellipse, the second ellipse, the third ellipse, and the fourth ellipse to illustrate various embodiments of mounting locations of one of the unducted fan propulsors relative to one of the horizontal stabilizers.

Alternatively, the point P for the unducted fan propulsor can be located within a defined ellipse defining a region relative to QC where scrubbing and interference drag tends to offset. FIGS. 7-10 each illustrate such ellipses according to several embodiments. Each of the ellipses has an origin OR, a major axis length (MajAL), and a minor axis length (MinAL), as shown in FIGS. 9 and 10 with respect to one of several ellipses and as will be explained further below. The location of OR is expressed relative to QC using the polar coordinate system frame of reference defined earlier. The propulsor system is mounted such that the point P of the unducted fan propulsors 38 is located within an ellipse as defined herein.

Referring to FIG. 9, the radial ellipse origin positioning line (EOR) extends from the ellipse origin OR, e.g., ellipse E1, to QC. The ellipse origin position line EOR has a length EORL. The origin of each of the ellipses is defined in the adopted polar coordinates with a radial coordinate defined as the ratio of EORL to the array of blades diameter (D), i.e., the quantity EORL/D. The angle θ is measured relative to the chord line (as defined earlier) and positive in a clockwise direction when the propulsor is above the airfoil section (horizontal stabilizer, FIG. 10) as indicated in the drawings, respectively, by the direction of the arrow from the origin.

An angle θ for the ellipse origin positioning line EOR is measured from a datum that is the chord line to an ellipse positioning line EOR (e.g., in FIG. 9 the vector EOR is located by an angle that is between 180 and 270 degrees measured counterclockwise about origin QC). A positive θ (1) increases in a counter-clockwise direction when the high pressure side of the airfoil section is below the airfoil section, and (2) increases in a clockwise direction when the high pressure side of the airfoil section is above the airfoil section.

In a first embodiment, the point P of the unducted fan propulsor 38 is located in a first ellipse E1 with a first ellipse origin defined by EORL/D of 0.938 and θ of 253.6°. The first ellipse E1 also has a first major axis length (1MajAL) and a first minor axis length (1MinAL), where 1MajAL/D is 2.8 and 1MinAL/D is 1.7. An unducted fan propulsor located within E1 tends to offset scrubbing and interference drag.

In a second embodiment, the point P of the unducted fan propulsor 38 is located in a second ellipse E2 having a second ellipse origin defined by EORL/D of 1.051 and θ of 248.8°. The second ellipse E2 has a second major axis length (2MajAL) and a second minor axis length (2MinAL), where 2MajAL/D is 1.86 and 2MinAL/D is 1.56. An unducted fan propulsor located within E2 tends to offset scrubbing and interference drag.

In a third embodiment, the point P of the unducted fan propulsor 38 is located in a third ellipse E3 having a third ellipse origin defined by EORL/D of 0.870 and θ of 239.6°. The third ellipse E3 has a third major axis length (3MajAL) and a third minor axis length (3MinAL), where 3MajAL/D is 1.4 and 3MinAL/D is 0.9. An unducted fan propulsor located within E3 tends to offset scrubbing and interference drag.

In a fourth embodiment, the point P of the unducted fan propulsor 38 is located in a fourth ellipse E4 having a fourth ellipse origin defined by EORL/D of 0.763 and θ of 235.7°. The fourth ellipse E4 has a fourth major axis length (4MajAL) and a fourth minor axis length (4MinAL), where 4MajAL/D is 0.94 and 4MinAL/D is 0.44. An unducted fan propulsor located within E4 tends to offset scrubbing and interference drag.

The location of the unducted fan propulsor system (i.e., point P) relative to the airfoil section can also be expressed in terms of the following expressions:

$$\frac{RL}{D}+\frac{\left(\begin{array}{c}\sqrt{a*\left[b*\sin^2(\theta)-c*\cos^2(\theta)+d*\sin(\theta)*\cos(\theta)\right]}+\\ e*\sin(\theta)+f*\cos(\theta)\end{array}\right)}{g*\sin^2(\theta)+h*\cos^2(\theta)}>0 \text{ and}$$

$$\frac{RL}{D}+\frac{\left(\begin{array}{c}-\sqrt{a*\left[b*\sin^2(\theta)-c*\cos^2(\theta)+d*\sin(\theta)*\cos(\theta)\right]}+\\ e*\sin(\theta)+f*\cos(\theta)\end{array}\right)}{g*\sin^2(\theta)+h*\cos^2(\theta)}<0$$

where 0.07<RL/D<1.98 and θ is between 187° and 340°, and where a, b, c, d, e, f, g and h have the values set forth in the following table under the heading "Fifth Emb.":

| Variable | Fifth Emb. | Sixth Emb. | Seventh Emb. | Eighth Emb. |
|---|---|---|---|---|
| a | 1.4161 | 0.52621 | 0.09923 | 0.01069156 |
| b | 1.88978 | 0.7205 | 0.2964 | 0.036 |
| c | 0.0875 | 0.352 | 0.36 | 0.3485 |
| d | 0.477 | 0.7448 | 0.66 | 0.5418 |
| e | 1.764 | 0.8476 | 0.3675 | 0.139167 |
| f | 0.19146 | 0.23119 | 0.0891 | 0.020812 |
| g | 1.96 | 0.8649 | 0.49 | 0.2209 |
| h | 0.7225 | 0.6084 | 0.2025 | 0.0484 |

In a sixth embodiment, the point P of the unducted fan propulsor 38 can be defined by the above expression, but where 0.254<RL/D<1.86 and 0 is between 199° and 306°, and where a, b, c, d, e, f, g and h have the values set forth in the above table under the heading "Sixth Emb."

In a seventh embodiment, the point P of the unducted fan propulsor 38 can be defined by the above expression, but where 0.369<RL/D<1.43 and 0 is between 204° and 291°, and where a, b, c, d, e, f, g and h have the values set forth in the above table under the heading "Seventh Emb.".

In an eighth embodiment, the point P of the unducted fan propulsor 38 can be defined by the above expression, but where 0.477<RL/D<0.9455 and 0 is between 211° and 274°, And where a, b, c, d, e, f, g and h have the values set forth in the above table under the heading "Eighth Emb."

Figure 7:
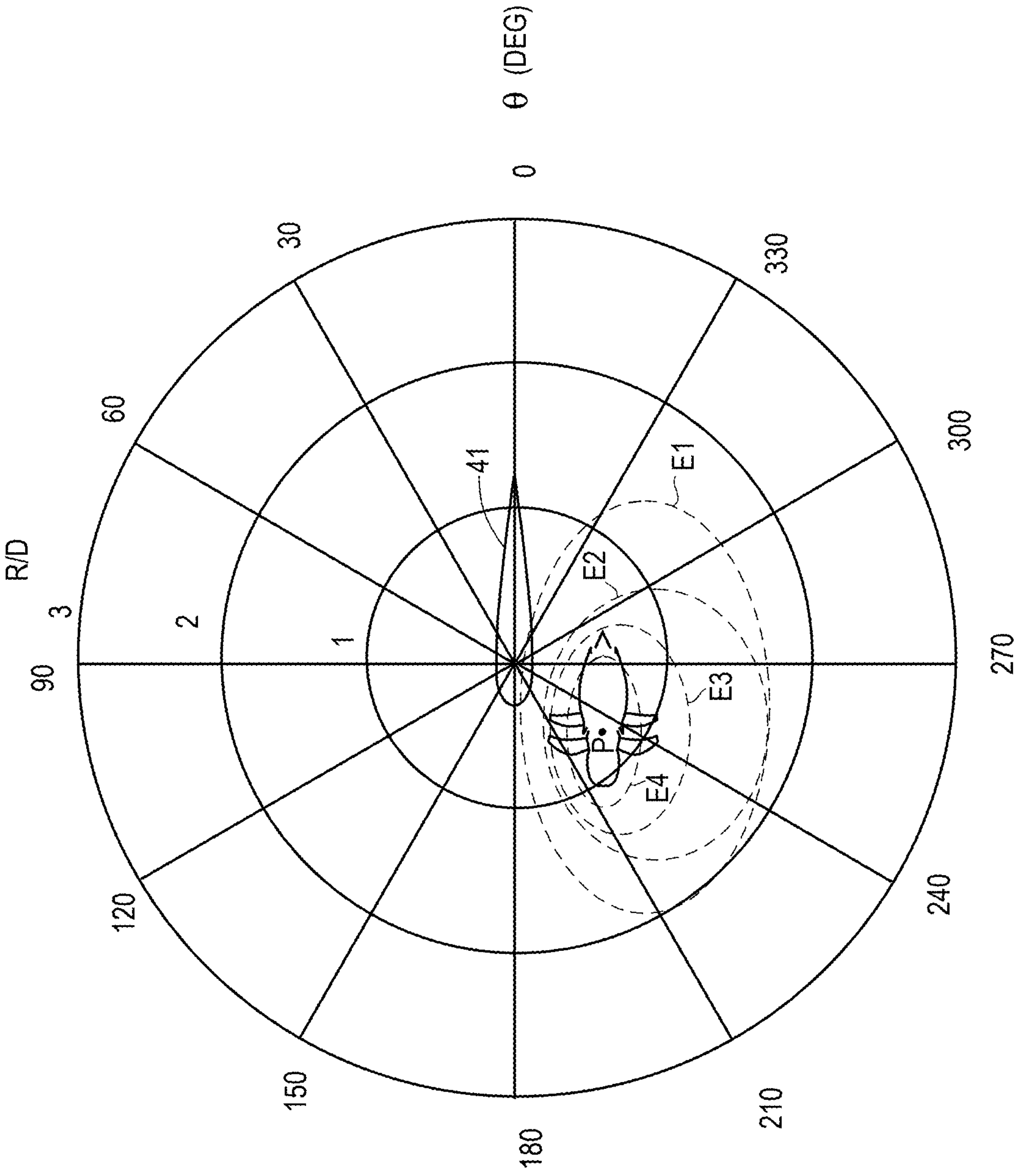
FIG. 7 comprises a schematic side elevation view similar to that of FIG. 4, but showing a first ellipse, a second ellipse, a third ellipse, and a fourth ellipse to illustrate various embodiments of mounting locations of one of the unducted fan propulsors relative to one of the wings.

The unducted fan propulsor locations illustrated in FIG. 7 are made relative to an airfoil section of an aircraft wing and refer to an undermounted unducted fan propulsor system.

Figure 11:
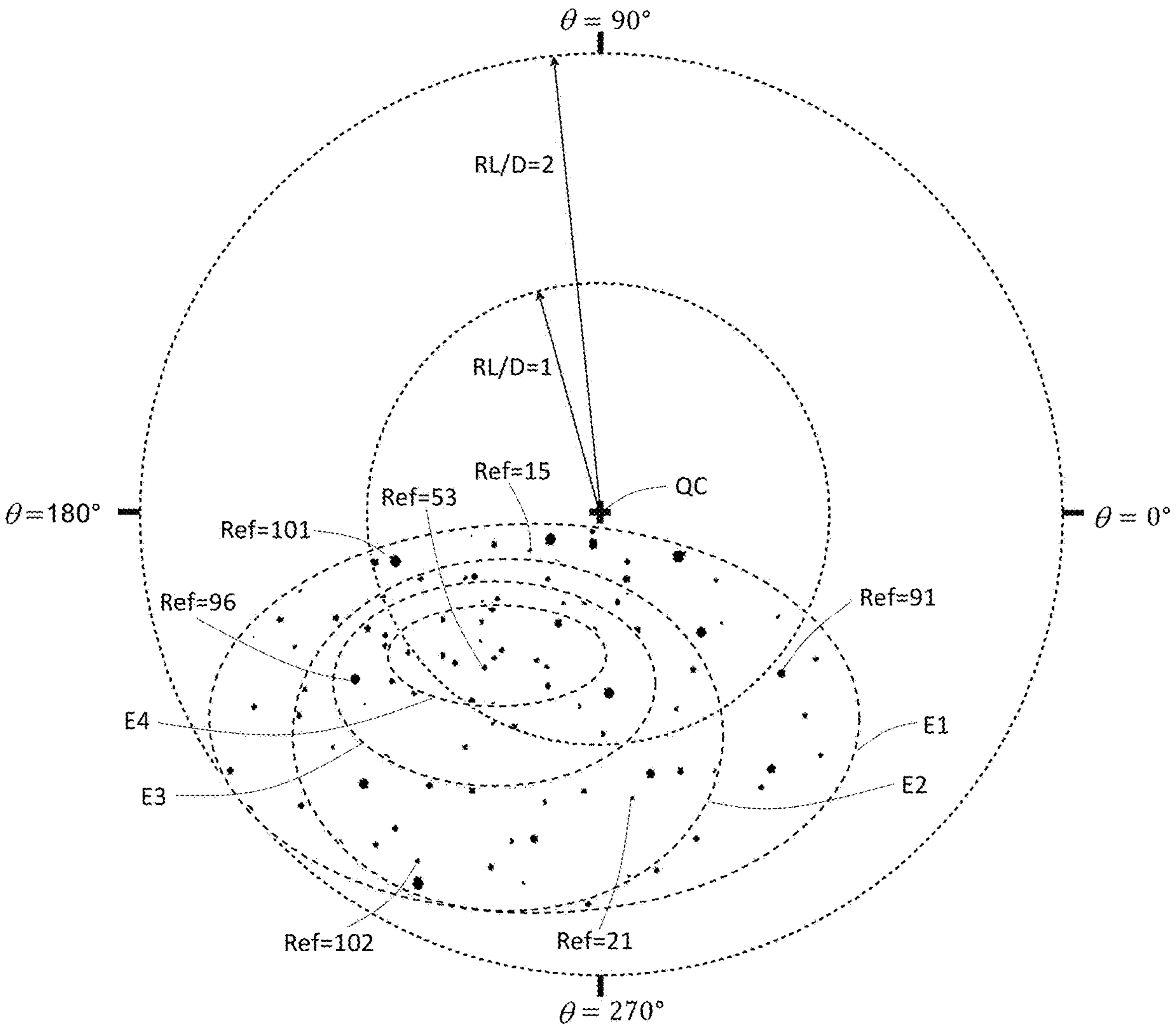
FIG. 11 comprises a schematic representation showing exemplary locations of a point P of one of the unducted fan propulsors, as defined herein, within the first ellipse, the second ellipse, the third ellipse, and the fourth ellipse.

TABLES 1 and 3-6 set forth examples of embodiments of invention. TABLE 1 shows each maximum outer diameter (D) and the location of point P of the unducted fan propulsor relative to the effective quarter chord point, QC, contemplated, where the point P is defined by RL and θ. The term "Ref." refers to the row in Table 1 for reference. The exemplary types of aircraft indicated with reference letters A through I in TABLE 1 are identified in TABLE 2. The point P of the unducted fan propulsor locations from TABLE 1 are shown in FIG. 11 for an under-wing mounted propulsor (for a propulsor mounted above a horizontal stabilizer the maximum outer diameter (D) and the point P of the unducted fan propulsor locations would be mirrored about the chord line of the airfoil section, which, for purposes of explanation, can be thought of as an axis passing through θ=0 deg and θ=180 deg in FIG. 11) relative to the first ellipse (E1), second ellipse (E2), third ellipse (E3), and the fourth ellipse (E4). The size of the points in FIG. 11 represent the relative size of D for the range provided in TABLE 1 (not to scale). The rotating blades diameter (D) can be between 2-50, 8-16, 10-15, 12-14, or 14-16 feet.

TABLE 1

| P-location relative to airfoil section quarter chord point | | | | | |
|---|---|---|---|---|---|
| Ref. | Type of aircraft | RL (ft) | D (ft) | θ (deg) | RL/D |
| 1 | C I | 2.60 | 2.0 | 220.00 | 1.30 |
| 2 | F I | 1.07 | 2.0 | 189.00 | 0.54 |
| 3 | I | 3.13 | 2.0 | 199.73 | 1.57 |
| 4 | C F I | 2.18 | 3.0 | 319.20 | 0.73 |
| 5 | F I | 2.82 | 3.0 | 242.40 | 0.94 |

TABLE 1-continued

P-location relative to airfoil section quarter chord point

| Ref. | Type of aircraft | RL (ft) | D (ft) | θ (deg) | RL/D |
|---|---|---|---|---|---|
| 6 | C I | 1.47 | 4.0 | 293.60 | 0.37 |
| 7 | C I | 2.43 | 4.0 | 217.87 | 0.61 |
| 8 | I | 6.64 | 4.0 | 259.47 | 1.66 |
| 9 | C F I | 4.23 | 5.0 | 265.87 | 0.85 |
| 10 | C H I | 6.57 | 5.0 | 194.40 | 1.31 |
| 11 | F I | 2.03 | 5.0 | 250.93 | 0.41 |
| 12 | C F H I | 8.03 | 5.0 | 275.47 | 1.61 |
| 13 | C | 2.52 | 6.0 | 337.33 | 0.42 |
| 14 | H | 4.44 | 6.0 | 228.53 | 0.74 |
| 15 | C I | 1.88 | 6.0 | 208.27 | 0.31 |
| 16 | C F | 7.14 | 7.0 | 244.53 | 1.02 |
| 17 | B F H | 4.15 | 7.0 | 332.00 | 0.59 |
| 18 | B C I | 6.49 | 7.0 | 292.53 | 0.93 |
| 19 | C G | 8.05 | 8.0 | 216.80 | 1.01 |
| 20 | B F I | 11.89 | 8.0 | 256.27 | 1.49 |
| 21 | C G H | 10.08 | 8.0 | 277.60 | 1.26 |
| 22 | B C G I | 7.31 | 8.0 | 330.93 | 0.91 |
| 23 | C H | 9.97 | 8.0 | 294.67 | 1.25 |
| 24 | G I | 11.57 | 8.0 | 312.80 | 1.45 |
| 25 | B F I | 11.58 | 9.0 | 260.53 | 1.29 |
| 26 | C H | 6.06 | 9.0 | 224.27 | 0.67 |
| 27 | F G H | 3.06 | 9.0 | 233.87 | 0.34 |
| 28 | C I | 12.78 | 9.0 | 204.00 | 1.42 |
| 29 | B H | 10.47 | 10.0 | 210.40 | 1.05 |
| 30 | B I | 5.53 | 10.0 | 221.07 | 0.55 |
| 31 | A B C F G H | 7.00 | 10.0 | 253.07 | 0.70 |
| 32 | I | 2.47 | 10.0 | 306.40 | 0.25 |
| 33 | A C | 15.27 | 10.0 | 222.13 | 1.53 |
| 34 | G | 11.67 | 10.0 | 241.33 | 1.17 |
| 35 | A C F H | 17.13 | 10.0 | 243.47 | 1.71 |
| 36 | A B G I | 18.70 | 11.0 | 210.00 | 1.70 |
| 37 | G | 10.93 | 11.0 | 249.87 | 0.99 |
| 38 | A H | 4.33 | 11.0 | 285.07 | 0.39 |
| 39 | F I | 6.82 | 11.0 | 206.13 | 0.62 |
| 40 | A F H | 11.60 | 12.0 | 272.27 | 0.97 |
| 41 | A B F I | 10.64 | 12.0 | 227.47 | 0.89 |
| 42 | A H | 21.84 | 12.0 | 232.80 | 1.82 |
| 43 | A G | 8.56 | 12.0 | 236.00 | 0.71 |
| 44 | B F H | 0.78 | 12.0 | 263.50 | 0.07 |
| 45 | A F | 10.00 | 12.5 | 200.00 | 0.80 |
| 46 | A B G H I | 15.25 | 12.5 | 268.00 | 1.22 |
| 47 | B | 19.92 | 12.5 | 279.73 | 1.59 |
| 48 | A B F | 15.92 | 12.5 | 316.00 | 1.27 |
| 49 | A B | 6.25 | 12.5 | 270.13 | 0.50 |
| 50 | A F H | 18.42 | 12.5 | 211.47 | 1.47 |
| 51 | F G | 24.25 | 12.5 | 215.73 | 1.94 |
| 52 | A B H | 19.50 | 13.0 | 287.20 | 1.50 |
| 53 | H | 10.66 | 13.0 | 234.93 | 0.82 |
| 54 | B | 14.99 | 13.0 | 326.67 | 1.15 |
| 55 | I | 18.11 | 13.0 | 239.20 | 1.39 |
| 56 | A B F H | 23.49 | 13.0 | 225.33 | 1.81 |
| 57 | A F G H | 10.49 | 13.0 | 302.13 | 0.81 |
| 58 | B I | 3.38 | 13.0 | 231.73 | 0.26 |
| 59 | A B G | 13.95 | 13.0 | 212.53 | 1.07 |
| 60 | A B H | 10.14 | 13.0 | 255.20 | 0.78 |
| 61 | F | 10.80 | 13.5 | 215.00 | 0.80 |
| 62 | A H I | 19.35 | 13.5 | 198.67 | 1.43 |
| 63 | B F | 15.39 | 13.5 | 220.00 | 1.14 |
| 64 | A G H I | 7.83 | 13.5 | 207.20 | 0.58 |
| 65 | B H | 10.30 | 13.5 | 235.70 | 0.76 |
| 66 | A B | 23.49 | 13.5 | 237.07 | 1.74 |
| 67 | A H | 22.05 | 13.5 | 238.13 | 1.63 |
| 68 | F G | 13.08 | 13.5 | 192.00 | 0.97 |
| 69 | A B F | 6.03 | 13.5 | 195.47 | 0.45 |
| 70 | A F | 13.23 | 13.5 | 200.80 | 0.98 |
| 71 | B H | 16.89 | 14.0 | 201.87 | 1.21 |
| 72 | B I | 22.68 | 14.0 | 254.13 | 1.62 |
| 73 | A B F H | 24.17 | 14.0 | 269.07 | 1.73 |
| 74 | B E G | 19.69 | 14.0 | 301.07 | 1.41 |
| 75 | A | 12.60 | 14.0 | 223.20 | 0.90 |
| 76 | H I | 23.30 | 15.0 | 214.67 | 1.55 |
| 77 | A B E G H | 10.30 | 15.0 | 248.80 | 0.69 |
| 78 | A B E H | 17.90 | 15.0 | 288.27 | 1.19 |

TABLE 1-continued

P-location relative to airfoil section quarter chord point

| Ref. | Type of aircraft | RL (ft) | D (ft) | θ (deg) | RL/D |
|---|---|---|---|---|---|
| 79 | F G | 21.23 | 16.0 | 246.67 | 1.33 |
| 80 | A E | 8.64 | 16.0 | 290.40 | 0.54 |
| 81 | E G | 17.60 | 16.0 | 207.00 | 1.10 |
| 82 | A E | 25.20 | 18.0 | 230.00 | 1.40 |
| 83 | F | 19.80 | 18.0 | 225.00 | 1.10 |
| 84 | A G | 6.84 | 18.0 | 263.73 | 0.38 |
| 85 | A E | 35.64 | 18.0 | 221.00 | 1.98 |
| 86 | A E | 6.17 | 20.0 | 297.03 | 0.31 |
| 87 | F | 30.55 | 21.0 | 259.78 | 1.45 |
| 88 | A D | 10.99 | 22.0 | 252.33 | 0.50 |
| 89 | A E | 21.50 | 22.0 | 237.43 | 0.98 |
| 90 | D | 14.29 | 24.0 | 222.53 | 0.60 |
| 91 | D E | 25.75 | 24.0 | 319.38 | 1.07 |
| 92 | D E | 3.41 | 29.0 | 267.23 | 0.12 |
| 93 | D | 39.42 | 29.0 | 304.48 | 1.36 |
| 94 | E | 38.55 | 33.0 | 282.13 | 1.17 |
| 95 | D | 51.16 | 33.0 | 229.98 | 1.55 |
| 96 | D E | 44.23 | 35.0 | 215.08 | 1.26 |
| 97 | E | 24.18 | 35.0 | 311.93 | 0.69 |
| 98 | D | 8.53 | 40.0 | 207.63 | 0.21 |
| 99 | D | 31.45 | 40.0 | 274.68 | 0.79 |
| 100 | D | 18.19 | 45.0 | 334.28 | 0.40 |
| 101 | D | 42.32 | 48.0 | 192.73 | 0.88 |
| 102 | D | 90.00 | 50.0 | 244.88 | 1.80 |

TABLE 2

| Designator for TABLE 1 | Aircraft Type |
|---|---|
| A | Narrow Body, twin engine |
| B | Narrow Body, 4 engines |
| C | Narrow Body, distributed propulsors (>4 engines) |
| D | Wide Body, twin engine |
| E | Wide Body, 4 engines |
| F | Wide Body, distributed propulsors (>4 engines) |
| G | Regional Jet |
| H | Business Jet |
| I | UAV |

For Aircraft Type A, B, C and G having a Mach flight speed at cruise conditions of between 0.70 and 0.85 the fan diameter (D) is between 8 and 16 feet, or more preferably between 12 feet and 16 feet.

TABLES 3-6 provide exemplary embodiments for EORL and D for each of the first ellipse E1, second ellipse E2, third ellipse E3 and fourth ellipse E4, respectively, relative to the quarter chord point (QC).

TABLE 3

| First Ellipse E1 Embodiments | | | | | | | |
|---|---|---|---|---|---|---|---|
| D (ft) | θ (deg) | EORL (ft) | 1MajAL (ft) | 1MinAL (ft) | EORL/D | 1MajAL/D | 1MinAL/D |
| 2 | 253.6 | 1.876 | 5.6 | 3.4 | 0.938 | 2.8 | 1.7 |
| 3 | 253.6 | 2.814 | 8.4 | 5.1 | 0.938 | 2.8 | 1.7 |
| 4 | 253.6 | 3.752 | 11.2 | 6.8 | 0.938 | 2.8 | 1.7 |
| 5 | 253.6 | 4.69 | 14 | 8.5 | 0.938 | 2.8 | 1.7 |
| 6 | 253.6 | 5.628 | 16.8 | 10.2 | 0.938 | 2.8 | 1.7 |
| 7 | 253.6 | 6.566 | 19.6 | 11.9 | 0.938 | 2.8 | 1.7 |
| 8 | 253.6 | 7.504 | 22.4 | 13.6 | 0.938 | 2.8 | 1.7 |
| 9 | 253.6 | 8.442 | 25.2 | 15.3 | 0.938 | 2.8 | 1.7 |
| 10 | 253.6 | 9.38 | 28 | 17 | 0.938 | 2.8 | 1.7 |
| 11 | 253.6 | 10.318 | 30.8 | 18.7 | 0.938 | 2.8 | 1.7 |
| 12 | 253.6 | 11.256 | 33.6 | 20.4 | 0.938 | 2.8 | 1.7 |
| 12.5 | 253.6 | 11.725 | 35 | 21.25 | 0.938 | 2.8 | 1.7 |
| 13 | 253.6 | 12.194 | 36.4 | 22.1 | 0.938 | 2.8 | 1.7 |
| 13.5 | 253.6 | 12.663 | 37.8 | 22.95 | 0.938 | 2.8 | 1.7 |
| 14 | 253.6 | 13.132 | 39.2 | 23.8 | 0.938 | 2.8 | 1.7 |
| 15 | 253.6 | 14.07 | 42 | 25.5 | 0.938 | 2.8 | 1.7 |
| 16 | 253.6 | 15.008 | 44.8 | 27.2 | 0.938 | 2.8 | 1.7 |
| 18 | 253.6 | 16.884 | 50.4 | 30.6 | 0.938 | 2.8 | 1.7 |
| 20 | 253.6 | 18.76 | 56 | 34 | 0.938 | 2.8 | 1.7 |
| 21 | 253.6 | 19.698 | 58.8 | 35.7 | 0.938 | 2.8 | 1.7 |
| 22 | 253.6 | 20.636 | 61.6 | 37.4 | 0.938 | 2.8 | 1.7 |
| 24 | 253.6 | 22.512 | 67.2 | 40.8 | 0.938 | 2.8 | 1.7 |
| 29 | 253.6 | 27.202 | 81.2 | 49.3 | 0.938 | 2.8 | 1.7 |
| 33 | 253.6 | 30.954 | 92.4 | 56.1 | 0.938 | 2.8 | 1.7 |
| 35 | 253.6 | 32.83 | 98 | 59.5 | 0.938 | 2.8 | 1.7 |
| 40 | 253.6 | 37.52 | 112 | 68 | 0.938 | 2.8 | 1.7 |
| 45 | 253.6 | 42.21 | 126 | 76.5 | 0.938 | 2.8 | 1.7 |
| 48 | 253.6 | 45.024 | 134.4 | 81.6 | 0.938 | 2.8 | 1.7 |
| 50 | 253.6 | 46.9 | 140 | 85 | 0.938 | 2.8 | 1.7 |

TABLE 4

| Second Ellipse E2 Embodiments | | | | | | | |
|---|---|---|---|---|---|---|---|
| D (ft) | θ (deg) | EORL (ft) | 2MajAL (ft) | 2MinAL (ft) | EORL/D | 2MajAL/D | 2MinAL/D |
| 2 | 248.8 | 2.102 | 3.72 | 3.12 | 1.051 | 1.86 | 1.56 |
| 3 | 248.8 | 3.153 | 5.58 | 4.68 | 1.051 | 1.86 | 1.56 |
| 4 | 248.8 | 4.204 | 7.44 | 6.24 | 1.051 | 1.86 | 1.56 |
| 5 | 248.8 | 5.255 | 9.3 | 7.8 | 1.051 | 1.86 | 1.56 |
| 6 | 248.8 | 6.306 | 11.16 | 9.36 | 1.051 | 1.86 | 1.56 |
| 7 | 248.8 | 7.357 | 13.02 | 10.92 | 1.051 | 1.86 | 1.56 |
| 8 | 248.8 | 8.408 | 14.88 | 12.48 | 1.051 | 1.86 | 1.56 |
| 9 | 248.8 | 9.459 | 16.74 | 14.04 | 1.051 | 1.86 | 1.56 |
| 10 | 248.8 | 10.51 | 18.6 | 15.6 | 1.051 | 1.86 | 1.56 |
| 11 | 248.8 | 11.561 | 20.46 | 17.16 | 1.051 | 1.86 | 1.56 |
| 12 | 248.8 | 12.612 | 22.32 | 18.72 | 1.051 | 1.86 | 1.56 |
| 12.5 | 248.8 | 13.1375 | 23.25 | 19.5 | 1.051 | 1.86 | 1.56 |
| 13 | 248.8 | 13.663 | 24.18 | 20.28 | 1.051 | 1.86 | 1.56 |
| 13.5 | 248.8 | 14.1885 | 25.11 | 21.06 | 1.051 | 1.86 | 1.56 |
| 14 | 248.8 | 14.714 | 26.04 | 21.84 | 1.051 | 1.86 | 1.56 |
| 15 | 248.8 | 15.765 | 27.9 | 23.4 | 1.051 | 1.86 | 1.56 |
| 16 | 248.8 | 16.816 | 29.76 | 24.96 | 1.051 | 1.86 | 1.56 |
| 18 | 248.8 | 18.918 | 33.48 | 28.08 | 1.051 | 1.86 | 1.56 |
| 20 | 248.8 | 21.02 | 37.2 | 31.2 | 1.051 | 1.86 | 1.56 |
| 21 | 248.8 | 22.071 | 39.06 | 32.76 | 1.051 | 1.86 | 1.56 |
| 22 | 248.8 | 23.122 | 40.92 | 34.32 | 1.051 | 1.86 | 1.56 |
| 24 | 248.8 | 25.224 | 44.64 | 37.44 | 1.051 | 1.86 | 1.56 |
| 29 | 248.8 | 30.479 | 53.94 | 45.24 | 1.051 | 1.86 | 1.56 |
| 33 | 248.8 | 34.683 | 61.38 | 51.48 | 1.051 | 1.86 | 1.56 |
| 35 | 248.8 | 36.785 | 65.1 | 54.6 | 1.051 | 1.86 | 1.56 |
| 40 | 248.8 | 42.04 | 74.4 | 62.4 | 1.051 | 1.86 | 1.56 |
| 45 | 248.8 | 47.295 | 83.7 | 70.2 | 1.051 | 1.86 | 1.56 |
| 48 | 248.8 | 50.448 | 89.28 | 74.88 | 1.051 | 1.86 | 1.56 |
| 50 | 248.8 | 52.55 | 93 | 78 | 1.051 | 1.86 | 1.56 |

TABLE 5

| Third Ellipse E3 Embodiments | | | | | | | |
|---|---|---|---|---|---|---|---|
| D (ft) | θ (deg) | EORL (ft) | 3MajAL (ft) | 3MinAL (ft) | EORL/D | 3MajAL/D | 3MinAL/D |
| 2 | 239.6 | 1.74 | 2.8 | 1.8 | 0.87 | 1.4 | 0.9 |
| 3 | 239.6 | 2.61 | 4.2 | 2.7 | 0.87 | 1.4 | 0.9 |
| 4 | 239.6 | 3.48 | 5.6 | 3.6 | 0.87 | 1.4 | 0.9 |
| 5 | 239.6 | 4.35 | 7 | 4.5 | 0.87 | 1.4 | 0.9 |
| 6 | 239.6 | 5.22 | 8.4 | 5.4 | 0.87 | 1.4 | 0.9 |
| 7 | 239.6 | 6.09 | 9.8 | 6.3 | 0.87 | 1.4 | 0.9 |
| 8 | 239.6 | 6.96 | 11.2 | 7.2 | 0.87 | 1.4 | 0.9 |
| 9 | 239.6 | 7.83 | 12.6 | 8.1 | 0.87 | 1.4 | 0.9 |
| 10 | 239.6 | 8.7 | 14 | 9 | 0.87 | 1.4 | 0.9 |
| 11 | 239.6 | 9.57 | 15.4 | 9.9 | 0.87 | 1.4 | 0.9 |
| 12 | 239.6 | 10.44 | 16.8 | 10.8 | 0.87 | 1.4 | 0.9 |
| 12.5 | 239.6 | 10.875 | 17.5 | 11.25 | 0.87 | 1.4 | 0.9 |
| 13 | 239.6 | 11.31 | 18.2 | 11.7 | 0.87 | 1.4 | 0.9 |
| 13.5 | 239.6 | 11.745 | 18.9 | 12.15 | 0.87 | 1.4 | 0.9 |
| 14 | 239.6 | 12.18 | 19.6 | 12.6 | 0.87 | 1.4 | 0.9 |
| 15 | 239.6 | 13.05 | 21 | 13.5 | 0.87 | 1.4 | 0.9 |
| 16 | 239.6 | 13.92 | 22.4 | 14.4 | 0.87 | 1.4 | 0.9 |
| 18 | 239.6 | 15.66 | 25.2 | 16.2 | 0.87 | 1.4 | 0.9 |
| 20 | 239.6 | 17.4 | 28 | 18 | 0.87 | 1.4 | 0.9 |
| 21 | 239.6 | 18.27 | 29.4 | 18.9 | 0.87 | 1.4 | 0.9 |
| 22 | 239.6 | 19.14 | 30.8 | 19.8 | 0.87 | 1.4 | 0.9 |
| 24 | 239.6 | 20.88 | 33.6 | 21.6 | 0.87 | 1.4 | 0.9 |
| 29 | 239.6 | 25.23 | 40.6 | 26.1 | 0.87 | 1.4 | 0.9 |
| 33 | 239.6 | 28.71 | 46.2 | 29.7 | 0.87 | 1.4 | 0.9 |
| 35 | 239.6 | 30.45 | 49 | 31.5 | 0.87 | 1.4 | 0.9 |
| 40 | 239.6 | 34.8 | 56 | 36 | 0.87 | 1.4 | 0.9 |
| 45 | 239.6 | 39.15 | 63 | 40.5 | 0.87 | 1.4 | 0.9 |
| 48 | 239.6 | 41.76 | 67.2 | 43.2 | 0.87 | 1.4 | 0.9 |
| 50 | 239.6 | 43.5 | 70 | 45 | 0.87 | 1.4 | 0.9 |

TABLE 6

| Fourth Ellipse E4 Embodiments | | | | | | | |
|---|---|---|---|---|---|---|---|
| D (ft) | θ (deg) | EORL (ft) | 4MajAL (ft) | 4MinAL (ft) | EORL/D | 4MajAL/D | 4MinAL/D |
| 2 | 235.7 | 1.526 | 1.88 | 0.88 | 0.763 | 0.94 | 0.44 |
| 3 | 235.7 | 2.289 | 2.82 | 1.32 | 0.763 | 0.94 | 0.44 |
| 4 | 235.7 | 3.052 | 3.76 | 1.76 | 0.763 | 0.94 | 0.44 |
| 5 | 235.7 | 3.815 | 4.7 | 2.2 | 0.763 | 0.94 | 0.44 |
| 6 | 235.7 | 4.578 | 5.64 | 2.64 | 0.763 | 0.94 | 0.44 |
| 7 | 235.7 | 5.341 | 6.58 | 3.08 | 0.763 | 0.94 | 0.44 |
| 8 | 235.7 | 6.104 | 7.52 | 3.52 | 0.763 | 0.94 | 0.44 |
| 9 | 235.7 | 6.867 | 8.46 | 3.96 | 0.763 | 0.94 | 0.44 |
| 10 | 235.7 | 7.63 | 9.4 | 4.4 | 0.763 | 0.94 | 0.44 |
| 11 | 235.7 | 8.393 | 10.34 | 4.84 | 0.763 | 0.94 | 0.44 |
| 12 | 235.7 | 9.156 | 11.28 | 5.28 | 0.763 | 0.94 | 0.44 |
| 12.5 | 235.7 | 9.5375 | 11.75 | 5.5 | 0.763 | 0.94 | 0.44 |
| 13 | 235.7 | 9.919 | 12.22 | 5.72 | 0.763 | 0.94 | 0.44 |
| 13.5 | 235.7 | 10.3005 | 12.69 | 5.94 | 0.763 | 0.94 | 0.44 |
| 14 | 235.7 | 10.682 | 13.16 | 6.16 | 0.763 | 0.94 | 0.44 |
| 15 | 235.7 | 11.445 | 14.1 | 6.6 | 0.763 | 0.94 | 0.44 |
| 16 | 235.7 | 12.208 | 15.04 | 7.04 | 0.763 | 0.94 | 0.44 |
| 18 | 235.7 | 13.734 | 16.92 | 7.92 | 0.763 | 0.94 | 0.44 |
| 20 | 235.7 | 15.26 | 18.8 | 8.8 | 0.763 | 0.94 | 0.44 |
| 21 | 235.7 | 16.023 | 19.74 | 9.24 | 0.763 | 0.94 | 0.44 |
| 22 | 235.7 | 16.786 | 20.68 | 9.68 | 0.763 | 0.94 | 0.44 |
| 24 | 235.7 | 18.312 | 22.56 | 10.56 | 0.763 | 0.94 | 0.44 |
| 29 | 235.7 | 22.127 | 27.26 | 12.76 | 0.763 | 0.94 | 0.44 |
| 33 | 235.7 | 25.179 | 31.02 | 14.52 | 0.763 | 0.94 | 0.44 |
| 35 | 235.7 | 26.705 | 32.9 | 15.4 | 0.763 | 0.94 | 0.44 |
| 40 | 235.7 | 30.52 | 37.6 | 17.6 | 0.763 | 0.94 | 0.44 |
| 45 | 235.7 | 34.335 | 42.3 | 19.8 | 0.763 | 0.94 | 0.44 |
| 48 | 235.7 | 36.624 | 45.12 | 21.12 | 0.763 | 0.94 | 0.44 |
| 50 | 235.7 | 38.15 | 47 | 22 | 0.763 | 0.94 | 0.44 |

Figure 8:
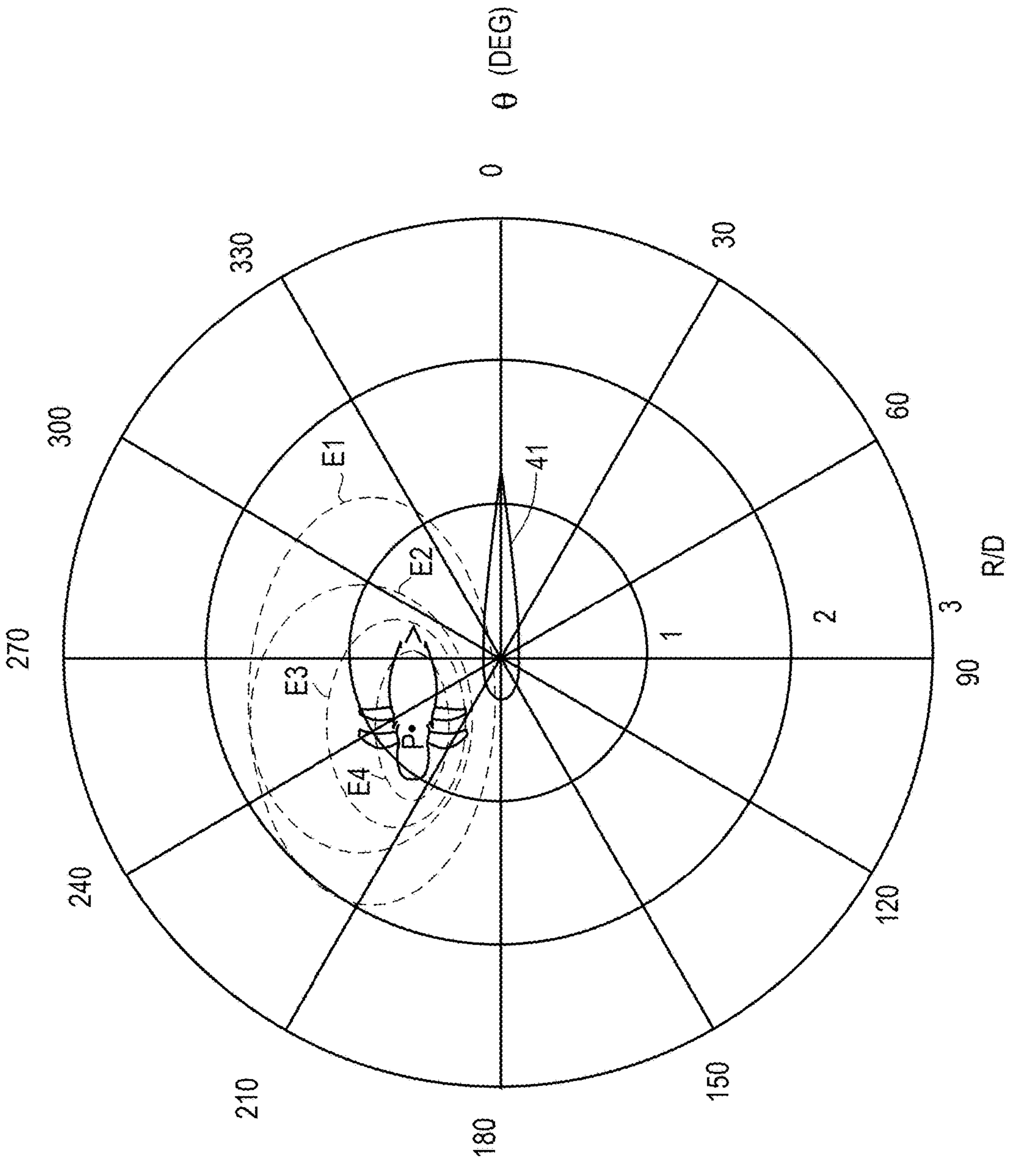
FIG. 8 comprises a schematic side elevation view similar to that of FIG. 7, but showing a first ellipse, a second ellipse, a third ellipse, and a fourth ellipse to illustrate various embodiments of mounting locations of one of the unducted fan propulsors relative to one of the horizontal stabilizers.

Referring to FIG. 8, the locations for P relative to the airfoil section and advantages therefrom described above can also be realized for an unducted fan propulsor system mounted above a horizontal stabilizer. For an unducted fan propulsor mounted to horizontal stabilizers, the foregoing examples and embodiments would be mirrored about the chord line of the airfoil section (again, for purposes of explanation, this chord line can be thought of as an axis passing through θ=0 deg and θ=180 deg in FIG. 11) for the case where the airfoil section 41 produces a lift in the downward direction, such as a horizontal stabilizer, as compared to a wing which produces a lift in the upward direction. The above descriptions for an undermount propulsor can apply, with the location being shifted as shown in FIG. 8 as compared to FIG. 7.

According to the foregoing examples or embodiments, the unducted fan propulsor 38, incorporating the vane assembly described herein, can be incorporated into an airplane or other aircraft having a cruise flight Mach $M_0$ of between 0.70 and 0.85, between 0.75 and 0.85, between 0.75 and 0.79, between 0.5 and 0.9, between 0.7 and 0.9, or between 0.75 and 0.9. A propulsor that is part of an airplane that operates at a high cruise flight Mach number (e.g., greater than 0.7) encounters velocities near the surfaces of, for example, the rotor or vanes, that approach or exceed the speed of sound, or Mach 1.0. In general, friction drag increases roughly in proportion to the square of the air velocity. However, as the Mach number increases, a significant contributor to the increase in drag can come from wave drag. Wave drag is a drag resulting from shock waves that form as the flow of air near a surface becomes supersonic (e.g., Mach>1.0).

In addition to the cruise flight Mach number, another factor contributing to increased drag on propulsor surfaces is high non-dimensional cruise fan net thrust based on fan annular area and flight speed. The same acceleration of the air stream by the fan that produces thrust also tends to increase the drag force on, for example, the rotor or vanes.

Expressing thrust non-dimensionally in a way that accounts for flight speed, ambient conditions, and fan annular area yields a thrust parameter as follows:

$$\frac{F_{net}}{\rho_0 A_{an} V_0^2}$$

In the above thrust parameter, $F_{net}$ is cruise fan net thrust, $\rho_0$ is ambient air density, $V_0$ is cruise flight velocity, and $A_{an}$ is fan stream tube cross-sectional area at the fan inlet. Fan annular area, $A_{an}$, is computed using a maximum radius as the tip radius of the forward-most rotor blades and a minimum radius as the minimum radius of the fan stream tube entering the fan.

A propulsor that operates at a high cruise fan net thrust parameter (e.g., greater than 0.06) tends to have higher propulsor velocities with risk of higher drag on propulsor surfaces.

According to any of the foregoing examples or embodiments, there can be a particularly beneficial range of a dimensionless cruise fan net thrust parameter normalized by ambient density, cruise flight speed squared, and fan stream tube annular area at fan inlet defined by the following expression:

$$0.15 > \frac{F_{net}}{\rho_0 A_{an} V_0^2} > 0.06$$

Both a high cruise flight Mach and high dimensionless cruise fan net thrust parameter contribute to higher drag levels on the propulsor surfaces. Advantageously, the specific unducted fan propulsor positions relative to the wing airfoil section, as described herein, can increase unducted fan propulsor net thrust for a given power input when there is a high cruise flight Mach and a high dimensionless cruise fan net thrust parameter.

Using the conditions described herein, the specific regions for placing the unducted fan propulsor system can be located where there is a relatively higher pressure on the high-pressure side of the airfoil, beneath the wings or above the horizontal stabilizers. The higher pressure provides increased thrust from the unducted fan propulsor to thereby offset drag penalties resulting from the installation of unducted fan propulsors.

The foregoing conditions for the placement of the propulsors relative to the wing airfoils can be present for any mounting configuration of the propulsors on the wing. While the mounting configuration can be fixed, it is also contemplated that the mounting configuration could be variable. For example, the mounting configuration of an unducted fan propulsor relative to a wing could be different for takeoff as compared to cruise operating conditions. In such a scenario, the foregoing conditions for placement of the propulsors relative to the wing airfoils can be present in either or both operating conditions, or in any other operating condition.

Additional Embodiments

In each case, however, positioning the propulsor in the disclosed high-pressure regions alters the thrust line and pressure distribution in a manner that introduces uneven and time-varying reaction forces into the propulsor drive system, including the gearbox assembly and its mounting members. For purposes of the present disclosure, the geometry of the positioning line (R), including its length RL normalized by the fan diameter D and its angle θ measured with respect to the chord line and the effective quarter-chord point (QC), characterizes the propulsor placement that gives rise to these higher forces. Such placement not only increases overall bending, lateral, and torsional loads transmitted to the gearbox assembly and its mounting members, but also changes the magnitude and direction of reaction forces compared to conventional gas turbine engine installations. The loading of a gas turbine engine, while the engine is producing thrust, induces thrust reaction forces through the aircraft-engine mounting points. For example, the mount points to a wing pylon induce during a take-off and/or climb sequence a net bending moment about the pitch axis.

The resulting deflections cause relative movement among turbine shafts, mid-frames, engine casings, front frames, and/or other components. These relative movements, which can occur at different rates (e.g., depending on flight conditions) produce coupled loads among the supporting structure, engine frames, shafts, and casings. Bending of the engine also deforms the casing of the engine along its length. The magnitude of these deflections is greater when the propulsor is positioned in the disclosed high-pressure regions, thereby amplifying the relative motion between interconnected structures. The degree to which components move relative to each other depends on how they are connected to each other, the materials used, and the structural dynamic properties of the interconnected structure supporting the components. If these aspects of engine design are not fully taken into consideration in the context of the disclosed displacement, the increased loads can lead to misalignments that can result in pre-mature failure or wear of component parts such as bearings, seals, and other drive system elements.

One such component uniquely affected by the increased loading associated with quarter-chord based placement is the gearbox assembly, which transfers power from a turbine shaft to a main fan. In unducted fan propulsor architectures where the propulsor is relatively larger in diameter and mounted in positions that differ from, for example conventional underwing engine installations, the gearbox assembly can absorb higher bending and torsional forces than are encountered in conventional gas turbine engine installations. Such gearbox assemblies can include a sun gear, a plurality of planet gears, and a ring gear. The sun gear meshes with the plurality of planet gears and the plurality of planet gears mesh with the ring gear. In operation, the gearbox assembly transfers the torque transmitted from a turbine shaft operating at a first speed to a fan shaft rotating at a second, lower speed. For a planet configuration of the gearbox assembly, the sun gear can be coupled to the mid-shaft of a lower pressure turbine rotating at the first speed. The planet gears, intermeshed with the sun gear, then transfer this torque to the fan shaft through a planet carrier. In a star configuration, a ring gear is coupled to the fan shaft. In either configuration, the gearbox assembly is supported by a mounting assembly including, for example, a flex mount, a flex coupling, and a fan frame coupling.

The relative movements of the frames supporting the gearbox assembly and input/output shafts for the gearbox assembly, as a result of the increased forces from the disclosed propulsor placement, can cause significant relative displacements among the moving parts of the gearbox assembly such as the gears, carrier, ring, or other such components. These displacements can lead to misalignments in the geartrain, which in turn can cause distortions or eccentric loading. In particular, the torque loads may not be uniformly resolved or evenly distributed among the gears. This results in edge loading and high stresses within the individual gears and the gearbox assembly, which can cause accelerated wear, reduction in gear life, failure, and/or breakage of the gears.

Figure 12A:
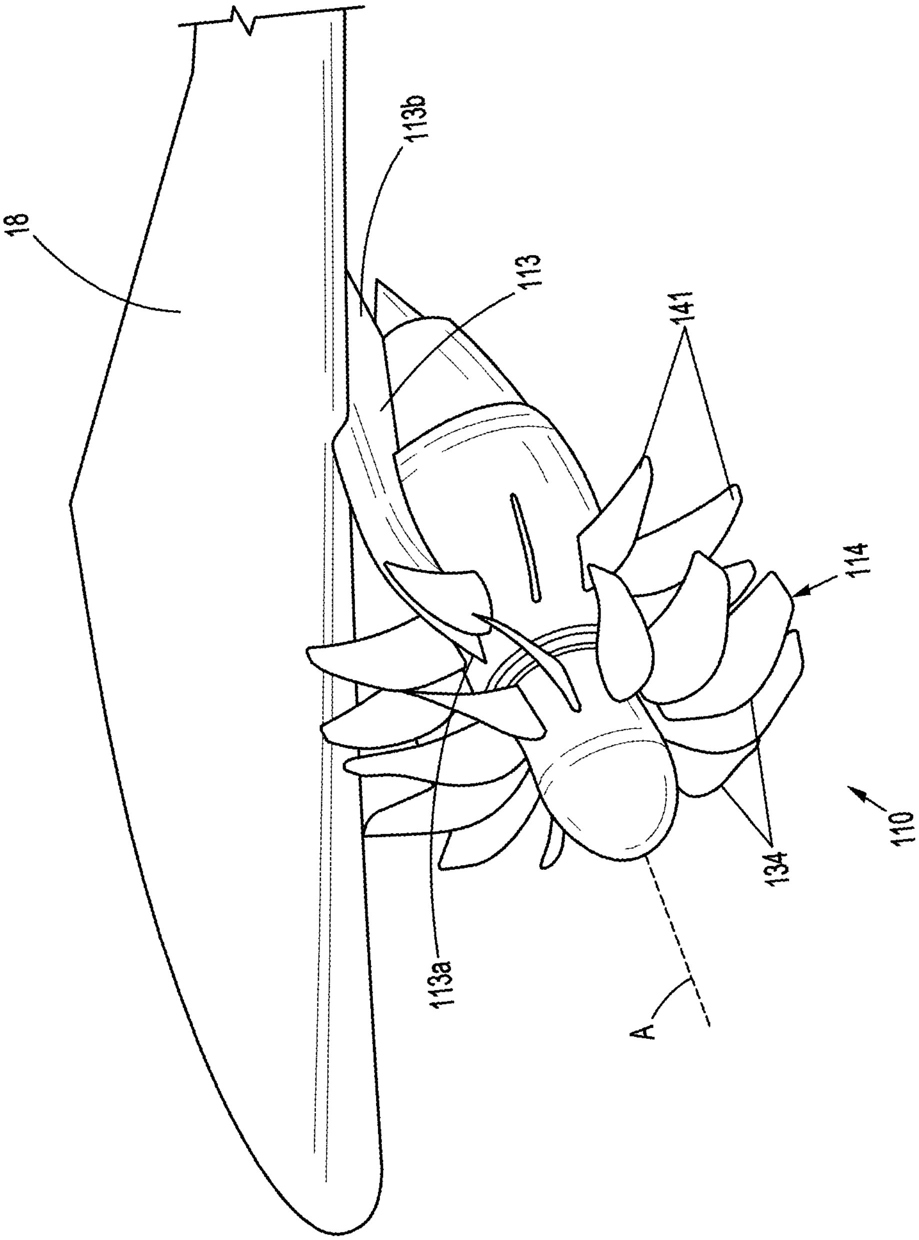
FIG. 12A comprises a perspective view of an embodiment of the unducted fan propulsor of FIG. 3 shown attached to a forward wing of the aircraft of FIG. 1.
Figure 12B:
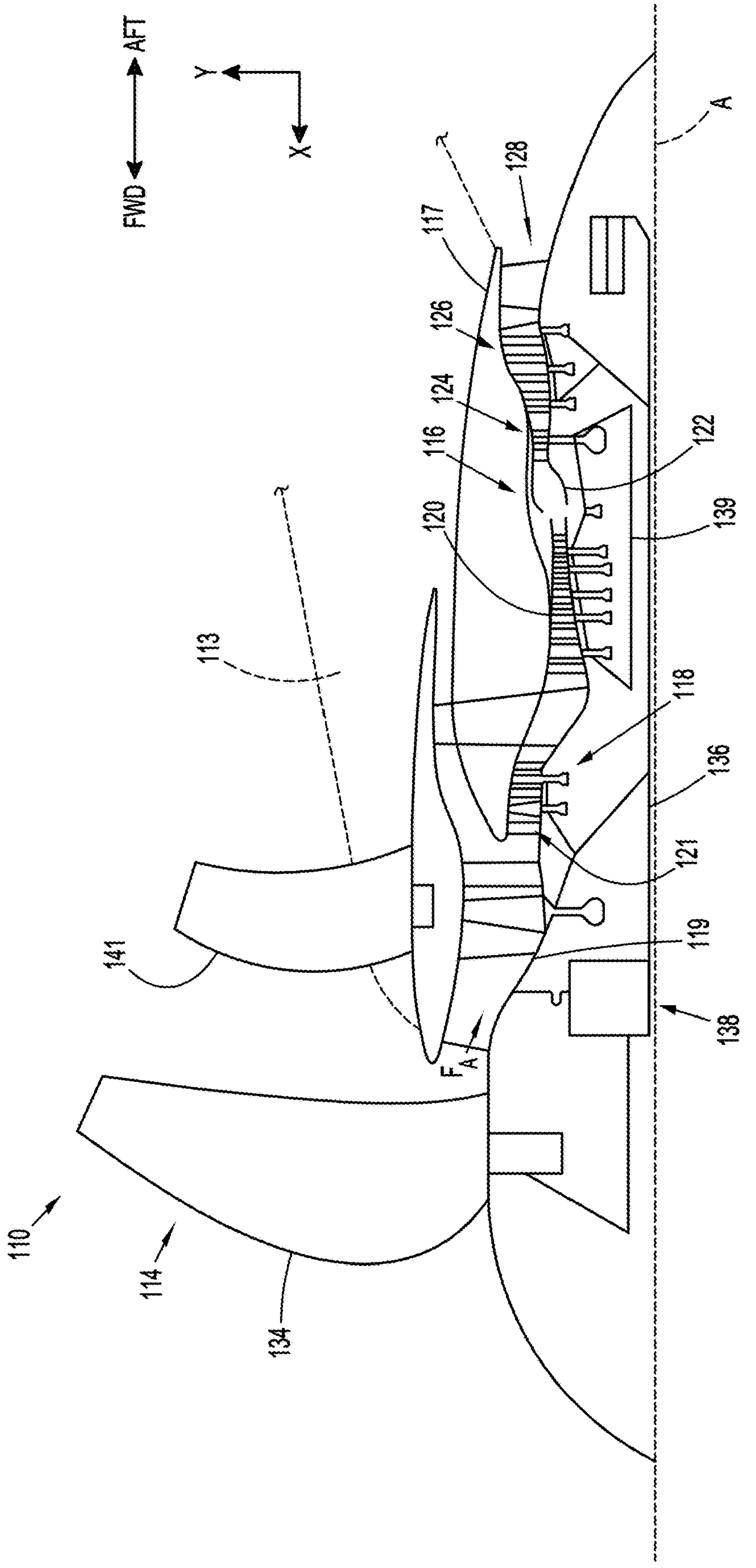
FIG. 12B comprises a schematic cross-sectional view of the unducted fan propulsor of FIG. 12A and illustrates a forward engine mount extending from the unducted fan propulsor, the forward engine mount shown in phantom for clarity, the unducted fan propulsor shown including a gearbox assembly and taken along a centerline of the unducted fan propulsor.

As engines increase in thrust and power, and as propulsors are positioned relative to wing quarter-chord locations in accordance with the aerodynamic placement criteria, the loading environments described become more challenging to accommodate while assuring sufficient life and durability of a gearbox assembly. Placement of the engine's gearbox relative to the quarter-chord location, or where the resultant lift and drag forces act on the wing section, can influence the amount of dynamic loads acting on the gearbox assembly and propulsor generally. One wants the pylon to connect to the engine forward of, or at coincident or adjacent the outlet guide vanes to minimize, e.g., moment loading due to an offset between the main load path, i.e., the fane frame to pylon. In some embodiments, the propulsor has a forward engine mount 113 (see FIGS. 12A and 12B illustrating forward engine mount 113 in the form of a pylon) that is more forward relative to the wing and/or fuselage as compared to conventional narrow body or regional gas turbine engine. The engine mount has a forward end that secures to the unducted fan propulsor fan frame near to the axial gearbox location. The forward engine mount or portions thereof (e.g., the forward end) can be positioned to extend to a location on the unducted fan propulsor that is adjacent to, aligned with, or forward of the gearbox assembly, at least one mounting member, or the rearward array of blades.

The inventors, recognizing that the aerodynamic benefits of quarter-chord placement would otherwise be offset by structural penalties in gearbox assembly alignment, evaluated different support configurations of gearbox assemblies to arrive at an improved design. In particular, by defining a mounting assembly for the gearbox assembly in terms of impedance parameters and impedance parameter ratios, the system is tuned to the specific bending, lateral, and torsional load environments introduced by the disclosed propulsor placement. The stiffness and damping values that define these impedance parameters can be understood as characteristics of the mounting members, and the impedance parameter ratios therefore reflect how these characteristics interact across different components or degrees of freedom. In some examples, each impedance parameter ratio is defined in terms of structural stiffness (K) and damping (C) of the respective mounting members of the mounting assembly, thereby accounting for both static and dynamic structural behavior. In certain aspects, the impedance parameter ratios are expressed as a function of at least one placement parameter, such as RL/D or θ, thereby directly linking propulsor placement geometry to gearbox assembly mounting design.

This arrangement provides a mounting assembly better suited to the combined aerodynamic and structural demands of the disclosed architectures, thereby extending gearbox assembly life and avoiding premature failure that would otherwise render the placement impractical. In some examples, the positioning line (R), including RL/D and θ, and the impedance parameter ratios of the mounting members are jointly selected to maximize propulsor thrust efficiency while ensuring gearbox assembly alignment. In some examples, the impedance parameter ratios of the mounting members vary in response to different propulsor placements between takeoff and cruise, thereby maintaining gearbox assembly alignment under the distinct operating conditions. In certain aspects, the impedance parameter ratios are configured to maintain gearbox alignment when the aircraft operates at a cruise Mach number between 0.7 and 0.9 and with a propulsor placement characterized by $0.07 \leq RL/D \leq 2.0$.

FIGS. 12A and 12B are views of an embodiment of the unducted fan propulsor 38 that is generally referred to as unducted fan propulsor 110 that is secured to wing 18 via forward engine mount 113 (e.g., a pylon) having a forward end 113*a* and rearward end 113*b*. The view shown in FIG. 12B of unducted fan propulsor 110 is taken along a center axis A that is a principal rotational axis. The unducted fan propulsor 110 includes a fan 114 having a first array of blades 134 that generates a core airflow FA as the first array of blades 134 rotates about axis A. The unducted fan propulsor 110 further includes a second array of blades 141 or vanes (e.g., outlet guide vanes), which are non-rotating or static. The unducted fan propulsor 110 includes an engine core 116 that receives the core airflow FA. The engine core 116 includes a casing 117 that encircles, in axial flow series, a low-pressure compressor 118, a high-pressure compressor 120, a combustion section 122, a high-pressure turbine 124, a low-pressure turbine 126, and a core exhaust nozzle 128. The core engine casing 117 generally defines a core flow passage 121 through which the core airflow FA flows. The fan 114 is coupled to and driven by the low-pressure turbine 126 via a low-pressure shaft 136 and a drive system such as a gearbox assembly 138.

In use, the core airflow FA is accelerated and compressed by the low-pressure compressor 118 and directed into the high-pressure compressor 120 where further compression takes place. The compressed air exhausted from the high-pressure compressor 120 is directed into the combustion section 122 where it is mixed with fuel and the mixture is combusted. The resultant hot combustion products then expand through, and thereby drive, the high-pressure turbine 124 and the low-pressure turbine 126 before being exhausted through the core exhaust nozzle 128. This provides propulsive thrust. The high-pressure turbine 124 drives the high-pressure compressor 120 by a high-pressure shaft 139. The fan 114 generally provides the majority of the propulsive thrust. The gearbox assembly 138 is a reduction gearbox assembly, power gearbox assembly that delivers a torque from the LP shaft 136 running at a first speed, to a fan shaft coupled to fan 114 running at a second, slower speed.

Figure 13:
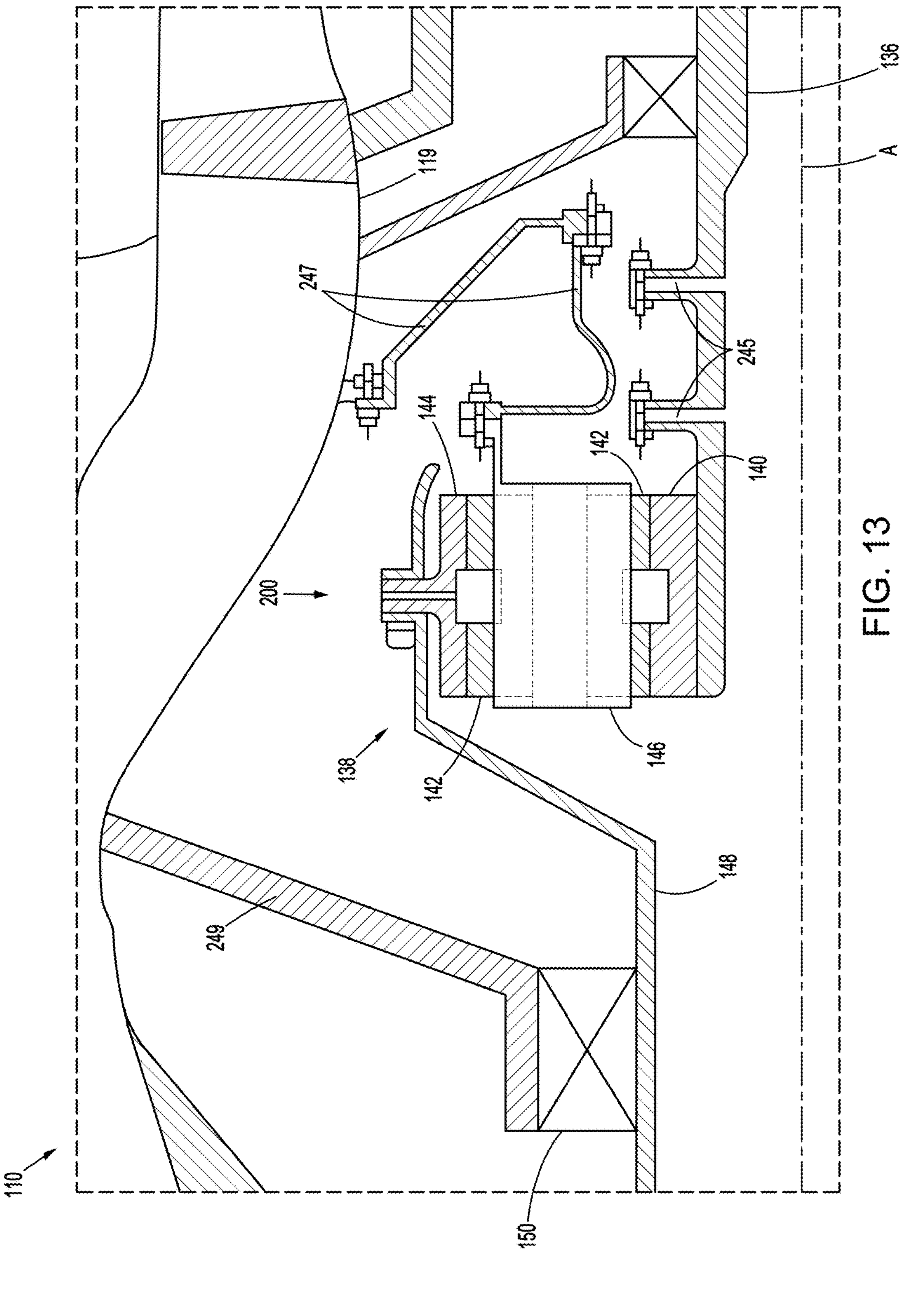
FIG. 13 comprises an enlarged, schematic cross-sectional view of the gearbox assembly of FIG. 12B.
Figure 14:
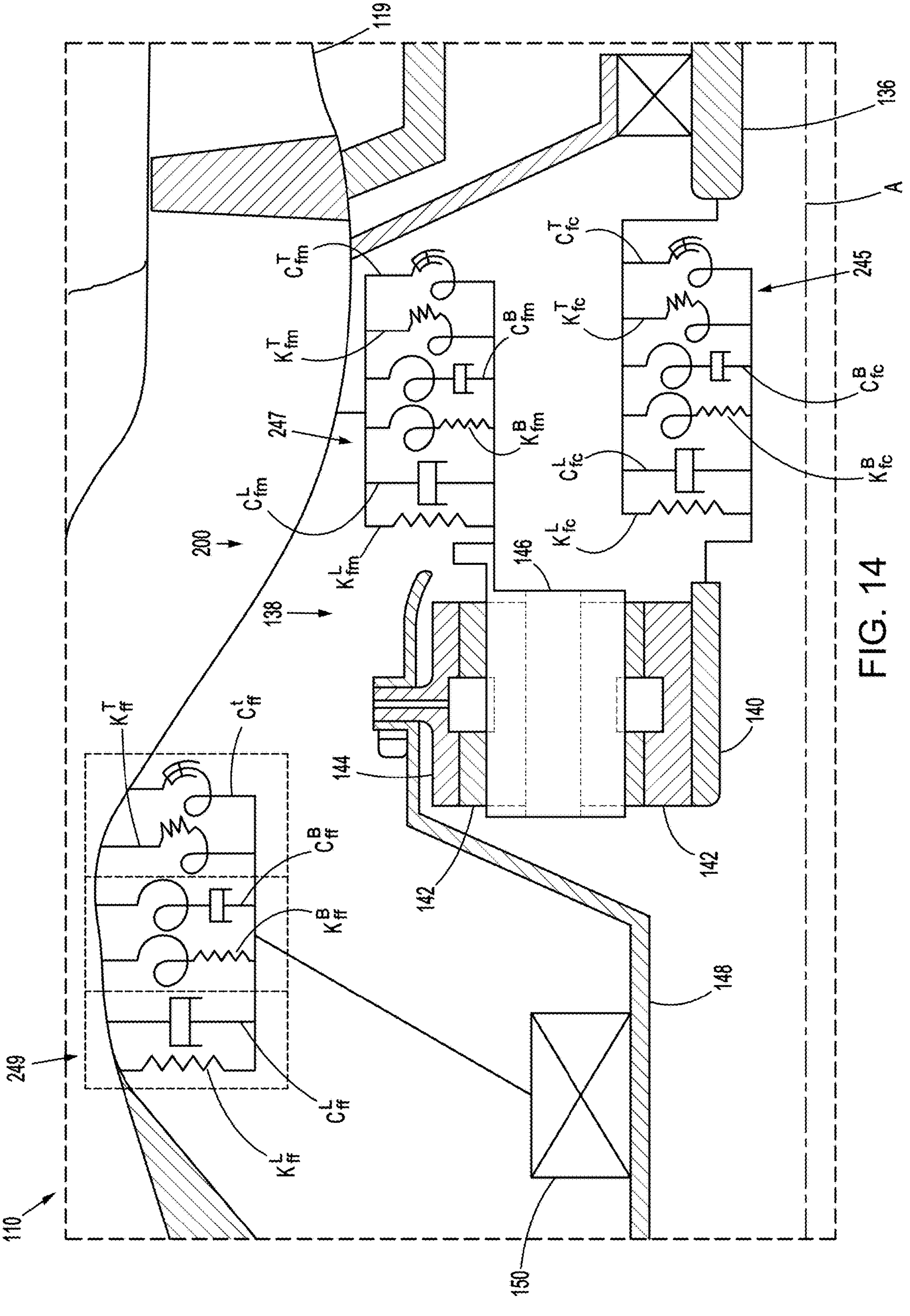
FIG. 14 comprises a schematic cross-sectional view of the gearbox assembly of FIG. 13, translated into a representative vibratory system.

FIGS. 13 and 14 illustrate enlarged, schematic side cross-sectional views of the gearbox assembly 138 of FIG. 12B with a mounting assembly 200. The mounting assembly 200 shown is configured for a star configuration gearbox assembly, described in more detail to follow. The gearbox assembly 138 includes a sun gear 140, a plurality of planet gears 142, and a ring gear 144. The low-pressure turbine 126 drives the low-pressure shaft 136, which is coupled to the sun gear 140 of the gearbox assembly 138. The sun gear 140 of the gearbox assembly 138 is coupled via a flex coupling 245 to the rotating low-pressure shaft 136.

Radially outwardly of the sun gear 140, and intermeshing therewith, is the plurality of planet gears 142 that are coupled together by a planet carrier 146. The planet carrier 146 of the gearbox assembly 138 is coupled, via a flex mount 247, to the engine static structure 119. The planet carrier 146 constrains the plurality of planet gears 142 while allowing each planet gear of the plurality of planet gears 142 to rotate about its own axis. Radially outwardly of the plurality of planet gears 142, and intermeshing therewith is the ring gear 144, which is an annular ring gear 144. The ring gear 144 is coupled via a fan shaft 148 to the fan 114 (FIG. 12) in order to drive rotation of the fan 114 about the axis A. The fan shaft 148 is coupled to a fan frame 249 via a fan bearing 150. The fan frame 249 couples the rotating ring gear 144 of the gearbox assembly 138 and, thus, the rotating fan shaft 148, to the engine static structure 119. The flex coupling 245, the flex mount 247, and the fan frame 249 define the mounting assembly 200 for the gearbox assembly 138. As described herein, the flex coupling 245, the flex mount 247, and the fan frame 249 can be referred to as mounting members.

With brief reference again to FIGS. 12A and 12B, forward end 113*a* of forward engine mount 113 is shown extending forward of rearward array 141, gearbox assembly 138, and at least some of the mounting members (e.g., flex coupling 245 and flex mount 247), although forward end 113*a* of forward engine mount 113 can be disposed in any suitable location along the unducted fan propulsor 110. For instance, forward end 113*a* can be disposed adjacent to, aligned with, and/or forward of at least one of the gearbox assembly 138, one or more of mounting members (e.g., fan frame 249, flex coupling 245, and/or flex mount 247), or the rearward array of blades 141 (e.g., vanes). In such forward positioning, the forward engine mount 113 or portions thereof (e.g., the forward end) cooperates with one or more of the mounting members (e.g., fan frame 249, flex coupling 245, and/or flex mount 247) to provide sufficient stiffness to maintain gearbox assembly alignment. This helps prevent misalignments that could otherwise result in pre-mature failure or wear of drive system components (e.g., gear assembly 138) such as bearings, seals, and other drive system elements. This forward positioning is particularly advantageous when increased or more efficient thrust forces act on the drive system due to the use of higher-pressure airflow. In some embodiments, the forward engine mount 113 or portions thereof (e.g., the forward end 113*a*) is coupled to the fan frame 249). However, in some embodiments, forward end 113*a* of forward engine mount 113 can extend to a location along the unducted fan propulsor 110 that is aft of rearward array 141, gearbox assembly 138, and/or at least some of the mounting members (e.g., flex coupling 245 and flex mount 247). In some embodiments, the forward engine mount 113 or portions thereof (e.g., the forward end 113*a*) is disposed at least aligned with and/or forward of a center of mass of the unducted fan propulsor 110. By maintaining alignment and stiffness, the forward engine mount 113 offsets scrubbing and interference drag effects that arise when the unducted fan propulsors 110 are positioned in the advantageous high-pressure locations described herein.

Although not depicted in FIGS. 13 and 14 for clarity, each of the sun gear 140, the plurality of planet gears 142, and the ring gear 144 includes teeth about their periphery to intermesh with the other gears. In the example of FIGS. 13 and 14, the gearbox assembly 138 is a star configuration. That is, the ring gear 144 rotates, while the planet carrier 146 is fixed and stationary. The planet carrier 146 constrains the plurality of planet gears 142 such that the plurality of planet gears 142 do not together rotate around the sun gear 140, while also enabling each planet gear of the plurality of planet gears 142 to rotate about its own axis. That is, since the plurality of planet gears 142 mesh with both the rotating ring gear 144 as well as the rotating sun gear 140, each of the plurality of planet gears 142 rotate about their own axes to drive the ring gear 144 to rotate about engine axis A (FIG. 12B) due to the rotation of the sun gear 140. The rotation of the ring gear 144 is conveyed to the fan 114 (FIG. 12B) through the fan shaft 148.

FIG. 14 illustrates the mounting assembly 200 of FIG. 13 translated into a representative vibratory system where each of the flex coupling 245, the flex mount 247, and the fan frame 249 are shown by representative structural properties of the members, the representative structural properties being the structural stiffness (K) and the damping (C) of the respective members of the mounting assembly 200. In some examples, each impedance parameter ratio is defined in terms of the structural stiffness (K) and damping (C) of the respective mounting members, thereby accounting for both static and dynamic structural behavior. As shown, each of the flex coupling 245, the flex mount 247, and the fan frame 249 includes the representative structural properties (structural stiffness and damping) in each of the lateral direction, the bending direction, and the torsional direction.

For example, FIG. 14 represents the gearbox assembly supporting structure in terms of structural properties characterizing the nature of the coupling between the gearbox and the flex coupling 245. The flex coupling 245 can be represented in terms of a flex coupling lateral stiffness $$K_{fc}^{L},$$

a flex coupling bending stiffness $$K_{fc}^{B},$$

a flex coupling torsional stiffness $$K_{fc}^{T},$$

a flex coupling lateral damping $$C_{fc}^{L},$$

a flex coupling bending damping $$C_{fc}^{B},$$

and a flex coupling torsional damping $$C_{fc}^{T}.$$

FIG. 14 also represents the gearbox assembly supporting structure in terms of structural properties characterizing the nature of the coupling between the gearbox and the flex mount 247. The flex mount 247 can be represented in terms of a flex mount lateral stiffness $$K_{fm}^{L},$$

a flex mount bending stiffness $$K_{fm}^{B},$$

a flex mount torsional stiffness $$K_{fm}^{T},$$

a flex mount lateral damping $$C_{fm}^{L},$$

a flex mount bending damping $$C_{fm}^{B},$$

and a flex mount torsional damping $$C_{fm}^{T}.$$

FIG. 14 also represents the gearbox assembly supporting structure in terms of structural properties characterizing the nature of the coupling between the gearbox and the fan frame 249. The fan frame 249 can be represented in terms of fan frame lateral stiffness $$K_{ff}^{L},$$

a fan frame bending stiffness $$K_{ff}^{B},$$

a fan frame torsional stiffness $$K_{ff}^{T},$$

a fan frame lateral damping $$C_{ff}^{L},$$

a fan frame bending damping $$C_{ff}^{B},$$

and a fan fram torsional damping $$C_{ff}^{T}.$$

Figure 15:
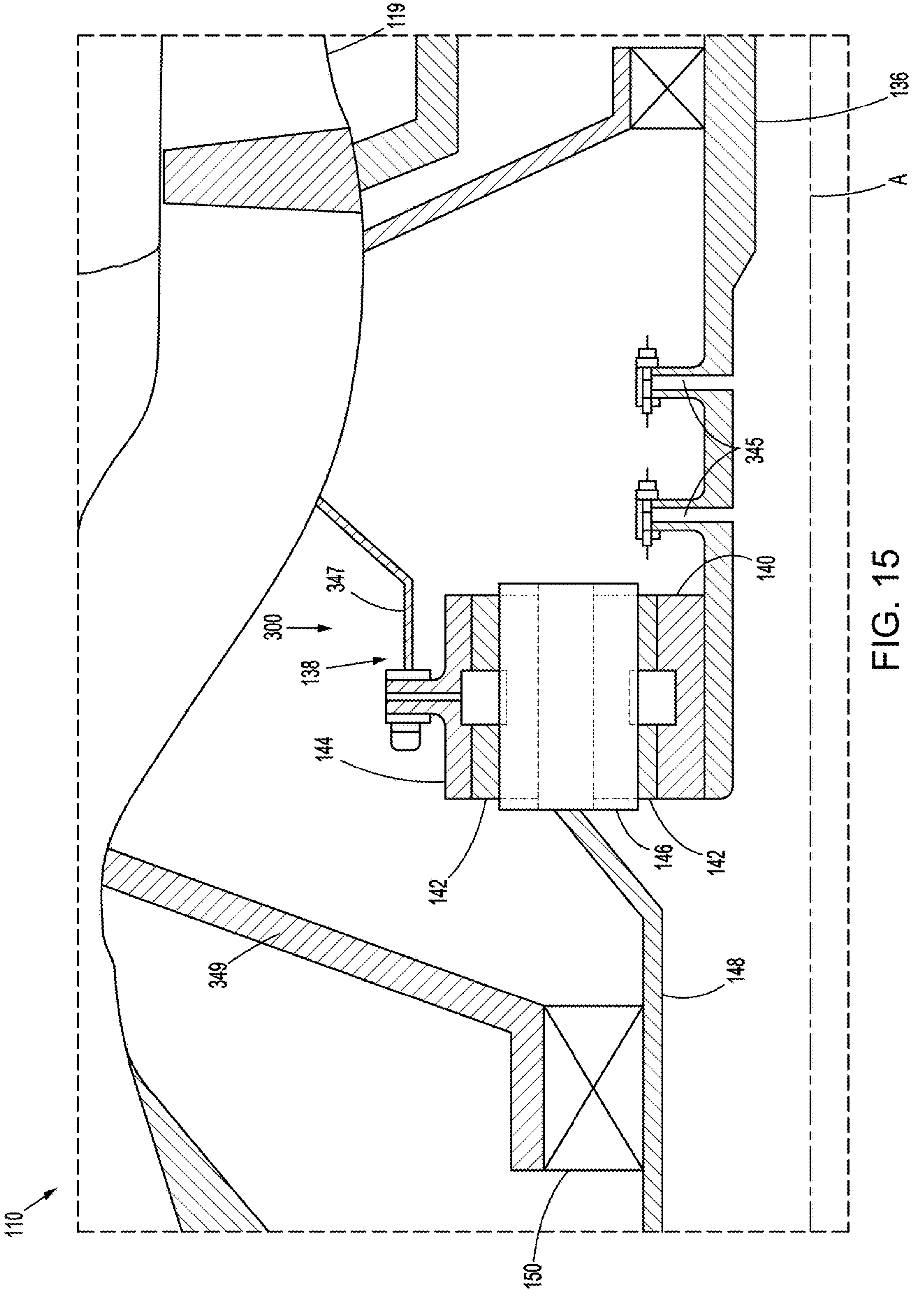
FIG. 15 comprises an enlarged, schematic cross-sectional view of another gearbox assembly of the unducted fan propulsor of FIG. 12B.
Figure 16:
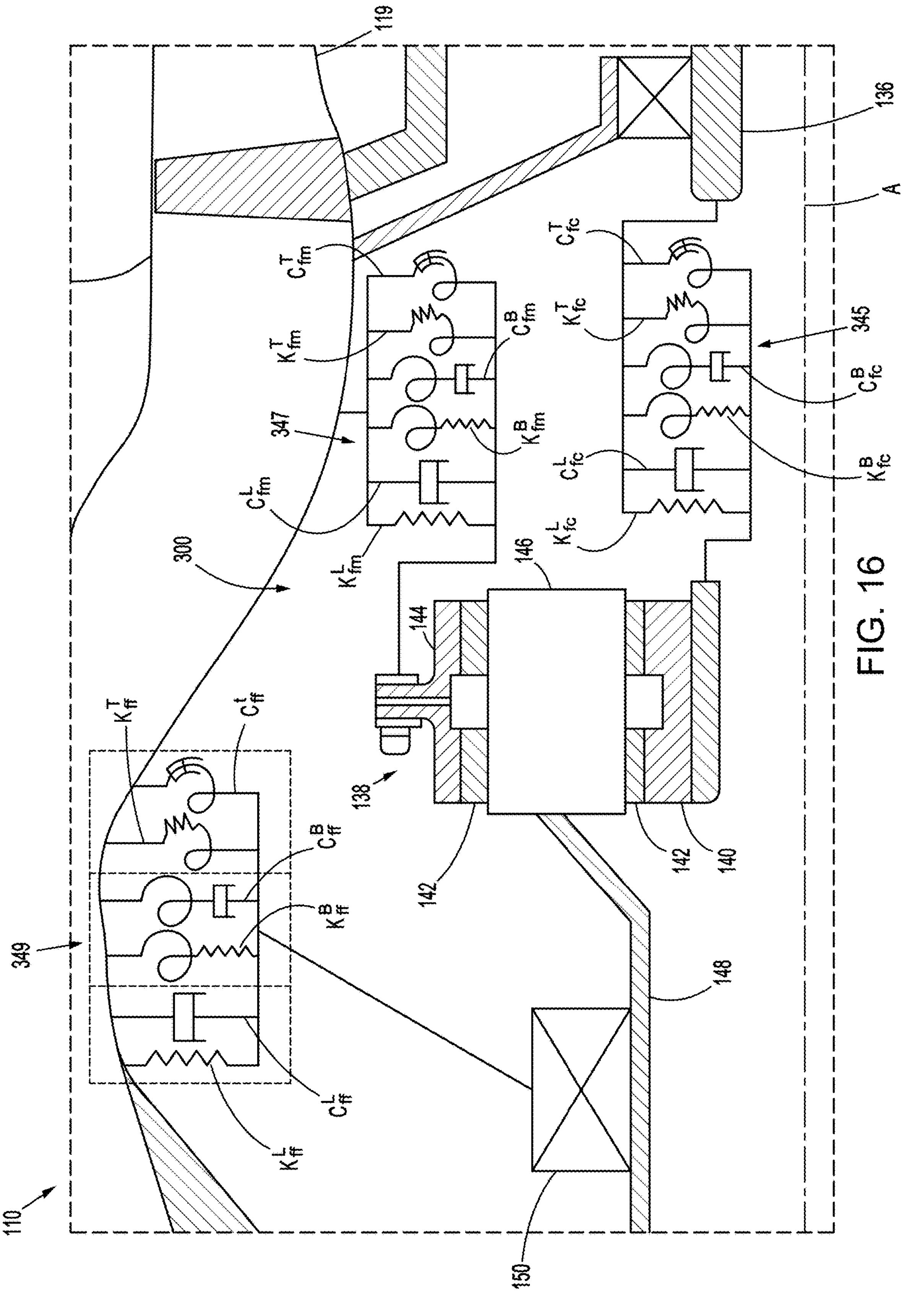
FIG. 16 comprises a schematic cross-sectional view of the gearbox assembly of FIG. 15, translated into a representative vibratory system.

FIGS. 15 and 16 illustrate enlarged, schematic side cross-sectional views of the gearbox assembly 138 of FIG. 12 with a mounting assembly 300. The mounting assembly 300 shown is that for a planetary configuration gearbox assembly, described in more detail to follow. As mentioned, the gearbox assembly 138 includes the sun gear 140, the plurality of planet gears 142, and the ring gear 144. The low-pressure turbine 126 (FIG. 12B) drives the low-pressure shaft 136, which is coupled to the sun gear 140 of the gearbox assembly 138. The sun gear 140 is coupled via a flex coupling 345 to the low-pressure shaft 136.

Radially outwardly of the sun gear 140, and intermeshing therewith, is the plurality of planet gears 142 that are coupled together by a planet carrier 146. The planet carrier 146 is coupled, via the fan shaft 148, to the fan 114 (FIG. 12B) to drive rotation of the fan 114 about the axis A. The fan shaft 148 is coupled to a fan frame 349 via the fan bearing 150. The planet carrier 146 constrains the plurality of planet gears 142 to rotate together about the sun gear 140, while also allowing each planet gear of the plurality of planet gears 142 to rotate about its own axis. Thus, the plurality of planet gears 142, the planet carrier 146, and the sun gear 140 rotate about the engine axis A. Radially outwardly of the plurality of planet gears 142, and intermeshing therewith, is the ring gear 144, which is an annular ring gear 144. The ring gear 144 is coupled via a flex mount 347 to the engine static structure 119. The flex coupling 345, the flex mount 347, and the fan frame 349 define the mounting assembly 300 for the gearbox assembly 138. As described herein, the flex coupling 345, the flex mount 347, and the fan frame 349 can be referred to as mounting members.

Although not depicted in FIGS. 15 and 16 for clarity, each of the sun gear 140, the plurality of planet gears 142, and the ring gear 144 includes teeth about their periphery to intermesh with the other gears. In the example of FIGS. 15 and 16, the gearbox assembly 138 is a planetary configuration. That is, the ring gear 144 is static (being fixedly mounted via the flex mount 347 to the engine static structure 119), while the planet carrier 146 and the plurality of planet gears 142 therein rotate about the engine centerline axis A. The planet carrier 146 constrains the plurality of planet gears 142 such that the plurality of planet gears 142 rotate together around the sun gear 140, while also enabling each planet gear of the plurality of planet gears 142 to rotate about its own axis. The rotation of the planet carrier 146 is conveyed to the fan 114 (FIG. 12) through the fan shaft 148.

FIG. 16 illustrates the mounting assembly 300 of FIG. 15 translated into a representative vibratory system where each of the flex coupling 345, the flex mount 347, and the fan frame 349 are shown by representative structural properties of the members, the representative structural properties being the structural stiffness (K) and the damping (C) of the respective members of the mounting assembly 300. As shown, each of the flex coupling 345, the flex mount 347, and the fan frame 349 includes the representative structural properties (structural stiffness and damping) in each of the lateral direction, the bending direction, and the torsional direction.

For example, FIG. 16 represents supporting structure for the gearbox assembly in terms of structural properties characterizing the nature of the coupling between the gearbox assembly and the flex coupling 345. The flex coupling 345 can be represented in terms of a flex coupling lateral stiffness $$K_{fc}^{L},$$

a flex coupling vending stiffness $$K_{fc}^{B},$$

a flex coupling torsional stiffness $$K_{fc}^{T},$$

a flex coupling lateral damping $$C_{fc}^{L},$$

a flex coupling bending damping $$C_{fc}^{B},$$

and a flex coupling torsional damping $$C_{fc}^{T}.$$

FIG. 16 also represents supporting structure for the gearbox assembly in terms of structural properties characterizing the nature of the coupling between the gearbox and the flex mount 347. The flex mount 347 can be represented in terms of a flex mount lateral stiffness $$K_{fm}^{L},$$

a flex mount bending stiffness $$K_{fm}^{B},$$

a flex mount torsional stiffness $$K_{fm}^{T},$$

a flex mount lateral damping $$C_{fm}^{L},$$

a flex mount bending damping $$C_{fm}^{B},$$

and a flex mount torsional damping $$C_{fm}^{T}.$$

FIG. 16 also represents supporting structure for the gearbox assembly in terms of structural properties characterizing the nature of the coupling between the gearbox assembly and the fan frame 349. The fan frame 349 can be represented in terms of a fan frame lateral stiffness $$K_{ff}^{L},$$

a fan frame bending stiffness $$K_{ff}^{B},$$

a fan frame torsional stiffness $$K_{ff}^{T},$$

a fan frame lateral damping $$C_{ff}^{L},$$

a fan frame bending stiffness $$C_{ff}^{B},$$

and a fan frame torsional damping $$C_{ff}^{T}.$$

As seen in FIGS. 13-15, the mounting assemblies for the gear box assembly in FIGS. 13 and 15 can be translated into a representative vibratory system, as shown in FIGS. 14 and 16, respectively. Each interface to the gearbox assembly, whether a fan frame, flex mount, or flex coupling has geometric qualities that translate to lateral, bending, and torsional stiffness and damping elements. For example, the flex mount support system can have relatively thin-walled undulating supports engineered to possess specific values for stiffness and damping. Support wall thickness and support member span or extent play a critical role in determining stiffness and damping values. Thinner members certainly allow for lower values stiffness quantities and shorter spans or member lengths contribute to higher values stiffness properties. Similarly, the two flex mount flex elements on the input shaft use member thickness and outer diameter to control stiffness and damping. As member thickness decreases and diaphragm diameter increases, stiffness properties decrease in the mounting location. For the fan frame support, it is good practice to design this mounting element and location to be as stiff as possible while minimizing weight. The fan support frame needs a high degree of stiffness due to potential fan overloads that can occur; like in a blade out failure scenario. Therefore, the design approach for the flex mount and flex element lateral and bending stiffness values are desired to be notably softer than the fan support frame, which allows for the gearbox assembly to follow the fan frame support movement while generating low reaction forces and moments at the flex mount and flex coupling mounting locations. Conversely, the torsional stiffness of the flex mount and flex coupling mounting elements is desired to be designed as stiff as possible since these elements are in the main torque transmission torque path with the fan.

Figure 17:
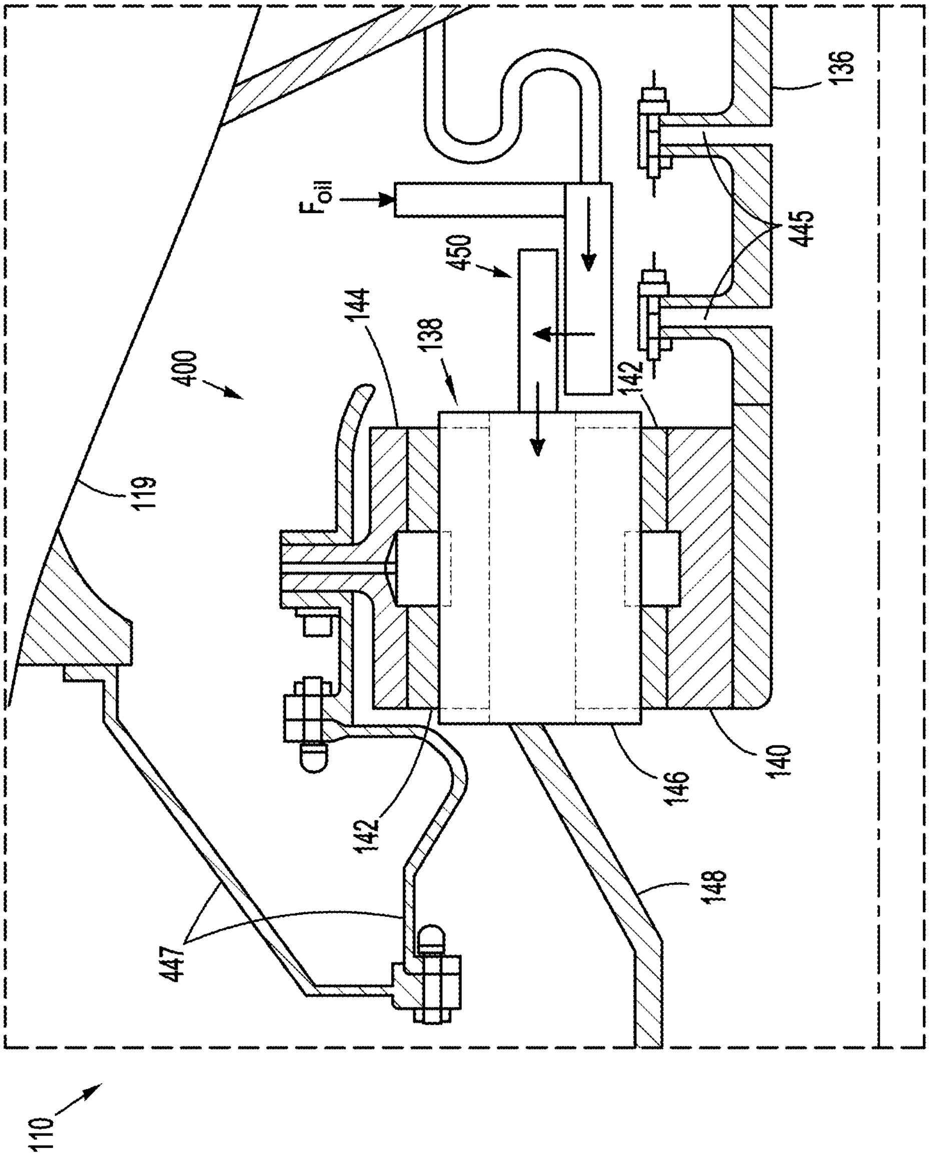
FIG. 17 comprises a schematic cross-sectional view of another gearbox assembly of the unducted fan propulsor of FIG. 12B with an oil transfer device.

FIG. 17 illustrates an enlarged, schematic side view of the gearbox assembly 138 of FIG. 12 with a mounting assembly 400. The mounting assembly 400 is configured for a planetary configuration, as described with respect to FIGS. 15 and 16. That is, the ring gear 144 is coupled with a flex mount 447 to the engine static structure 119. The plurality of planet gears 142 is constrained within a planet carrier 146, which is coupled to the fan shaft 148, and the sun gear 140 is coupled with a flex coupling 445 to the low-pressure shaft 136. Although not shown in FIG. 17, the fan shaft 148 can be coupled with a fan frame to the engine static structure, such as described with respect to FIGS. 15 and 16.

The gearbox assembly 138 can include an oil transfer device 450. The oil transfer device 450 allows an oil flow Foil to flow into the gearbox assembly 138 and to lubricate the plurality of planet gears 142, which in turn lubricates the sun gear 140 and the ring gear 144. Although shown with respect to a planetary configuration, the oil transfer device 450 can be provided in a gearbox assembly 138 having a star configuration (e.g., as shown and described with respect to FIGS. 13 and 14).

FIGS. 18A to 18C illustrate degrees of freedom associated with structural stiffness K and damping coefficient C. These degrees of freedom characterize the most significant directions of movement affecting the respective stiffness or damping properties of the component as it interacts with the gearbox assembly and engine frame(s) supporting it under loading conditions. The structural stiffness K and the damping coefficient C representations allowed the inventors to quantify the structural dynamic behavior of these degrees of freedom in a sufficiently accurate and representative manner, accounting for all factors in the component design that affect load transmission into the gearbox assembly.

In FIGS. 18A to 18C, the Z-axis coincides with the engine centerline A (FIG. 12), the Y-axis extends perpendicular to the Z-axis in a radial direction (the radial direction upward and downward as shown in FIG. 12), and the X-axis extends perpendicular to the Z-axis in a radial direction (the radial direction into and out of the page as shown in FIG. 12).

In FIG. 18A, the lateral stiffness $K^L$ and the lateral damping $C^L$ affect the lateral stiffness and the lateral damping of the respective mounting member (e.g., the flex mount, the fan frame, and the flex coupling). This results in the lateral stiffness $K^L$ and the lateral damping $C^L$ affecting the movement of the respective component in the lateral direction. The lateral direction includes the linear motion of the component in a Y-axis radial direction 800 and an X-axis radial direction 810.

In FIG. 18B, the bending stiffness $K^B$ and the bending damping $C^B$ affect the bending stiffness and the bending damping of the respective mounting member (e.g., the flex mount, the fan frame, and the flex coupling). This results in the bending stiffness $K^B$ and the bending damping $C^B$ affecting the rotational movement of the respective component in the bending direction. The bending direction includes the bending or rotational motion of the component in a yaw direction 820 and a pitch direction 830.

In FIG. 18C, the torsional stiffness $K^T$ and the torsional damping $C^T$ affect the torsional stiffness and the torsional damping of the respective mounting member (e.g., the flex mount, the fan frame, and the flex coupling). This results in the torsional stiffness $K^T$ and the torsional damping $C^T$ affecting the rotational movement of the respective component in a torsional direction 840 about the engine centerline (e.g., about the centerline A or Z-axis as shown in FIG. 12). This represents the load path of the gears and the torque of the respective component with respect to the fan 14 (FIG. 12).

When developing an unducted fan propulsor, the interplay among components can make it particularly difficult to select or to develop one component during engine design and prototype testing, especially when some components are at different stages of completion. For example, one or more components can be nearly complete, yet one or more other components can be in an initial or a preliminary phase, such that only one (or a few) design parameters are known. It is desired to arrive at what is possible at an early stage of design, so that the down selection of candidate optimal designs, given the tradeoffs, becomes more possible.

Heretofore, the process has sometimes been more ad hoc, selecting one design or another without knowing the impact when a concept is first taken into consideration. For example, and referring to FIG. 12B, various aspects of, for example, the fan 114 design, the casing 117 design, the engine static structure 119 design, the high-pressure shaft 139 design, and/or the low-pressure shaft 136 design may not be known, but such components impact the bending experienced by the unducted fan propulsor 110 and, thus, can influence the design of the mounting assembly of the gearbox assembly 138.

There is a desire to narrow the range of configurations or combination of features that can yield favorable results given the constraints of the design, feasibility, manufacturing, certification requirements, etc., early in the design selection process to avoid wasted time and effort, in addition to improving upon the types of mounting that are optimal for gearbox assembly longevity and better suited to satisfy mission requirements. During the course of the evaluation of different embodiments as set forth above, the inventors, discovered, unexpectedly, that there exists a relationship between the stiffness of a mounting member and the damping of a mounting member, which uniquely identifies a finite and readily ascertainable (in view of this disclosure) number of embodiments suitable for a particular architecture that addresses the movement of the gears due to the loading on the engine casing. This was found to enable a better system of mounting members, more optimal to the mechanical system, compared to existing methods. The relationship defined is the dynamic stiffness that accounts for both the static and the dynamic aspects of the mechanical system (e.g., the moving gears, the static mountings, the casing, etc.). The dynamic stiffness relationship is referred to by the inventors as an Impedance Parameter (Z), and is defined according to the following relationship (1) between the structural stiffness K and the equivalent damping coefficient, also referred to as viscous damping coefficient, C:

$$\text{Impedance Parameter } (Z) = K * C \tag{1}$$

As discussed above, each of the mounting members experiences movement in three degrees of freedom: lateral, bending, and torsional. Thus, each component includes a dynamic stiffness or an Impedance Parameter for each degree of freedom. That is, each component has a lateral Impedance Parameter ($Z^L$), a bending Impedance Parameter ($Z^B$), and a torsional Impedance Parameter ($Z^T$), as defined according to the following relationships (2) to (10), where "L" refers to "lateral," "B" refers to "bending," "T" refers to "torsional," "fm" refers to "flex mount," "ff" refers to "fan frame," and "fc" refers to "flex coupling":

$$\text{Impedance Parameter } (Z_{fm}^L) = K_{fm}^L * C_{fm}^L \tag{2}$$

$$\text{Impedance Parameter } (Z_{fm}^B) = K_{fm}^B * C_{fm}^B \tag{3}$$

$$\text{Impedance Parameter } (Z_{fm}^T) = K_{fm}^T * C_{fm}^T \tag{4}$$

$$\text{Impedance Parameter } (Z_{ff}^L) = K_{ff}^L * C_{ff}^L \tag{5}$$

$$\text{Impedance Parameter } (Z_{ff}^B) = K_{ff}^B * C_{ff}^B \tag{6}$$

$$\text{Impedance Parameter } (Z_{ff}^T) = K_{ff}^T * C_{ff}^T \tag{7}$$

$$\text{Impedance Parameter } (Z_{fc}^L) = K_{fc}^L * C_{fc}^L \tag{8}$$

$$\text{Impedance Parameter } (Z_{fc}^B) = K_{fc}^B * C_{fc}^B \tag{9}$$

$$\text{Impedance Parameter } (Z_{fc}^T) = K_{fc}^T * C_{fc}^T \tag{10}$$

Thus, referring back to FIGS. 13 to 16, relationships (2), (3), and (4) define Impedance Parameters for the flex mount 247 and the flex mount 347; relationships (5), (6), and (7) define Impedance Parameters for the fan frame 249 and the fan frame 349; and relationships (8), (9), and (10) define Impedance Parameters for the flex coupling 245 and the flex coupling 345.

The mounting members described in the present disclosure do not have a true viscous damping coefficient, but instead possess structural damping, also referred to as hysteretic damping. Hysteretic damping varies directly with the magnitude of displacement and can be defined by the relationship (11):

$$\text{Damping } (C) = \frac{h}{\omega} \tag{11}$$

where "h" is the hysteretic damping coefficient and w is the frequency of vibration. Thus, at lower vibrations the hysteretic damping tends to be greater, consistent with the magnitude of displacement expected at lower (vs. higher) vibrational frequencies. The hysteretic damping is further defined by the structural stiffness and the loss factor as shown in relationship (12).

$$\text{Hysteretic Coefficient } (h) = K * \eta \tag{12}$$

where "K" is the structural stiffness and n is the loss factor. The loss factor is defined by the material of the component. Some exemplary loss factors are shown in Table 7.

TABLE 7

| Material | Loss Factor (η) |
|---|---|
| Aluminum | 0.3 to 10 (x10$^{-5}$) |
| Lead (pure) | 5 to 30 (x10$^{-2}$) |
| Lead (with antimony | 1 to 4 (x10$^{-2}$) |
| Iron | 1 to 4 (x10$^{-4-}$) |
| Steel | 0.2 to 3 (x10$^{-4}$) |

Relationship (12) can be inserted into relationship (11) to define relationship (13):

$$\text{Damping } (C) = \frac{K * \eta}{\omega} \tag{13}$$

Relationship (13) can be inserted into relationship (1) to define relationship (14):

$$\text{Impedance Parameter } (Z) = \frac{K^2 * \eta}{\omega} \tag{14}$$

Therefore, as discussed above, each of the mounting members can have an impedance parameter defined according to the following relationships (15) to (23):

$$\text{Impedance Parameter } (Z_{fm}^L) = \frac{(K_{fm}^L)^2 * \eta}{\omega} \tag{15}$$

$$\text{Impedance Parameter } (Z_{fm}^B) = \frac{(K_{fm}^B)^2 * \eta}{\omega} \tag{16}$$

-continued $$\text{Impedance Parameter } (Z_{fm}^T) = \frac{(K_{fm}^T)^2 * \eta}{\omega} \tag{17}$$

$$\text{Impedance Parameter } (Z_{ff}^L) = \frac{(K_{ff}^L)^2 * \eta}{\omega} \tag{18}$$

$$\text{Impedance Parameter } (Z_{ff}^B) = \frac{(K_{ff}^B)^2 * \eta}{\omega} \tag{19}$$

$$\text{Impedance Parameter } (Z_{ff}^T) = \frac{(K_{ff}^T)^2 * \eta}{\omega} \tag{20}$$

$$\text{Impedance Parameter } (Z_{fc}^L) = \frac{(K_{fc}^L)^2 * \eta}{\omega} \tag{21}$$

$$\text{Impedance Parameter } (Z_{fc}^B) = \frac{(K_{fc}^B)^2 * \eta}{\omega} \tag{22}$$

$$\text{Impedance Parameter } (Z_{fc}^T) = \frac{(K_{fc}^T)^2 * \eta}{\omega} \tag{23}$$

Thus, referring back to FIGS. 13 to 16, relationships (15), (16), and (17) define Impedance Parameters for the flex mount 247 and the flex mount 347; relationships (18), (19), and (20) define Impedance Parameters for the fan frame 249 and the fan frame 349; and relationships (21), (22), and (23) define Impedance Parameters for the flex coupling 245 and the flex coupling 345.

The inventors, further discovered, during the course of optimization of, and in consideration of the different loading environments for a gearbox assembly and associated mission requirements, that a ratio of impedance parameters provided insights on the selection of more optimal gearbox assembly supporting components to use, versus choosing a component design without fully accounting or appreciating for the structural coupling between the components. The ratio can account for the effect that properties of one component can have on another in supporting a gearbox assembly. The Impedance Parameter Ratio (IPR) is expressed according to relationships (24) to (29):

$$IPR_{fm/ff}^L = \frac{Z_{fm}^L}{Z_{ff}^L} \tag{24}$$

$$IPR_{fm/ff}^B = \frac{Z_{fm}^B}{Z_{ff}^B} \tag{25}$$

$$IPR_{fm/ff}^T = \frac{Z_{fm}^T}{Z_{ff}^T} \tag{26}$$

$$IPR_{fc/ff}^L = \frac{Z_{fc}^L}{Z_{ff}^L} \tag{27}$$

$$IPR_{fC/ff}^B = \frac{Z_{fc}^B}{Z_{ff}^B} \tag{28}$$

$$IPR_{fc/ff}^T = \frac{Z_{fc}^T}{Z_{ff}^T} \tag{29}$$

where relationships (24) to (26) define an IPR of the flex mount with respect to the fan frame and relationships (27) to (29) define an IPR of the flex coupling with respect to the fan frame.

Although the examples above describe impedance parameter ratios between different mounting members, in some embodiments an impedance parameter ratio can alternatively be defined within a single mounting member, for example by comparing its torsional impedance parameter to its lateral or bending impedance parameters. This allows a single component to be characterized by relative impedance properties across its degrees of freedom.

The ratio of Impedance Parameters for the lateral stiffness and the bending stiffness is preferably designed to be low as compared to the fan frame. This allows the gears to move more easily together, while retaining uniform loading and reducing edge loading on gears. For example, as shown in the embodiments EMB1 and EMB2 to follow, the stiffness K of the fan frame is selected and predetermined as set forth in Table 8. The stiffness of the flex mount and the flex coupling is defined by the relationships herein, as described with respect to the embodiments to follow.

Unlike the lateral stiffness and the bending stiffness Impedance Parameter ratios, ratios for torsional stiffness are designed to be relatively high compared to the fan frame. Highly flexible torsional stiffness values for the flex coupling and the flex mount are undesirable as that leads to high stresses and introduce unwanted vibration modes into the system.

The present disclosure defines an Impedance Parameter Ratio of the three main gearbox assembly-engine interfaces (e.g., the fan frame, the flex coupling, and the flex mount). The design parameter not only accounts for stiffness, but also accounts for structural hysteresis in the form of equivalent viscous damping. The three main elements that interface the gearbox assembly are (1) the fan shaft with stiff connection to the fan frame, (2) the flex mount, and (3) the flex coupling from the input shaft. The magnitude of the ratio of Impedance Parameters is preferably made relative to the fan frame impedance as this was found to provide the most convenient indicator of relative impedance for choosing an optimal design.

The Impedance Parameter was found to be unique for two main reasons, as alluded to earlier. First, the Impedance Parameter not only accounts for structural stiffness (K), but also for damping (C). This allows the Impedance Parameter to account for the dynamics of the mechanical system in addition to the static performance or integrity of the mechanical system. The stiffness addresses static loads and operating conditions and the damping addresses dynamic scenarios, for example, under rotation and inflight maneuvers. Second, in addition to the lateral and the rotational or the bending stiffness, the Impedance Parameter defines desirable design choices for torsional stiffness as well.

As discussed further below, the inventors have identified a range of the Impedance Parameter for each of the mounting members, with respect to one another, that enable a mounting assembly 200 and the mounting assembly 300 design such that gears of the gearbox assembly 138 are best able to maintain gearbox assembly alignment during engine loading conditions (e.g., take off and climb). As mentioned, the lateral stiffness and the bending stiffness of each of the flex mount and the flex coupling are lower than the respective lateral stiffness and the bending stiffness of the fan frame. The ratio of the Impedance Parameter of the flex mount with respect to the fan frame for the lateral stiffness and the bending stiffness (e.g., the lateral IPR of relationship (24) and the bending IPR of relationship (25)) is less than or equal to 0.5. In some examples, the ratio is less than or equal to 0.4. In some examples, the ratio is between 0.1 and 0.5. In some examples, the ratio is between 0.1 and 0.4. In some examples, the ratio is between 0.1 and 0.5. In some examples, the ratio is between 0.1 and 0.4. In some examples, the ratio is between 0.2 and 0.5. In some examples, the ratio is between 0.3 and 0.4. In some examples, the ratio is 0.1, 0.2, 0.3, 0.4, 0.5, or any discrete value between 0.1 and 0.5.

The ratio of the Impedance Parameter of the flex coupling with respect to the fan frame for the lateral stiffness and the bending stiffness (e.g., the lateral IPR of relationship (27) and the bending IPR of relationship (28)) is less than or equal to 0.5. In some examples, the ratio is less than or equal to 0.4. In some examples, the ratio is between 0.1 and 0.5. In some examples, the ratio is between 0.01 and 0.4. In some examples, the ratio is between 0.1 and 0.5. In some examples, the ratio is between 0.1 and 0.4. In some examples, the ratio is between 0.02 and 0.5. In some examples, the ratio is between 0.3 and 0.4. In some examples, the ratio is 0.1, 0.2, 0.3, 0.4, 0.5, or any discrete value between 0.1 and 0.5.

The torsional stiffness of each of the flex mount and the flex coupling is closer to the torsional stiffness of the fan frame. The ratio of the Impedance Parameter of the flex mount with respect to the fan frame and the flex coupling with respect to the fan frame for the torsional stiffness (e.g., the IPR of relationships (26) and (29)) is greater than or equal to 0.1. In some examples, the ratio is greater than or equal to 0.4. In some examples, the ratio is between 0.1 and 0.95. In some examples, the ratio is between 0.4 and 0.95.

Tables 8 to 11 describe exemplary embodiments EMB1 and EMB2 identifying the Impedance Parameter for any suitable engine types such as open fans or turboprops. The exemplary engines of embodiments EMB1 and EMB2 can be employed with narrow body airframes or wide body airframes. The exemplary engines of embodiments EMB1 and EMB2 can include a gearbox assembly mounted with a mounting assembly 200 in a star configuration (e.g., as described with respect to FIGS. 13 and 14) or can include a gearbox assembly mounted with a mounting assembly 300 in a planetary configuration (e.g., FIGS. 15 and 16). Table 8 describes the structural stiffness K of the fan frame. The values above are exemplary for embodiments EMB1 and EMB2. Other structural stiffnesses for the fan frame can be selected. The structural stiffness of the fan frame can be defined by material properties, component dimensions, and other known factors that affect structural stiffness.

TABLE 8

| Embodiment | $K_{ff}^{L}$ (lb/in) | $K_{ff}^{B}$ (in-lb/rad) | $K_{ff}^{T}$ (in-lb/rad) |
|---|---|---|---|
| EMB1 | 1,020,408 | 448,430,493 | 1E+12 |
| EMB2 | 800,000 | 351,569,506 | 1E+12 |

The values for lateral, bending, and torsional structural stiffnesses of the fan frame for embodiments EMB1 and EMB2 are exemplary. The lateral structural stiffness of the fan frame can be less than or equal to 1,200,000 lb/in. In some examples, the lateral structural stiffness of the fan frame can be in the range of 400,000 lb/in to 1,200,000 lb/in, or any value or subrange therebetween. In some examples, the lateral structural stiffness of the fan frame can be in the range of 800,000 lb/in to 1,020,408 lb/in, or any value or subrange therebetween.

The bending structural stiffness of the fan frame can be less than or equal to 600,000,000 in-lb/rad. In some examples, the bending structural stiffness of the fan frame can be in the range of 200,000,000 in-lb/rad to 600,000,000 in-lb/rad, or any value or subrange therebetween. In some examples, the bending structural stiffness of the fan frame can be in the range of in the range of 351,569,506 in-lb/rad and 448,430,493 in-lb/rad, or any value or subrange therebetween.

The torsional structural stiffness of the fan frame can be 1E+12 in-lb/rad. In some examples, the torsional structural stiffness of the fan frame can be between 1E+11 in-lb/rad and 5E+12 in-lb/rad, or any value or subrange therebetween.

The lateral, bending and torsional stiffness values for the fan frame vary in this manner depending on thrust class, fan frame design, bearing placements and types of bearings supporting the gearbox assembly position and their relative placements to the gearbox assembly, size of the fan and other parts of engine where the fan frame is the primary loading bearing structure.

Once the fan frame values are generally known, it can be determined, using the IPR, the optimal design for the structure supporting the gearbox assembly, starting from the general guideline of the stiffness for the flex mount and the flex coupling are lower (in the case of lateral and bending stiffness) or higher (in the case of torsional stiffness) than the fan frame.

When used in combination a desirable stiffness for the flex mount and the flex coupling can be determined. For example, the relationships (15) and (18) are imported into the relationship (24) and the relationships (16) and (19) are imported into the relationship (25) to determine the structural stiffness of the flex mount in the lateral and bending directions, as defined in relationship (30). The relationships (17) and (20) are imported into the relationship (26) to determine the structural stiffness of the flex mount in the torsional direction, as defined in relationship (31).

The structural stiffness K of the flex mount is determined for steel and ground idle vibrations with an Impedance Parameter Ratio (IPR) of less than or equal to 0.5 for the lateral and bending directions and an IPR of greater than or equal to 0.01 for torsion. The loss factor $\eta$ is 0.2 to 0.0003 for steel and rotational frequency of vibration $\omega$ for ground idle can be taken as 3 krpm (314 rad/sec), which represents an average low pressure turbine rotational frequency of vibration lower than or equal to that experienced at ground idle conditions. This results in a structural stiffness of the flex mount defined by the relationship (30) for lateral and bending and the relationship (31) for torsional:

$$K_{fm} \leq 0.71\ K_{ff} \tag{30}$$

$$K_{fm} \geq 0.1\ K_{ff} \tag{31}$$

Inserting the values of Table 2 into relationships (30) and (31), the structural stiffness of the flex mount are determined as shown in Table 9.

TABLE 9

| Embodiment | $K_{fm}^{L}$ (lb/in) | $K_{fm}^{B}$ (in-lb/rad) | $K_{fm}^{T}$ (in-lb/rad) |
|---|---|---|---|
| EMB1 | ≤724,489 | ≤318,385,650 | >1E+11 |
| EMB2 | ≤568,000 | ≤249,614,395 | ≥1E+11 |

The values of the structural stiffness of the flex mount for embodiments EMB1 and EMB2 are exemplary. As discussed above, the structural stiffness of the flex mount can be determined as a relationship to the structural stiffness of the fan frame. Thus, the ranges of the respective lateral structural stiffness, bending structural stiffness, and torsional structural stiffness for the fan frame set forth above can be imparted into relationships (30) and (31) to determine the ranges of the respective lateral structural stiffness, bending structural stiffness, and torsional structural stiffness for the flex mount.

A similar process is performed to arrive at the structural stiffness of the flex coupling. That is, the relationships (21) and (18) are imported into the relationship (27) and the relationships (22) and (19) are imported into the relationship (28) to determine the structural stiffness of the flex coupling in the lateral and bending directions as defined in relationship (32). The relationships (23) and (20) are imported into the relationship (29) to determine the structural stiffness of the flex coupling in the torsional direction as defined in relationship (33).

The structural stiffness K of the flex coupling is determined for steel and ground idle vibrations with an IPR of less than or equal to 0.5 for the lateral and bending directions and an IPR of greater than or equal to 0.01 for the torsional direction. The loss factor η is 0.2 to 0.0003 for steel and the frequency of vibration ω for ground idle can be taken as 3 krpm (314 rad/sec), which represents a frequency of vibration lower than or equal to that experienced at ground idle conditions. This results in a structural stiffness of the flex coupling defined by the relationship (32) for lateral and bending and the relationship (33) for torsional:

$$K_{fc} \leq 0.71\ K_{ff} \tag{32}$$

$$K_{fc} \geq 0.1\ K_{ff} \tag{33}$$

Inserting the values of Table 8 into relationships (32) and (33), the structural stiffness of the flex coupling are determined as shown in Table 10.

TABLE 10

| Embodiment | $K_{fc}^{L}$ (lb/in) | $K_{fc}^{B}$ (in-lb/rad) | $K_{fc}^{T}$ (in-lb/rad) |
|---|---|---|---|
| EMB1 | ≤724,489 | ≤318,385,650 | >1E+11 |
| EMB2 | ≤568,000 | ≤249,614,395 | ≥1E+11 |

The values of the structural stiffness of the flex coupling for embodiments EMB1 and EMB2 are exemplary. As discussed above, the structural stiffness of the flex coupling can be determined as a relationship to the structural stiffness of the fan frame. Thus, the ranges of the respective lateral structural stiffness, bending structural stiffness, and torsional structural stiffness for the fan frame set forth above can be imparted into relationships (32) and (33) to determine the ranges of the respective lateral structural stiffness, bending structural stiffness, and torsional structural stiffness for the flex coupling.

Figure 19A:
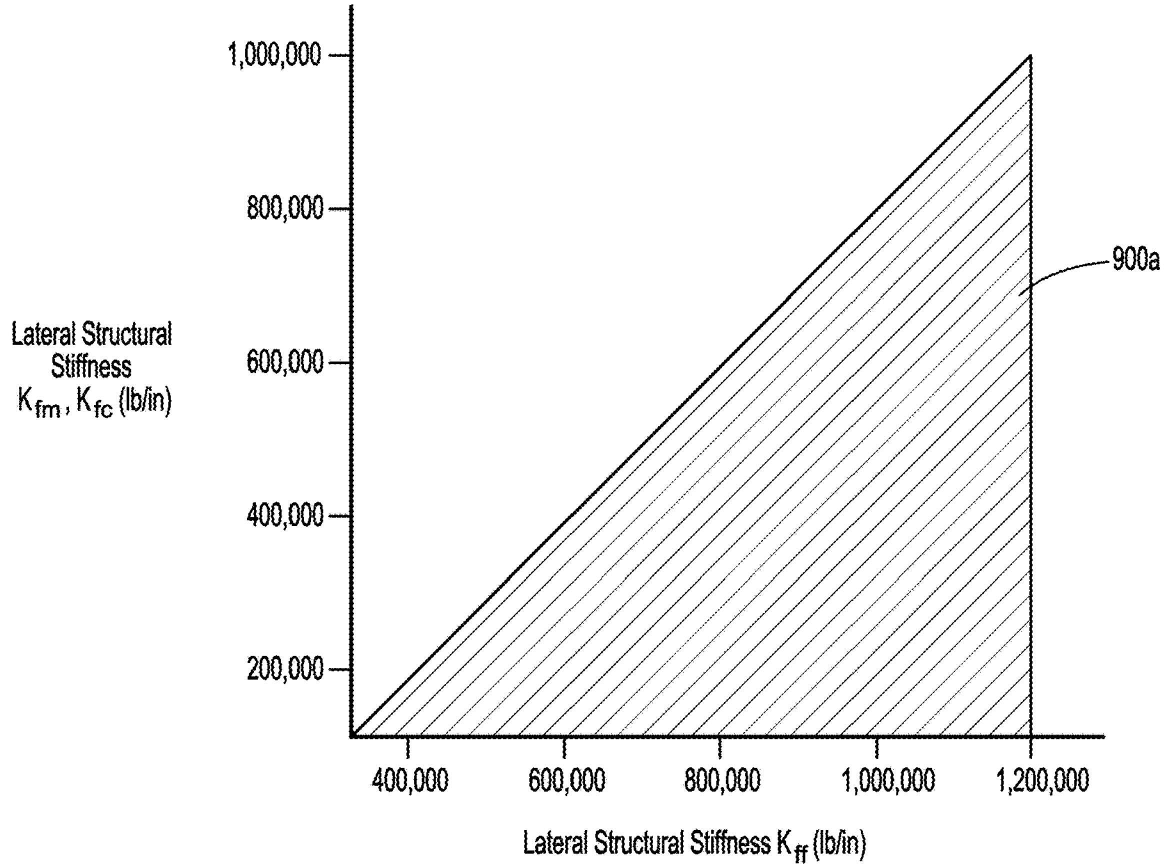
FIG. 19A comprises a graph illustrating lateral structural stiffness of a flex coupling and a flex mount as a function of lateral structural stiffness of a fan frame.
Figure 19B:
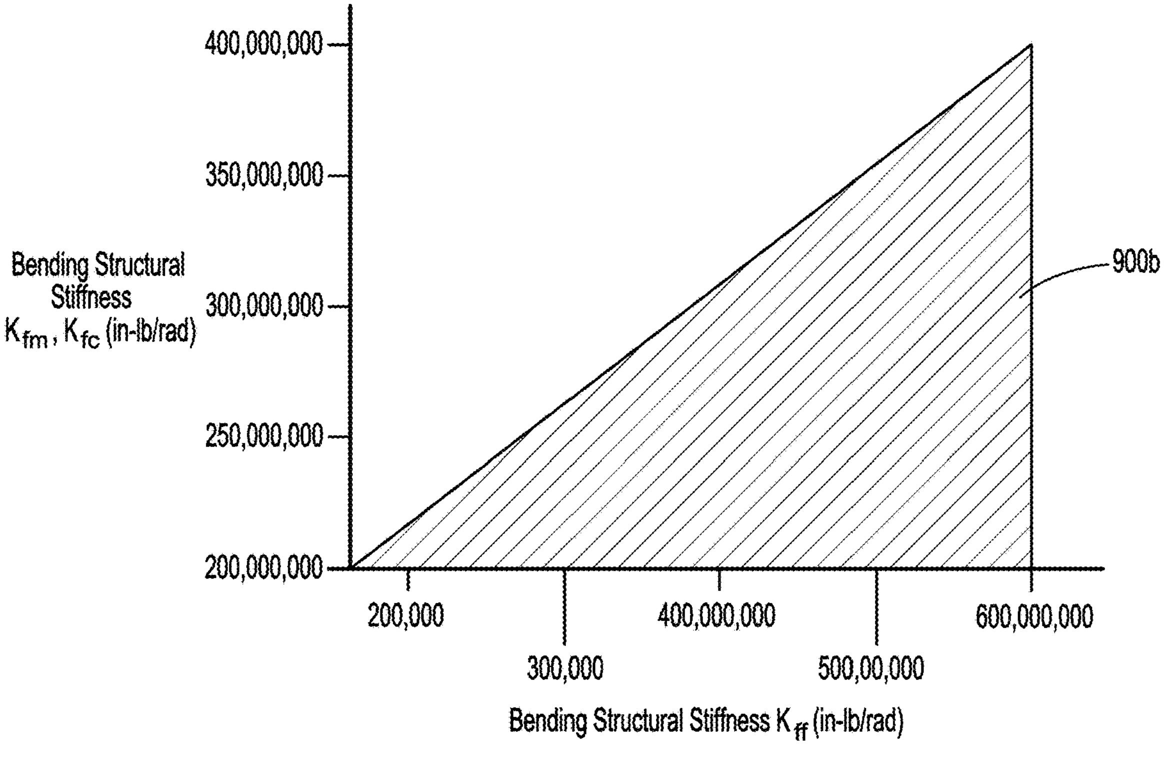
FIG. 19B comprises a graph illustrating bending structural stiffness of the flex coupling and the flex mount as a function of bending structural stiffness of the fan frame.
Figure 19C:
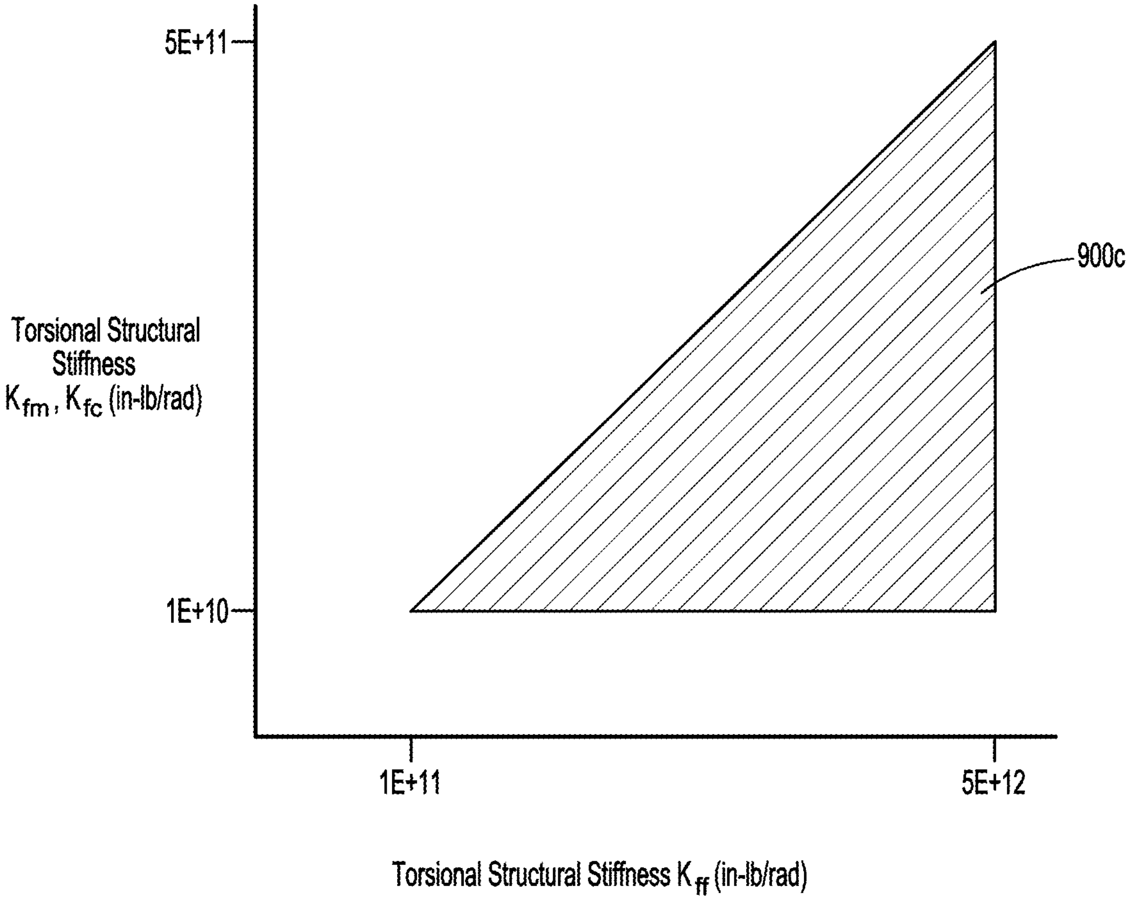
FIG. 19C comprises a graph illustrating torsional structural stiffness of the flex coupling and the flex mount as a function of torsional structural stiffness of the fan frame.

Thus, as shown in FIGS. 19A to 19C, the structural stiffness of each of the flex coupling and the flex mount are a function or factor of the structural stiffness of the fan frame. For example, in FIG. 19A, the lateral structural stiffness of the flex mount and the flex coupling are a function of the lateral structural stiffness of the fan frame, as shown by area 900*a*. In FIG. 19B, the bending structural stiffness of the flex mount and the flex coupling are a function of the bending structural stiffness of the fan frame, as shown by area 900*b*. In FIG. 19C, the torsional structural stiffness of the flex mount and the flex coupling are a function of the torsional structural stiffness of the fan frame, as shown by area 900*c*.

Furthermore, relying on Tables 8 to 10, the Impedance Parameter for the fan frame is determined for embodiments EMB1 and EMB2, to fall within the ranges shown in Table 11.

TABLE 11

| Embodiment | $Z_{ff}^{L}$ (lb/in)$^2$-s/rad | $Z_{ff}^{B}$ (lb-in)$^2$-s/rad$^3$ | $Z_{ff}^{T}$ (lb-in)$^2$-s/rad$^3$ |
|---|---|---|---|
| EMB1 | 9.63E+8 to 9.95E+5 | 1.28E+14 to 1.92E+11 | 6.36E+20 to 9.55E+17 |
| EMB2 | 4.08E+8 to 6.11E+5 | 7.87E+13 to 1.18E+11 | 6.37E+20 to 9.55E+17 |

Accordingly, as discussed above, The Impedance Parameter not only accounts for structural stiffness (K), but also for damping (C). This allows the Impedance Parameter to account for the dynamics of the mechanical system in addition to the static performance or integrity of the mechanical system. The stiffness addresses static loads and operating conditions and the damping addresses dynamic scenarios, for example, under rotation and inflight maneuvers. In addition to the lateral and the rotational or the bending stiffness, the Impedance Parameter defines desirable design choices for torsional stiffness as well.

The aerodynamic placement of unducted fan propulsors relative to quarter-chord locations on supporting wings or stabilizers, while advantageous for thrust efficiency and acoustic performance, inherently alters the distribution of forces transmitted through the engine and its mounting members. These altered forces generate complex bending, lateral, and torsional reactions that, if unmitigated, can lead to gearbox assembly misalignment, uneven torque distribution, and accelerated wear of rotating components. To address these interrelated aerodynamic and structural challenges, the present disclosure further provides a mounting assembly defined in terms of impedance parameters and impedance parameter ratios, which balance stiffness and damping characteristics of the flex mounts, flex couplings, and fan frame relative to one another. By tuning these relationships, the mounting assembly accommodates the dynamic reactions associated with the disclosed propulsor placement while maintaining alignment of the geartrain and durability of the transmission system. Thus, the disclosed aerodynamic placement and impedance-based mounting are presented as complementary aspects of a unified architecture, wherein the placement defines new efficiency opportunities and the mounting assembly ensures that such opportunities can be realized in practice under demanding flight conditions. In some embodiments, the aircraft further includes a forward engine mount having a forward end and a rearward end. The forward end, for example, of the forward engine mount can be positioned in location provides a more direct and inherently stiffer frame structure for coupling the gearbox mounting members, thereby cooperating with the mounting members to provide sufficient stiffness to maintain gearbox assembly alignment. For instance, such placement of the forward engine mount can be adjacent to, aligned with, or forward of the gearbox assembly, at least one mounting member, or the rearward array of blades.

In some embodiments, an impedance parameter ratio may be defined within a single mounting member rather than only between different mounting members. For example, a flex mount can have torsional, lateral, and bending impedance parameters, and the ratio of torsional impedance to lateral impedance can serve as a design parameter indicative of how the mount balances torque transmission with lateral compliance. Similarly, a flex coupling may be characterized by a ratio of bending to torsional impedance. As illustrated in FIGS. 18A-18C, each mounting member can be represented in terms of its lateral, bending, and torsional stiffness and damping properties, and ratios among these parameters provide a useful measure of the relative behavior of a given component across its degrees of freedom. Such intra-member ratios can be selected to maintain gearbox assembly alignment under the altered forces resulting from the disclosed propulsor placement.

Further aspects of the disclosure are provided by the subject matter of the following clauses:

Clause 1: An aircraft is provided that includes a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

In the preceding clause, the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

In any of the preceding clauses, the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

In any of the preceding clauses, the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

In any of the preceding clauses, the unducted fan propulsor is undermounted to the airfoil, such as a wing, with one or more intermediate structures.

In any of the preceding clauses, the unducted fan propulsor has a cruise flight Mach $M_0$ of between 0.70 and 0.85, between 0.5 and 0.9, between 0.7 and 0.9, or between 0.75 and 0.9.

In any of the preceding clauses, the rotating blades diameter is between 8 to 16 feet or between 12 to 16 feet. In any of the preceding clauses, the aircraft having a wing defining the airfoil and one or two unducted fan propulsors are mounted to the wing.

In any of the preceding clauses, wherein the aircraft are aircraft types A, B, C or G as defined in Tables 1 and 2.

Clause 2: An aircraft is provided including a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein $0.065<RL/D<1.98$ and θ is between 187° and 340°, and wherein RL/D and θ of the P of the unducted fan propulsor adhere to the following expressions:

$$\frac{RL}{D}+\frac{\left(\sqrt{\begin{matrix}1.4161*\left[1.88978*\sin^2(\theta)-0.0875*\right.\\ \left.\cos^2(\theta)+0.477*\sin(\theta)*\cos(\theta)\right]\end{matrix}}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{\begin{matrix}1.4161*\left[1.88978*\sin^2(\theta)-0.0875*\right.\\ \left.\cos^2(\theta)+0.477*\sin(\theta)*\cos(\theta)\right]\end{matrix}}+1.764*\sin(\theta)+0.19146*\cos(\theta)\right)}{1.96*\sin^2(\theta)+0.7225*\cos^2(\theta)}<0.$$

In the preceding clause, 0.254<RL/D<1.86 and 0 is between 199° and 306°, and the P of the unducted fan propulsor is defined by the following expressions:

$$\frac{RL}{D}+\frac{\left(\sqrt{\begin{matrix}0.52621*\left[0.7205*\sin^2(\theta)-0.352*\right.\\ \left.\cos^2(\theta)+0.7448*\sin(\theta)*\cos(\theta)\right]\end{matrix}}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{\begin{matrix}0.52621*\left[0.7205*\sin^2(\theta)-0.352*\right.\\ \left.\cos^2(\theta)+0.7448*\sin(\theta)*\cos(\theta)\right]\end{matrix}}+0.8476*\sin(\theta)+0.23119*\cos(\theta)\right)}{0.8649*\sin^2(\theta)+0.6084*\cos^2(\theta)}<0.$$

In any of the two preceding clauses, 0.369<RL/D<1.43 and 0 is between 204° and 291°, and the P of the unducted fan propulsor is defined by the following expressions:

$$\frac{RL}{D}+\frac{\left(\sqrt{\begin{matrix}0.52621*\left[0.7205*\sin^2(\theta)-0.352*\right.\\ \left.\cos^2(\theta)+0.7448*\sin(\theta)*\cos(\theta)\right]\end{matrix}}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{\begin{matrix}0.52621*\left[0.7205*\sin^2(\theta)-0.352*\right.\\ \left.\cos^2(\theta)+0.7448*\sin(\theta)*\cos(\theta)\right]\end{matrix}}+0.8476*\sin(\theta)+0.23119*\cos(\theta)\right)}{0.8649*\sin^2(\theta)+0.6084*\cos^2(\theta)}<0.$$

In any of the three preceding clauses: 0.477<RL/D<0.9455 and 0 is between 211° and 274°, and the P of the unducted fan propulsor is defined by the following expressions:

$$\frac{RL}{D}+\frac{\left(\sqrt{\begin{matrix}0.01069156*\left[0.036*\sin^2(\theta)-0.3485*\right.\\ \left.\cos^2(\theta)+0.5418*\sin(\theta)*\cos(\theta)\right]\end{matrix}}+0.139167*\sin(\theta)+0.020812*\cos(\theta)\right)}{0.2209*\sin^2(\theta)+0.0484*\cos^2(\theta)}>0$$

and $$\frac{RL}{D}+\frac{\left(-\sqrt{\begin{matrix}0.01069156*\left[0.036*\sin^2(\theta)-0.3485*\right.\\ \left.\cos^2(\theta)+0.5418*\sin(\theta)*\cos(\theta)\right]\end{matrix}}+0.139167*\sin(\theta)+0.020812*\cos(\theta)\right)}{0.2209*\sin^2(\theta)+0.0484*\cos^2(\theta)}<0.$$

In any of the four preceding clauses, the unducted fan propulsor is undermounted to the airfoil, such as a wing, with one or more intermediate structures.

In any of the preceding clauses, the unducted fan propulsor has a cruise flight Mach $M_0$ of between 0.70 and 0.85, between 0.5 and 0.9, between 0.7 and 0.9, or between 0.75 and 0.9.

Clause 3: An aircraft is provided that includes a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein RL/D≤2 and 0 is between 187° and 342°.

In any of the preceding clauses, 0.15≤RL/D.

In any of the preceding clauses, 0.35≤RL/D, and preferably RL/D is about 0.72.

In any of the preceding clauses, wherein 0 is between 198° and 310°, and preferably between 205° and 285°.

In any of the preceding clauses, the unducted fan propulsor operates at a cruise flight Mach $M_0$ of between 0.5 and 0.9, preferably between 0.7 and 0.9, and more preferably between 0.75 and 0.9.

In any of the preceding clauses, the unducted fan propulsor has a dimensionless cruise fan net thrust parameter expressed as follows:

$$0.15>\frac{F_{net}}{\rho_0 A_{an} V_0^2}>0.06,$$

wherein $F_{net}$ is cruise fan net thrust, $\rho_0$ is ambient air density, $V_0$ is cruise flight velocity, and $A_{an}$ is annular cross-sectional area perpendicular to an axis of rotation of a rotor axis of rotation.

In any of the preceding clauses, the unducted fan propulsor is undermounted to the airfoil with one or more intermediate structures.

In any of the foregoing clauses, the P of the unducted fan propulsor is variable to accommodate different operating conditions.

In any of the preceding clauses, the aircraft includes a plurality of the unducted fan propulsors.

In the preceding clause, the plurality of the unducted fan propulsors can each be mounted to the same airfoil, such as a wing or horizontal stabilizer; or the plurality of the unducted fan propulsors can be each mounted to different airfoils, such as a wing or horizontal stabilizer; or combinations thereof.

In any of the preceding clauses, wherein the unducted propulsor has two arrays of blades and only one of the array of blades is rotating.

Clause 4: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of counterclockwise rotating blades arranged in a forward array and a plurality clockwise rotating blades arranged in a rearward array, wherein one of the forward and rearward array of blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

Clause 5: An aircraft is provided that includes a fuselage; an airfoil extending from the fuselage, the airfoil having an airfoil section and the airfoil section having an effective quarter chord point (QC), and a plurality of rotating blades defining a maximum outer diameter (D); a point (P) located at an intersection of the CL and a line perpendicular to the CL that passes through a midpoint between leading and trailing edges nearest the root of one of the plurality of blades, and an ellipse origin positioning line (EOR) having a length (EORL) extending from the QC to an ellipse origin (OR) and at an angle θ measured positive in a counter-clockwise direction when the high pressure side of the airfoil section is below the airfoil section, and measured positive in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

Clause 6: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein 0.065<RL/D<1.98 and 0 is between 187° and 340°; and wherein RL/D and θ of the P of the unducted fan propulsor adhere to the following expressions:

$$\frac{RL}{D}+\frac{\left(\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}<0.$$

The aircraft of Clause 6, wherein:

0.254<RL/D<1.86 and 0 is between 199° and 306°, and the P of the unducted fan propulsor is defined by the following expressions:

$$\frac{RL}{D}+\frac{\left(\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}<0.$$

The aircraft of Clause 6, wherein:

0.369<RL/D<1.43 and 0 is between 204° and 291°, and the P of the unducted fan propulsor is defined by the following expressions:

$$\frac{RL}{D}+\frac{\left(\sqrt{\begin{array}{l}0.09923*[0.2964*\sin^2(\theta)-0.36*\\ \cos^2(\theta)+0.66*\sin(\theta)*\cos(\theta)]\end{array}}+0.3675*\sin(\theta)+0.0891*\cos(\theta)\right)}{0.49*\sin^2(\theta)+0.2025*\cos^2(\theta)}>0$$

and $$\frac{RL}{D}+\frac{\left(-\sqrt{\begin{array}{l}0.09923*[0.2964*\sin^2(\theta)-0.36*\\ \cos^2(\theta)+0.66*\sin(\theta)*\cos(\theta)]\end{array}}+0.3675*\sin(\theta)+0.0891*\cos(\theta)\right)}{0.49*\sin^2(\theta)+0.2025*\cos^2(\theta)}<0.$$

The aircraft of Clause 6, wherein:

0.477<RL/D<0.9455 and 0 is between 211° and 274°, and the P of the unducted fan propulsor is defined by the following expressions:

$$\frac{RL}{D}+\frac{\left(\sqrt{\begin{array}{l}0.01069156*[0.036*\sin^2(\theta)-0.3485*\\ \cos^2(\theta)+0.5418*\sin(\theta)*\cos(\theta)]\end{array}}+0.139167*\sin(\theta)+0.020812*\cos(\theta)\right)}{0.2209*\sin^2(\theta)+0.0484*\cos^2(\theta)}>0$$

and $$\frac{RL}{D}+\frac{\left(-\sqrt{\begin{array}{l}0.01069156*[0.036*\sin^2(\theta)-0.3485*\\ \cos^2(\theta)+0.5418*\sin(\theta)*\cos(\theta)]\end{array}}+0.139167*\sin(\theta)+0.020812*\cos(\theta)\right)}{0.2209*\sin^2(\theta)+0.0484*\cos^2(\theta)}<0.$$

The aircraft of Clause 6, wherein the unducted fan propulsor is undermounted to the airfoil with one or more intermediate structures.

The aircraft of Clause 6, wherein the P of the unducted fan propulsor is variable to accommodate different operating conditions.

Clause 7: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein RL/D≤2 and θ is between 187° and 342°.

The aircraft of Clause 7, wherein 0.15≤RL/D.

The aircraft of Clause 7, wherein 0.35≤RL/D, and preferably RL/D is about 0.72.

The aircraft of Clause 7, wherein 0 is between 198° and 310°, and preferably between 205° and 285°.

The aircraft of Clause 7, wherein the unducted fan propulsor operates at a cruise flight Mach $M_0$ of between 0.5 and 0.9, preferably between 0.7 and 0.9, and more preferably between 0.75 and 0.9.

The aircraft of Clause 7, wherein the unducted fan propulsor has a dimensionless cruise fan net thrust parameter expressed as follows:

$$0.15>\frac{F_{net}}{\rho_0 A_{an} V_0^2}>0.06,$$

wherein $F_{net}$ is cruise fan net thrust, $\rho_0$ is ambient air density, $V_0$ is cruise flight velocity, and $A_{an}$ is annular cross-sectional area perpendicular to an axis of rotation of a rotor axis of rotation.

The aircraft of Clause 7, wherein the unducted fan propulsor is undermounted to the airfoil with one or more intermediate structures.

The aircraft of Clause 7, wherein the P of the unducted fan propulsor is variable to accommodate different operating conditions.

Clause 8: A method of assembly, comprising: using an aircraft body comprising a fuselage and an airfoil extending from the fuselage, wherein the airfoil has an airfoil section defining an effective quarter chord point (QC); and attaching an unducted fan propulsor to the aircraft body relative to the airfoil section on a high pressure side thereof; the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a line HP perpendicular to the axial centerline CL that passes through the axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position; wherein 0.07≤RL/D≤2.0 and 0 is between 187° and 342.°.

The method of Clause 8, wherein 0.15≤RL/D.

The method of Clause 8, wherein 0.35≤RL/D, and preferably RL/D is about 0.72.

The method of Clause 8, wherein 0 is between 198° and 310°, and preferably between 205° and 285°.

The method of Clause 8, wherein the unducted fan propulsor operates at a cruise flight Mach $M_0$ of between 0.5 and 0.9, preferably between 0.7 and 0.9, and more preferably between 0.75 and 0.9.

The method of Clause 8, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_0$ is cruise flight velocity, and $A_{an}$ is annular cross-sectional area perpendicular to an axis of rotation of a rotor axis of rotation.

The method of Clause 8, wherein the unducted fan propulsor is undermounted to the airfoil with one or more intermediate structures.

The method of Clause 8, wherein the P of the unducted fan propulsor is variable to accommodate different operating conditions.

Clause 9: A method of assembly, comprising: using an aircraft body comprising a fuselage and an airfoil extending from the fuselage, the airfoil having an airfoil section with a leading edge (LE) and a trailing edge (TE), a chord extending between the LE and TE, and an effective quarter chord point (QC) along the chord measured from the LE, wherein the airfoil has an airfoil section defining an effective quarter chord point (QC); and attaching an unducted fan propulsor to the aircraft body relative to the airfoil section on a high pressure side thereof; the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

The method of Clause 9, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

The method of Clause 9, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

The method of Clause 9, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

Clause 10: An aircraft comprising:

a fuselage;

a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC;

a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and 0 is between 187° and 342°.

Clause 11: An aircraft comprising:

a fuselage;

a pair of horizontal stabilizers extending relative to the fuselage, two or more unducted fan propulsors, each of the unducted fan propulsors is mounted relative to one of the horizontal stabilizers on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC;

a positioning line (R) having a length (RL) and extending from the QC to the point P of the unducted fan propulsor at an angle θ measured positive in a clock-wise direction when the high pressure side of the airfoil section is above the airfoil section when viewed looking from an outboard position towards an inboard position of the wing; wherein 0.07≤RL/D≤2.0 and θ is between 187° and 342°.

In any of the preceding clauses, the unducted fan propulsor is undermounted to the airfoil, such as a wing, with one or more intermediate structures.

In any of the preceding clauses, the P of the unducted fan propulsor is variable to accommodate different operating conditions.

In any of the preceding clauses the drive mechanism can be a gas turbine engine and associated transmission to delivers torque from the drive mechanism to the propeller assembly.

In any of the preceding clauses, the unducted fan propulsor is incorporated into an airplane or other aircraft having a cruise flight Mach $M_0$ of between 0.70 and 0.85, between 0.75 and 0.85, between 0.75 and 0.79, between 0.5 and 0.9, between 0.7 and 0.9, or between 0.75 and 0.9.

In any of the preceding clauses, the unducted fan propulsors is connected to the wing (or horizontal stabilizer) through a pylon.

In any of the preceding clauses, the rotating blades diameter (D) can be between 8 to 16 feet or 12 to 16 feet.

In any of the preceding clauses, each of the propulsors including a drive mechanism comprising a gas turbine engine assembly comprising in serial order a compressor, combustor, high pressure turbine and power turbine.

In any of the preceding clauses, the propulsor having a pitch angle between −5 and +5 degrees, or −3 and 0 degrees.

In any of the preceding clauses, the propulsor having an inward toe angle of between 0 and 5 degrees, or 1 and 3 degrees.

In any of the preceding clauses, the rotating blades diameter is between 8 to 16 feet or between 12 to 16 feet.

In any of the preceding clauses, the aircraft having a wing defining the airfoil and one or two unducted fan propulsors are mounted to the wing.

In any of the preceding clauses, wherein the aircraft are aircraft types A, B, C or G as defined in Tables 1 and 2.

Clause 12: An aircraft comprising:

a fuselage;

a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other;

an airfoil section having an effective quarter chord point QC;

a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and 0 is between 187° and 342°;

a drive system of at least one of the unducted fan propulsors; and wherein the at least one of the unducted fan propulsors includes at least one mounting member that supports the drive system.

In any of the preceding clauses, wherein a characteristic of the at least one mounting member depends on a geometry of the positioning line (R) relative to the QC.

In any of the preceding clauses, wherein the drive system comprises a gearbox assembly, and wherein the aircraft further comprises a forward engine mount having a forward end and a rearward end, the forward end being adjacent to, aligned with, and/or forward of at least one of the gearbox assembly, the at least one mounting member, or the rearward array, and wherein the forward end of the forward engine mount is positioned to cooperate with the at least one mounting member to provide sufficient stiffness to maintain gearbox assembly alignment.

In any preceding clause, wherein the drive system comprises a gearbox assembly, and wherein the aircraft further comprises a forward engine mount that is adjacent to, aligned with, and/or forward of at least one of the gearbox assembly, the at least one mounting member, or the rearward array, and wherein the forward engine mount is positioned to cooperate with the at least one mounting member to provide sufficient stiffness to maintain gearbox assembly alignment.

In any of the preceding clauses, wherein the at least one mounting member couples the drive system to a static or dynamic structure of at least one of the unducted fan propulsors, and wherein the at least one mounting member is characterized by one or more impedance parameter ratios as defined in terms of stiffness and damping.

In any of the preceding clauses, wherein the gearbox assembly includes a sun gear, a plurality of planet gears, and a ring gear; and wherein the at least one mounting member comprises a flex coupling, a flex mount, or a fan frame.

In any of the preceding clauses, wherein the gearbox assembly is arranged in a planetary configuration.

In any of the preceding clauses, wherein the gearbox assembly is arranged in a star configuration.

In any of the preceding clauses, wherein the at least one mounting member is characterized by a lateral impedance parameter ratio less than or equal to 0.5.

In any of the preceding clauses, wherein the at least one mounting member is characterized by a bending impedance parameter ratio less than or equal to 0.5.

In any of the preceding clauses, wherein the at least one mounting member is characterized by a torsional impedance parameter ratio greater than or equal to 0.1.

In any of the preceding clauses, wherein the torsional impedance parameter ratio is between 0.1 and 0.95.

In any of the preceding clauses, wherein each of a flex coupling, a flex mount, and a fan frame of the gearbox assembly is characterized by a respective lateral impedance parameter ratio, a bending impedance parameter ratio, and a torsional impedance parameter ratio.

In any of the preceding clauses, wherein the fan frame has a structural stiffness and the flex mount has a structural stiffness based on the fan frame structural stiffness.

In any of the preceding clauses, wherein the fan frame structural stiffness includes a lateral structural stiffness, a bending structural stiffness, and a torsional structural stiffness, and the flex mount structural stiffness includes a lateral structural stiffness, a bending structural stiffness, and a torsional structural stiffness, wherein the flex mount lateral structural stiffness and the flex mount bending structural stiffness are less than the fan frame lateral structural stiffness and the fan frame bending structural stiffness, respectively, and wherein the flex mount torsional structural stiffness is greater than the fan frame torsional structural stiffness.

In any of the preceding clauses, wherein the fan frame has a structural stiffness and the flex coupling has a structural stiffness based on the fan frame structural stiffness.

In any of the preceding clauses, wherein the fan frame structural stiffness includes a lateral structural stiffness, a bending structural stiffness, and a torsional structural stiffness, and the flex coupling structural stiffness includes a lateral structural stiffness, a bending structural stiffness, and a torsional structural stiffness, wherein the flex coupling lateral structural stiffness and the flex coupling bending structural stiffness are less than the fan frame lateral structural stiffness and the fan frame bending structural stiffness, respectively, and wherein the flex coupling torsional structural stiffness is greater than the fan frame torsional structural stiffness.

In any of the preceding clauses, further comprising an oil transfer device configured to deliver a lubricant to the gearbox assembly.

In any of the preceding clauses, wherein the one or more impedance parameter ratios of the at least one mounting member are defined in terms of stiffness and damping.

In any of the preceding clauses, wherein the one or more impedance parameter ratios of the at least one mounting member varies in response to different propulsor placements between takeoff and cruise operating conditions.

In any of the preceding clauses, wherein the one or more impedance parameter ratios of the at least one mounting member are configured to maintain gearbox assembly alignment while the unducted fan propulsor operates at a cruise Mach number between 0.7 and 0.9 with $0.07 \leq RL/D \leq 2$.

In any of the preceding clauses, wherein the positioning line (R) and the one or more impedance parameter ratios of the at least one mounting member are jointly selected to maximize propulsor thrust efficiency while maintaining gearbox assembly alignment.

In any of the preceding clauses, wherein the one or more impedance parameter ratios of the at least one mounting member are defined as a function of at least one of RL/D or θ.

In any of the preceding clauses, wherein $0.15 \leq RL/D$.

In any of the preceding clauses, wherein $0.35 \leq RL/D$, and RL/D is about 0.72.

In any of the preceding clauses, wherein 0 is between 198° and 310°, and preferably between 205° and 285°.

In any of the preceding clauses, wherein the two or more unducted fan propulsors are configured to operate at a cruise flight Mach $M_0$ of between 0.7 and 0.9, and more preferably between 0.75 and 0.9; or the two or more unducted fan propulsors are configured to propel the aircraft at a cruise flight Mach $M_0$ of between 0.7 and 0.9, and more preferably between 0.75 and 0.85.

In any of the preceding clauses, wherein at least one of the two or more unducted fan propulsors has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_0$ is cruise flight velocity, and $A_{an}$ is annular cross-sectional area perpendicular to an axis of rotation of a rotor axis of rotation.

In any of the preceding clauses, wherein at least one of the two or more unducted fan propulsors is undermounted to the airfoil with one or more intermediate structures.

In any of the preceding clauses, wherein the P of at least one of the two or more unducted fan propulsors is variable to accommodate different operating conditions.

Clause 13: An aircraft, comprising:

a fuselage;

an airfoil extending from the fuselage, the airfoil having an airfoil section defining an effective quarter chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other;

an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7;

a drive system of the unducted fan propulsor; and wherein the unducted fan propulsor includes at least one mounting member that supports the drive system.

In any of the preceding clauses, wherein a characteristic of the at least one mounting member depends on a geometry of the positioning line (R) relative to the QC.

In any of the preceding clauses, wherein the drive system comprises a gearbox assembly, and wherein the aircraft further comprises a forward engine mount having a forward end and a rearward end, the forward end being adjacent to, aligned with, and/or forward of at least one of the gearbox assembly, the at least one mounting member, or the rearward array, and wherein the forward end of the forward engine mount is positioned to cooperate with the at least one mounting member to provide sufficient stiffness to maintain gearbox assembly alignment.

In any preceding clause, wherein the drive system comprises a gearbox assembly, and wherein the aircraft further comprises a forward engine mount that is adjacent to, aligned with, and/or forward of at least one of the gearbox assembly, the at least one mounting member, or the rearward array, and wherein the forward engine mount is positioned to cooperate with the at least one mounting member to provide sufficient stiffness to maintain gearbox assembly alignment.

In any of the preceding clauses, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

In any of the preceding clauses, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

In any of the preceding clauses, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

In any of the preceding clauses, wherein the drive system comprises a gearbox assembly.

In any of the preceding clauses, wherein the gearbox assembly includes a sun gear, a plurality of planet gears, and a ring gear; and wherein the at least one mounting member comprises a flex coupling, a flex mount, or a fan frame.

In any of the preceding clauses, wherein the gearbox assembly is arranged in a planetary configuration.

In any of the preceding clauses, wherein the gearbox assembly is arranged in a star configuration.

In any of the preceding clauses, wherein the at least one mounting member is characterized by a lateral impedance parameter ratio less than or equal to 0.5.

In any of the preceding clauses, wherein the at least one mounting member is characterized by a bending impedance parameter ratio less than or equal to 0.5.

In any of the preceding clauses, wherein the at least one mounting member is characterized by a torsional impedance parameter ratio greater than or equal to 0.1.

In any of the preceding clauses, wherein the torsional impedance parameter ratio is between 0.1 and 0.95.

In any of the preceding clauses, wherein each of a flex coupling, a flex mount, and a fan frame of the gearbox assembly is characterized by a respective lateral impedance parameter ratio, a bending impedance parameter ratio, and a torsional impedance parameter ratio.

In any of the preceding clauses, wherein the fan frame has a structural stiffness and the flex mount has a structural stiffness based on the fan frame structural stiffness.

In any of the preceding clauses, wherein the fan frame structural stiffness includes a lateral structural stiffness, a bending structural stiffness, and a torsional structural stiffness, and the flex mount structural stiffness includes a lateral structural stiffness, a bending structural stiffness, and a torsional structural stiffness, wherein the flex mount lateral structural stiffness and the flex mount bending structural stiffness are less than the fan frame lateral structural stiffness and the fan frame bending structural stiffness, respectively, and wherein the flex mount torsional structural stiffness is greater than the fan frame torsional structural stiffness.

In any of the preceding clauses, wherein the fan frame has a structural stiffness and the flex coupling has a structural stiffness based on the fan frame structural stiffness.

In any of the preceding clauses, wherein the fan frame structural stiffness includes a lateral structural stiffness, a bending structural stiffness, and a torsional structural stiffness, and the flex coupling structural stiffness includes a lateral structural stiffness, a bending structural stiffness, and a torsional structural stiffness, wherein the flex coupling lateral structural stiffness and the flex coupling bending structural stiffness are less than the fan frame lateral structural stiffness and the fan frame bending structural stiffness, respectively, and wherein the flex coupling torsional structural stiffness is greater than the fan frame torsional structural stiffness.

In any of the preceding clauses, further comprising an oil transfer device configured to deliver a lubricant to the gearbox assembly.

In any of the preceding clauses, wherein the one or more impedance parameter ratios of the at least one mounting member are defined in terms of stiffness and damping.

In any of the preceding clauses, wherein the one or more impedance parameter ratios of the at least one mounting member varies in response to different propulsor placements between takeoff and cruise operating conditions.

In any of the preceding clauses, wherein the one or more impedance parameter ratios of the at least one mounting member are configured to maintain gearbox assembly alignment while the unducted fan propulsor operates at a cruise Mach number between 0.7 and 0.9 with $0.07 \leq RL/D \leq 2$.

In any of the preceding clauses, wherein the ellipse origin positioning line (EOR) and the one or more impedance parameter ratios of the at least one mounting member are jointly selected to maximize propulsor thrust efficiency while maintaining gearbox assembly alignment.

In any of the preceding clauses, wherein the one or more impedance parameter ratios of the at least one mounting member are defined as a function of at least one of RL/D or θ.

In any of the preceding clauses, wherein $0.15 \leq RL/D$.

In any of the preceding clauses, wherein $0.35 \leq RL/D$, and RL/D is about 0.72.

In any of the preceding clauses, wherein 0 is between 198° and 310°, and preferably between 205° and 285°.

In any of the preceding clauses, wherein the unducted fan propulsor is configured to operate at a cruise flight Mach $M_0$ of between 0.7 and 0.9, and more preferably between 0.75 and 0.9; or the unducted fan propulsor is configured to propel the aircraft at a cruise flight Mach $M_0$ of between 0.7 and 0.9, and more preferably between 0.75 and 0.85.

In any of the preceding clauses, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_0$ is cruise flight velocity, and $A_{an}$ is annular cross-sectional area perpendicular to an axis of rotation of a rotor axis of rotation.

In any of the preceding clauses, wherein the unducted fan propulsor is undermounted to the airfoil with one or more intermediate structures.

In any of the preceding clauses, wherein the P of the unducted fan propulsor is variable to accommodate different operating conditions.

Clause 14: An aircraft, comprising:

a fuselage;

an airfoil extending from the fuselage, the airfoil having an airfoil section defining an effective quarter-chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein 0.065<RL/D<1.98 and θ is between 187° and 340°; and wherein RL/D and θ of the P of the unducted fan propulsor adhere to the following expressions:

$$\frac{RL}{D} + \frac{\left(\sqrt{1.4161 * \left[1.88978 * \sin^2(\theta) - 0.0875 * \cos^2(\theta) + 0.477 * \sin(\theta) * \cos(\theta)\right]} + 1.764 * \sin(\theta) + 0.19146 * \cos(\theta)\right)}{1.96 * \sin^2(\theta) + 0.7225 * \cos^2(\theta)} > 0$$

and $$\frac{RL}{D} + \frac{\left(-\sqrt{1.4161 * \left[1.88978 * \sin^2(\theta) - 0.0875 * \cos^2(\theta) + 0.477 * \sin(\theta) * \cos(\theta)\right]} + 1.764 * \sin(\theta) + 0.19146 * \cos(\theta)\right)}{1.96 * \sin^2(\theta) + 0.7225 * \cos^2(\theta)} < 0$$

a drive system of the unducted fan propulsor; and wherein the unducted fan propulsor includes at least one mounting member that supports the drive system.

In any of the preceding clauses, wherein a characteristic of the at least one mounting member depends on a geometry of the positioning line (R) relative to the QC.

In any of the preceding clauses, wherein the drive system comprises a gearbox assembly, and wherein the aircraft further comprises a forward engine mount having a forward end and a rearward end, the forward end being adjacent to, aligned with, and/or forward of at least one of the gearbox assembly, the at least one mounting member, or the rearward array, and wherein the forward end of the forward engine mount is positioned to cooperate with the at least one mounting member to provide sufficient stiffness to maintain gearbox assembly alignment.

In any preceding clause, wherein the drive system comprises a gearbox assembly, and wherein the aircraft further comprises a forward engine mount that is adjacent to, aligned with, and/or forward of at least one of the gearbox assembly, the at least one mounting member, or the rearward array, and wherein the forward engine mount is positioned to cooperate with the at least one mounting member to provide sufficient stiffness to maintain gearbox assembly alignment.

In any of the preceding clauses, wherein the gearbox assembly includes a sun gear, a plurality of planet gears, and a ring gear; and wherein the at least one mounting member comprises a flex coupling, a flex mount, or a fan frame.

In any of the preceding clauses, wherein the gearbox assembly is arranged in a planetary configuration.

In any of the preceding clauses, wherein the gearbox assembly is arranged in a star configuration.

In any of the preceding clauses, wherein the at least one mounting member is characterized by a lateral impedance parameter ratio less than or equal to 0.5.

In any of the preceding clauses, wherein the at least one mounting member is characterized by a bending impedance parameter ratio less than or equal to 0.5.

In any of the preceding clauses, wherein the at least one mounting member is characterized by a torsional impedance parameter ratio greater than or equal to 0.1.

In any of the preceding clauses, wherein the torsional impedance parameter ratio is between 0.1 and 0.95.

In any of the preceding clauses, wherein each of a flex coupling, a flex mount, and a fan frame of the gearbox assembly is characterized by a respective lateral impedance parameter ratio, a bending impedance parameter ratio, and a torsional impedance parameter ratio.

In any of the preceding clauses, wherein the fan frame has a structural stiffness and the flex mount has a structural stiffness based on the fan frame structural stiffness.

In any of the preceding clauses, wherein the fan frame structural stiffness includes a lateral structural stiffness, a bending structural stiffness, and a torsional structural stiffness, and the flex mount structural stiffness includes a lateral structural stiffness, a bending structural stiffness, and a torsional structural stiffness, wherein the flex mount lateral structural stiffness and the flex mount bending structural stiffness are less than the fan frame lateral structural stiffness and the fan frame bending structural stiffness, respectively, and wherein the flex mount torsional structural stiffness is greater than the fan frame torsional structural stiffness.

In any of the preceding clauses, wherein the fan frame has a structural stiffness and the flex coupling has a structural stiffness based on the fan frame structural stiffness.

In any of the preceding clauses, wherein the fan frame structural stiffness includes a lateral structural stiffness, a bending structural stiffness, and a torsional structural stiffness, and the flex coupling structural stiffness includes a lateral structural stiffness, a bending structural stiffness, and a torsional structural stiffness, wherein the flex coupling lateral structural stiffness and the flex coupling bending structural stiffness are less than the fan frame lateral structural stiffness and the fan frame bending structural stiffness, respectively, and wherein the flex coupling torsional structural stiffness is greater than the fan frame torsional structural stiffness.

In any of the preceding clauses, further comprising an oil transfer device configured to deliver a lubricant to the gearbox assembly.

In any of the preceding clauses, wherein the one or more impedance parameter ratios of the at least one mounting member are defined in terms of stiffness and damping.

In any of the preceding clauses, wherein the one or more impedance parameter ratios of the at least one mounting member varies in response to different propulsor placements between takeoff and cruise operating conditions.

In any of the preceding clauses, wherein the one or more impedance parameter ratios of the at least one mounting member are configured to maintain gearbox assembly alignment while the unducted fan propulsor operates at a cruise Mach number between 0.7 and 0.9 with $0.07 \leq RL/D \leq 2$.

In any of the preceding clauses, wherein the positioning line (R) and the one or more impedance parameter ratios of the at least one mounting member are jointly selected to maximize propulsor thrust efficiency while maintaining gearbox assembly alignment.

In any of the preceding clauses, wherein the one or more impedance parameter ratios of the at least one mounting member are defined as a function of at least one of RL/D or θ.

In any of the preceding clauses, wherein $0.15 \leq RL/D$.

In any of the preceding clauses, wherein $0.35 \leq RL/D$, and RL/D is about 0.72.

In any of the preceding clauses, wherein 0 is between 198° and 310°, and preferably between 205° and 285°.

In any of the preceding clauses, wherein the unducted fan propulsor is configured to operate at a cruise flight Mach $M_0$ of between 0.7 and 0.9, and more preferably between 0.75 and 0.9; or the unducted fan propulsor is configured to propel the aircraft at a cruise flight Mach $M_0$ of between 0.7 and 0.9, and more preferably between 0.75 and 0.85.

In any of the preceding clauses, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_0$ is cruise flight velocity, and $A_{an}$ is annular cross-sectional area perpendicular to an axis of rotation of a rotor axis of rotation.

In any of the preceding clauses, wherein the unducted fan propulsor is undermounted to the airfoil with one or more intermediate structures.

In any of the preceding clauses, wherein the P of the unducted fan propulsor is variable to accommodate different operating conditions.

Persons skilled in the art will understand that the structures and methods specifically described herein and shown in the accompanying figures are non-limiting exemplary aspects, and that the description, disclosure, and figures should be construed merely as exemplary of aspects. It is to be understood, therefore, that the present disclosure is not limited to the precise aspects described, and that various other changes and modifications can be effected by one skilled in the art without departing from the scope or spirit of the disclosure. Additionally, the elements and features shown or described in connection with certain aspects can be combined with the elements and features of certain other aspects without departing from the scope of the present disclosure, and that such modifications and variations are also included within the scope of the present disclosure. Accordingly, the subject matter of the present disclosure is not limited by what has been particularly shown and described.

What is claimed is:

1. An aircraft comprising:

a fuselage;

a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other;

an airfoil section having an effective quarter chord point QC;

a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein $0.07 \leq RL/D \leq 2.0$ and θ is between 187° and 342°;

a gearbox assembly coupling a low pressure turbine shaft output to a fan shaft of the propulsor; and a mounting member that couples the gearbox assembly to a fan frame.

2. The aircraft of claim 1, wherein the aircraft further comprises an engine mount having a forward end coupled to a fan frame at a location along CL that is coincident with the mounting member comprising a flex mount, and a pylon comprising the forward mount supporting the engine from the one of the wings.

3. The aircraft of claim 2, wherein the gearbox assembly includes a sun gear, a plurality of planet gears, and a ring gear, and wherein the at least one mounting member comprises a flex coupling, a flex mount, or a fan frame.

4. The aircraft of claim 3, wherein the gearbox assembly is arranged in one of a planetary configuration, a star configuration, a compound star configuration and a reversing compound star configuration.

5. The aircraft of claim 2, wherein the at least one mounting member is characterized by a lateral impedance parameter ratio less than or equal to 0.5.

6. The aircraft of claim 2, wherein the at least one mounting member is characterized by a bending impedance parameter ratio less than or equal to 0.5.

7. The aircraft of claim 2, wherein the at least one mounting member is characterized by a torsional impedance parameter ratio greater than or equal to 0.1.

8. The aircraft of claim 7, wherein the torsional impedance parameter ratio is between 0.1 and 0.95.

9. The aircraft of claim 3, wherein each of a flex coupling, a flex mount, and a fan frame of the gearbox assembly is characterized by a respective lateral impedance parameter ratio, a bending impedance parameter ratio, and a torsional impedance parameter ratio.

10. The aircraft of claim 9, wherein the fan frame has a structural stiffness and the flex mount has a structural stiffness based on the fan frame structural stiffness.

11. The aircraft of claim 10, wherein the fan frame structural stiffness includes a lateral structural stiffness, a bending structural stiffness, and a torsional structural stiffness, and the flex mount structural stiffness includes a lateral structural stiffness, a bending structural stiffness, and a torsional structural stiffness, wherein the flex mount lateral structural stiffness and the flex mount bending structural stiffness are less than the fan frame lateral structural stiffness and the fan frame bending structural stiffness, respectively, and wherein the flex mount torsional structural stiffness is greater than the fan frame torsional structural stiffness.

12. The aircraft of claim 11, wherein the fan frame has a structural stiffness and the flex coupling has a structural stiffness based on the fan frame structural stiffness.

13. The aircraft of claim 12, wherein the fan frame structural stiffness includes a lateral structural stiffness, a bending structural stiffness, and a torsional structural stiffness, and the flex coupling structural stiffness includes a lateral structural stiffness, a bending structural stiffness, and a torsional structural stiffness, wherein the flex coupling lateral structural stiffness and the flex coupling bending structural stiffness are less than the fan frame lateral structural stiffness and the fan frame bending structural stiffness, respectively, and wherein the flex coupling torsional structural stiffness is greater than the fan frame torsional structural stiffness.

14. The aircraft of claim 2, further comprising an oil transfer device configured to deliver a lubricant to the gearbox assembly.

15. The aircraft of claim 2, wherein one or more impedance parameter ratios of the at least one mounting member are defined in terms of stiffness and damping.

16. The aircraft of claim 2, wherein one or more impedance parameter ratios of the at least one mounting member varies in response to different propulsor placements between takeoff and cruise operating conditions.

17. The aircraft of claim 2, wherein one or more impedance parameter ratios of the at least one mounting member are configured to maintain gearbox assembly alignment while the unducted fan propulsor operates at a cruise Mach number between 0.7 and 0.9 with $0.07 \leq RL/D \leq 2$.

18. The aircraft of claim 2, wherein the positioning line (R) and one or more impedance parameter ratios of the at least one mounting member are jointly selected to maximize propulsor thrust efficiency while maintaining gearbox assembly alignment.

19. The aircraft of claim 2, wherein one or more impedance parameter ratios of the at least one mounting member are defined as a function of at least one of RL/D or $\theta$.

20. The aircraft of claim 1, wherein the drive system comprises a gearbox assembly, and wherein the aircraft further comprises a forward engine mount that is adjacent to, aligned with, and/or forward of at least one of the gearbox assembly, the at least one mounting member, or the rearward array, and wherein the forward engine mount is positioned to cooperate with the at least one mounting member to provide sufficient stiffness to maintain gearbox assembly alignment.

* * * * *